(12) United States Patent
Yamamoto et al.

(10) Patent No.: US 9,979,437 B2
(45) Date of Patent: May 22, 2018

(54) POWER TRANSMITTING APPARATUS FOR MODULATING AND TRANSMITTING POWER, POWER RECEIVING APPARATUS FOR RECEIVING AND DEMODULATING POWER, AND POWER TRANSMISSION SYSTEM WITH THEM

(71) Applicant: Panasonic Intellectual Property Management Co., Ltd., Osaka (JP)

(72) Inventors: Atsushi Yamamoto, Kyoto (JP); Shoichi Hara, Tokyo (JP); Taiki Nishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/472,937

(22) Filed: Mar. 29, 2017

(65) Prior Publication Data

US 2017/0317718 A1    Nov. 2, 2017

(30) Foreign Application Priority Data

Apr. 28, 2016    (JP) .................................. 2016-091309

(51) Int. Cl.
  *H04B 3/54* (2006.01)
  *H04L 27/26* (2006.01)

(52) U.S. Cl.
  CPC ........... *H04B 3/54* (2013.01); *H04L 27/2601* (2013.01)

(58) Field of Classification Search
  CPC .............................. H04B 3/54; H04L 27/2601
  See application file for complete search history.

(56) References Cited

U.S. PATENT DOCUMENTS

| 5,862,174 A | 1/1999 | Yokota et al. | |
|---|---|---|---|
| 2002/0181439 A1* | 12/2002 | Orihashi | H04J 3/0605 370/350 |
| 2003/0002112 A1* | 1/2003 | Hirano | H04B 10/25133 398/147 |
| 2004/0184487 A1* | 9/2004 | Kim | H04B 10/25754 370/516 |
| 2008/0317160 A1* | 12/2008 | Tzeng | H04B 1/707 375/295 |

(Continued)

FOREIGN PATENT DOCUMENTS

| JP | 8-167012 | 6/1996 |
|---|---|---|
| JP | 2007-158539 | 6/2007 |
| JP | 2008-123051 | 5/2008 |

(Continued)

*Primary Examiner* — Dac Ha
(74) *Attorney, Agent, or Firm* — McDermott Will & Emery LLP

(57) ABSTRACT

A power receiving apparatus includes: a communication circuit that receives a control signal from a power transmitting apparatus through a wired transmission line; a control circuit that determines a propagation time in which the control signal is propagated from the power transmitting apparatus to the power receiving apparatus through the wired transmission line; and a demodulation circuit that receives modulated power from the power transmitting apparatus through a wired transmission line, and demodulates, based on the determined propagation time, the modulated power in synchronization with a phase of the modulated power.

14 Claims, 32 Drawing Sheets

(56) References Cited

U.S. PATENT DOCUMENTS

2012/0173035 A1     7/2012   Abe
2012/0315043 A1*   12/2012   Nakagawa ......... H04B 10/5053
                                                                               398/65

FOREIGN PATENT DOCUMENTS

| JP | 2011-182641 | 9/2011 |
| JP | 2014-505460 | 2/2014 |
| WO | 2002/021664 | 3/2002 |
| WO | 2012/108663 | 8/2012 |

* cited by examiner

POWER TRANSMITTING APPARATUS FOR MODULATING AND TRANSMITTING POWER, POWER RECEIVING APPARATUS FOR RECEIVING AND DEMODULATING POWER, AND POWER TRANSMISSION SYSTEM WITH THEM

BACKGROUND

1. Technical Field

The present disclosure relates to a power transmitting apparatus, a power receiving apparatus, and a power transmission system including the power transmitting apparatus and the power receiving apparatus.

2. Description of the Related Art

In recent years, power supply by power generation that utilizes natural energy such as solar power generation, wind power generation, and geothermal power generation has been rapidly increasing in addition to commercial power supply provided by electric power companies such as thermal power generation, water power generation, and nuclear power generation. Separately from a currently-laid large-scale commercial power network, a local small-scale power network for realizing local generation and local consumption of electric power has been spreading worldwide for the purpose of reducing a power loss due to long-distance power transmission.

For example, Japanese Patent Nos. 5194435 and 5249382 and Japanese Unexamined Patent Application Publication (Translation of PCT Application) No. 2014-505460 disclose power transmission systems including a power transmitting apparatus and a power receiving apparatus.

SUMMARY

In one general aspect, the techniques disclosed here feature a power receiving apparatus including: a communication circuit that receives a control signal from a power transmitting apparatus through a wired transmission line; a control circuit that determines a propagation time in which the control signal is propagated from the power transmitting apparatus to the power receiving apparatus through the wired transmission line; and a demodulation circuit that receives modulated power from the power transmitting apparatus through a wired transmission line, and demodulates, based on the determined propagation time, the modulated power in synchronization with a phase of the modulated power.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
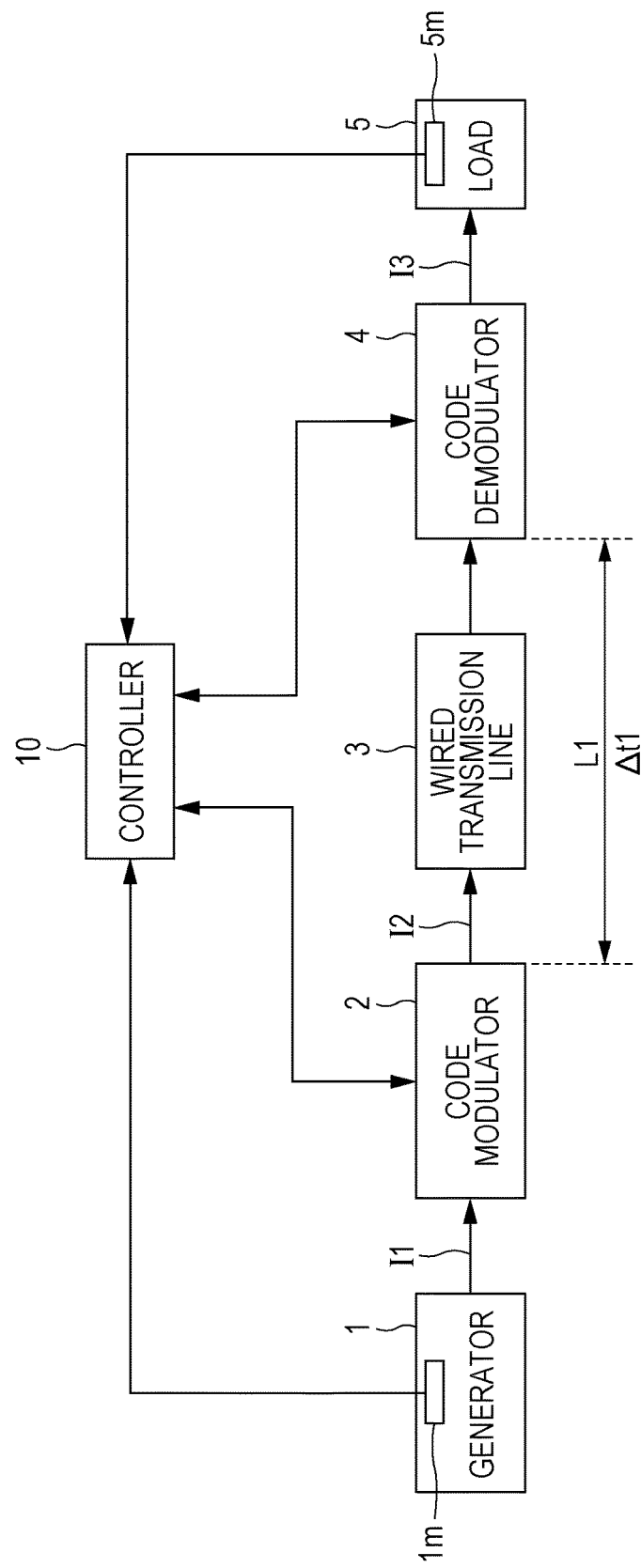
FIG. 1 is a block diagram illustrating a configuration example of a power transmission system according to a first embodiment.

Underlying Knowledge Forming Basis of the Present Disclosure

The present inventors found that the following problems occur in a power transmission system described in the section of BACKGROUND.

The small-scale power network enables self-power supply by using a generator that uses the natural energy, and performing high-efficiency power collection in electric facilities functioning as loads. This is highly expected as a power transmission system for solving a problem of unelectrified regions such as an oasis in a desert and an isolated island.

Direct-current power is generated by power generation from solar light that occupies most of the natural energy. On the other hand, alternating-current power is generated in wind power and geothermal power generation. An electric power transmitting mechanism is necessary to use these kinds of electric power as power for the electric facilities functioning as the loads. Currently, the generators and the loads are connected by wired transmission lines (conductors), a power network in which multiple wired transmission lines are connected to one another is formed, and electric power is transmitted in the power network. In order to simultaneously transmit the direct-current power and the alternating-current power in one power network, the power network has to be equipped with different power distribution facilities that transmit the two kinds of electric powers, and may become extremely complicated. To avoid this, transmission of the electric powers requires the electric powers to be adjusted to any one of a direct current and an alternating current.

In the generator that uses the natural energy, the amount of energy that can be generated changes according to an environment and time. Electric power required by the electric facility functioning as the load also changes according to the operation of the electric facility.

Since enormous cost is required to store gigantic electric power, it is necessary to control a power generation amount and a consumption amount at equal levels in the entire power network.

When there are multiple loads, the loads demand respectively different amounts of electric power. To satisfy their demands, there is a need for power transmission control for distributing a necessary power amount to each of the loads.

Further, when electric power is traded as business, it is necessary to recognize how much electric power is transmitted from which generator to which electric facility.

As explained above, for actual transmission of electric power from the power transmitting apparatus to the power receiving apparatus, the power transmitting apparatus and the power receiving apparatus exchange various control signals for preparation for the power transmission before the start of the power transmission. The preparation for the power transmission includes, for example, the following operations:

Synchronizing the power transmitting apparatus and the power receiving apparatus with each other;

Detecting a state (abnormality, disconnection, impedance, etc.) of the wired transmission line; and When there are multiple power transmitting apparatuses and multiple power receiving apparatuses, determining a combination of one or more of the power transmitting apparatuses and one or more of the power receiving apparatuses for transmission of electric power.

Heretofore, the transmitting and receiving the control signals for the preparation for the power transmission have caused problems of cost increase due to the necessity of an additional communication facility and the occurrence of communication overhead.

Japanese Patent No. 5194435 discloses a power supply system including a server functioning as a power supplier, a client functioning as a power supply recipient, and a line for connecting the server and the client. In the power supply system, the server supplies electric power to the client while exchanging information with the client. In order to synchronize the exchange of the information with the client and the supply of the electric power with the client and to perform address management between the server and the client, the server includes a function of generating an information slot for the exchange of the information and a power slot for the supply of the electric power, and transmitting a synchronization packet including the address of the server at timing of the information slot. When another server is connected to the same line, the other server detects reception of the synchronization packet from the synchronizing server, and does not function as the synchronizing server.

Japanese Unexamined Patent Application Publication (Translation of PCT Application) No. 2014-505460 discloses a wireless power receiving apparatus including: a target communicator configured to receive a wakeup request signal and synchronization information concerning wireless power transmission from a wireless power transmitting apparatus and transmit a response signal to the wakeup request signal to the wireless power transmitting apparatus, a load route switch configured to be activated based on timing information included in the synchronization information; and a target resonator configured to receive wireless electric power from a source resonator of the wireless power transmitting apparatus when the load route switch is activated.

Japanese Patent No. 5249382 discloses a multi-terminal type power converting apparatus including a three or more power converting units including self-excited power converters that perform bidirectional power conversion and voltage/current measurers that measure voltages and electric currents passing the self-excited power converters, a common bus by which terminals of the power converting units on one side are connected to each other in parallel, and a control unit that calculates the voltages, the electric currents, the electric power, the frequencies, and the phases based on measurement values measured by the voltage/current measures, controls the power converting units in cooperation such that a sum of electric power flowing into the common bus and electric power delivered from the common bus can become zero, and controls the power converting units to perform asynchronous power interchange between external loads to which the other terminals of the power converting units on the other side are connected. The power converting units measure the voltages, frequencies, and phases of the other terminals connected to the external loads. When any of the other terminals connected to the external loads has an alternating-current voltage, the control unit causes the power converting unit to perform exchange of a desirably-controlled active power or reactive power between the power converting unit and the external load by giving the power converting unit an instruction that electric power converted by the self-excited power converter is to be synchronized, with a predetermined difference in at least one of the voltage, the frequency, and the phase, with the electric power of the external load to which the other terminal is connected. According to Japanese Patent No. 5249382, in order to transmit electric power from the multiple power transmitting apparatuses to the multiple power receiving apparatuses in the power transmission system, control signals including information on a transmitting source IP address, a receiving destination IP address, and transaction conditions are transmitted and received in time sections before and after (or before or after) the power transmission.

According to Japanese Patent Nos. 5194435 and 5249382, since the transmission of the control signal and the power transmission are performed separately at different timings, it is possible to surely establish the synchronization of the power transmitting apparatus and the power receiving apparatus. However, these techniques place importance on only the establishment of the synchronization and do not take into account detection of a state (abnormality, disconnection, etc.) of the wired transmission line. Therefore, in order to detect the state of the wireless transmission line, a sensor for detection and a collecting unit for a detection result are additionally necessary, which may lead to an increase in cost and communication overhead.

According to Japanese Unexamined Patent Application Publication (Translation of PCT Application) No. 2014-505460, the multiple wireless power receiving apparatuses receive the synchronization information from the wireless power transmitting apparatuses to establish synchronization, and the order of the power reception of the wireless power receiving apparatuses is determined depending on a timing of turning-on and power reception of each of the wireless power receiving apparatuses. Consequently, it is possible to interchange electric power in a time division manner, and to supply electric power to the multiple wireless power receiving apparatuses. However, this technique does not take into account detection of a state (abnormality, disconnection, etc.) of the wired transmission line. Therefore, to detect the state of the wired transmission line may require an increase in cost and the occurrence of communication overhead. Further, the multiple wireless power receiving apparatuses cannot simultaneously receive electric power.

As explained above, in the related art, the power transmitting apparatus and the power receiving apparatus establish synchronization by transmitting the synchronization signal and the synchronization information in a time division manner with the power transmission. However, the state of the wireless transmission line cannot be detected. Therefore, there is a problem in that, to transmit and receive a control signal for preparation for the power transmission, an additional facility is necessary, cost increases, and communication overhead occurs. Therefore, there is a demand for a power transmitting apparatus, a power receiving apparatus, and a power transmission system that can transmit and receive a control signal for preparation for power transmission while suppressing an increase in cost and communication overhead. For example, there is a demand for a power transmission system that can synchronize a power transmitting apparatus and a power receiving apparatus with each other, detect a state of a wired transmission line and select a transmit route having satisfactory power transmission efficiency from multiple transmit routes.

The present disclosure provides a power transmitting apparatus, a power receiving apparatus, and a power transmission system that can transmit and receive a control signal for preparation for power transmission while suppressing an increase in cost and communication overhead.

According to the above examination, the present inventors conceived aspects of the invention explained below.

Embodiments according to the present disclosure are explained below with reference to the accompanying drawings. Note that, in the embodiments, the same components are denoted by the same reference numerals and signs.

First Embodiment

FIG. 1 is a block diagram illustrating the configuration of a power transmission system according to a first embodiment. The power transmission system illustrated in FIG. 1 includes a generator 1, a code modulator 2, a wired transmission line 3, a code demodulator 4, a load 5, and a controller 10.

In the power transmission system illustrated in FIG. 1, direct-current power (e.g., a generated current I1) generated by the generator 1 is code-modulated by the code modulator 2 using a code sequence of an alternating-current modulation code. A code-modulated wave (e.g., a modulated current I2) is transmitted to the wired transmission line 3. The code-modulated wave, which is transmitted via the wired transmission line 3, is code-demodulated into direct-current power (e.g., a demodulated current I3) by the code demodulator 4 using a code sequence of an alternating-current demodulation code and supplied to the load 5. Note that, in the first embodiment and the like, the generated current I1 and the demodulated current I3 are used for the explanation.

However, the present disclosure is not limited to this. A generated voltage and a demodulated voltage may be used.

The controller 10 transmits, to the code modulator 2 and the code demodulator 4, a system synchronization signal and a control signal including a code sequence of a modulation code or a demodulation code and a start time and an end time of power transmission (i.e., modulation and demodulation). The system synchronization signal is used to temporally synchronize the code modulator 2 and the code demodulator 4 with each other.

The code sequence of the modulation code and the code sequence of the demodulation code may be respectively transmitted from the controller 10 to the code modulator 2 and the code demodulator 4. Rather than transmitting the code sequence itself, the controller 10 may transmit original data for generating the code sequence to the code modulator 2 and the code demodulator 4. The code modulator 2 and the code demodulator 4 may respectively generate the code sequence of the modulation code and the code sequence of the demodulation code based on the original data. The code sequence of the modulation code and the code sequence of the demodulation code may be respectively set in the code modulator 2 and the code demodulator 4 in advance.

When the power transmission system includes multiple generators 1, multiple code modulators 2, multiple loads 5, and multiple code demodulators 4, a combination of the code modulator 2 and the code demodulator 4 that perform power transmission can be designated according to the code sequence (or the original data of the code sequence) transmitted from the controller 10 to the code modulator 2 and the code demodulator 4. The controller 10 transmits the code sequence of the modulation code to the code modulator 2, to which should transmit electric power, and, on the other hand, transmits the code sequence of the demodulation code to the code demodulator 4, which should receive the electric power, to enable transmission of electric power from the generator 1, which is connected to the designated code modulator 2, to the load 5, which is connected to the designated code demodulator 4.

The generator 1 includes a power measurer 1m. The power measurer 1m measures a power amount of direct-current power from the generator 1 to the code modulator 2, which is a power generation amount of the generator 1, and sends the power amount to the controller 10. The load 5 includes a power measurer 5m. The power measurer 5 measures a power amount of direct-current power from the code demodulator 4 to the load 5, which is a power use amount in the load 5, and sends the power amount to the controller 10. The controller 10 controls the operations of the code modulator 2 and the code demodulator 4 based on the received power amounts.

For example, when the power generation amount of the generator 1 is smaller than the power use amount of the load 5, the controller 10 may stop the power transmission. When multiple generators 1 are present and the generator 1 having a power generation amount larger than the power use amount of the load 5 is present, the controller 10 may cause the code modulator 2 connected to the generator 1 to transmit electric power.

Note that the power measurer 1m may be provided at a pre-stage of the code modulator 2 instead of the generator 1. The power measurer 5m may be provided at a post-stage of the code demodulator 4 instead of the load 5.

Note that the generator 1 or the load 5 such as an electric facility may be a power accumulating device such as a battery or a capacitor. By incorporating the power accumulating device in the power transmission system in this embodiment, it is possible to effectively utilize electric power generated in a time period when power consumption is small or electric power is not consumed. It is possible to improve power efficiency in the entire power transmission system.

Figure 2:
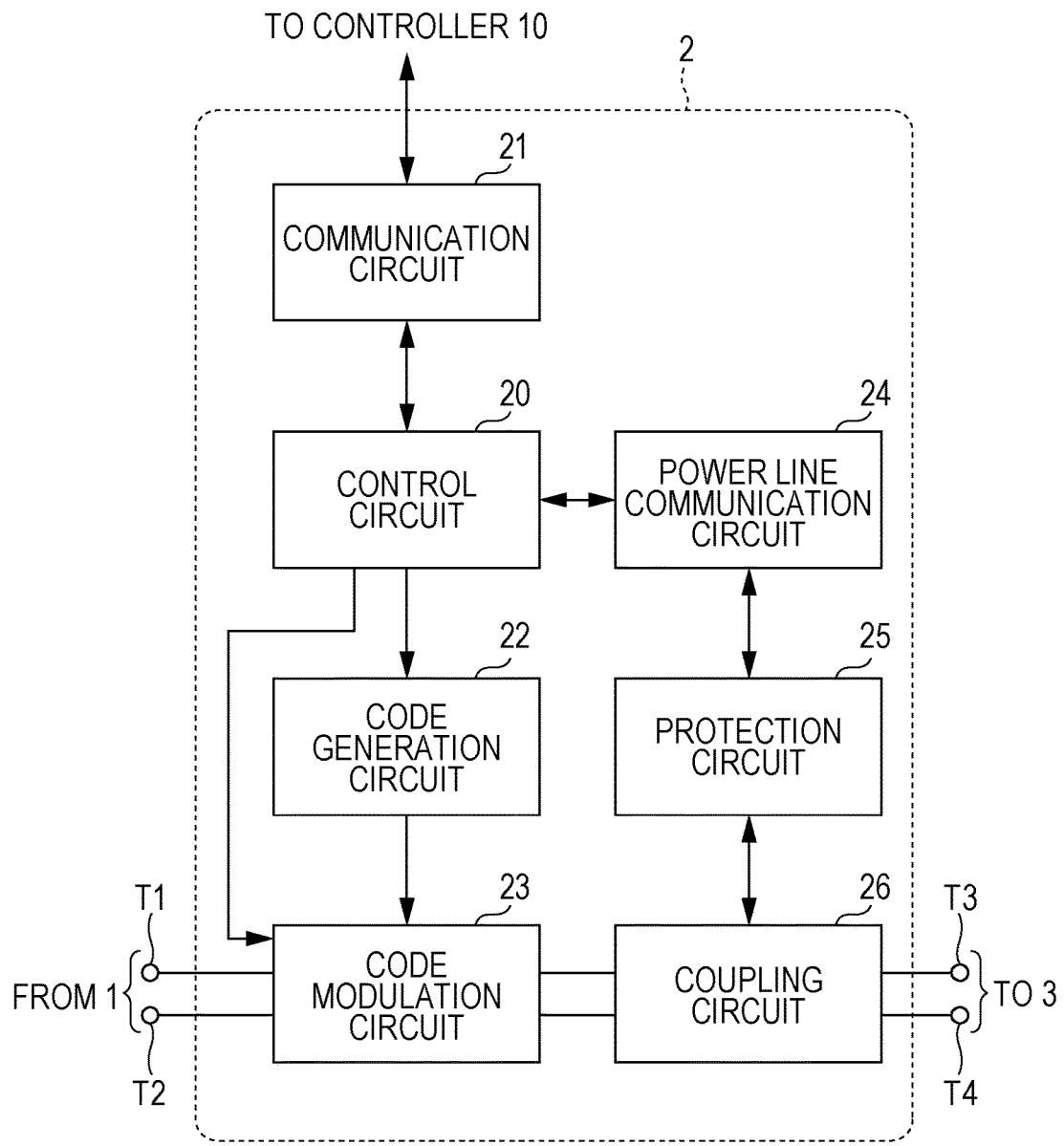
FIG. 2 is a block diagram illustrating a configuration example of a code modulator according to the first embodiment.

FIG. 2 is a block diagram illustrating the configuration of the code modulator 2 illustrated in FIG. 1. The code modulator 2 illustrated in FIG. 2 includes a control circuit 20, a communication circuit 21, a code generation circuit 22, a code modulation circuit 23, a power line communication circuit 24, a protection circuit 25, and a coupling circuit 26. The code modulator 2 illustrated in FIG. 2 includes input terminals T1 and T2 connected to the generator 1 and output terminals T3 and T4 connected to the wired transmission line 3.

The communication circuit 21 receives a system synchronization signal and a control signal including a code sequence (or original data of the code sequence) of a modulation code and a start time and an end time of power transmission from the controller 10 and sends the system synchronization signal and the control signal to the control circuit 20. The communication circuit 21 may be a wireless communication circuit or may be a wired communication circuit. Based on the control signal received from the controller 10, the control circuit 20 causes the code generation circuit 22 to generate a code sequence of a modulation code and output the code sequence to the code modulation circuit 23 and controls an operation start and an operation end of the code modulation circuit 23. The code modulation circuit 23 modulates electric power input from the generator 1 via the input terminals T1 and T2 and outputs the modulated power to the wired transmission line 3 via the output terminals T3 and T4.

The control circuit 20 transmits and receives a control signal for preparation for power transmission between the control circuit 20 and the code demodulator 4 using the power line communication circuit 24, the protection circuit 25, and the coupling circuit 26. The power line communication circuit 24 is connected to the wired transmission line 3 via the protection circuit 25 and the coupling circuit 26. The coupling circuit 26 is inserted between the code modulation circuit 23 and the output terminals T3 and T4. When large electric power related to the power transmission is input to the power line communication circuit 24, the power line communication circuit 24 is likely to break down. Therefore, electric power of the power transmission is suppressed by the protection circuit 25 such that the electric power related to the power transmission does not enter the power line communication circuit 24 from the coupling circuit 26. For example, when the frequency of the control signal and the frequency of the power transmission are different, the protection circuit 25 may be a frequency filter that suppresses the electric power of the power transmission and allows only the control signal to pass. Alternatively, when the control signal and the electric power are transmitted in a time division manner, the protection circuit 25 may include a switch circuit turned off in a time section allocated to the power transmission.

Figure 3:
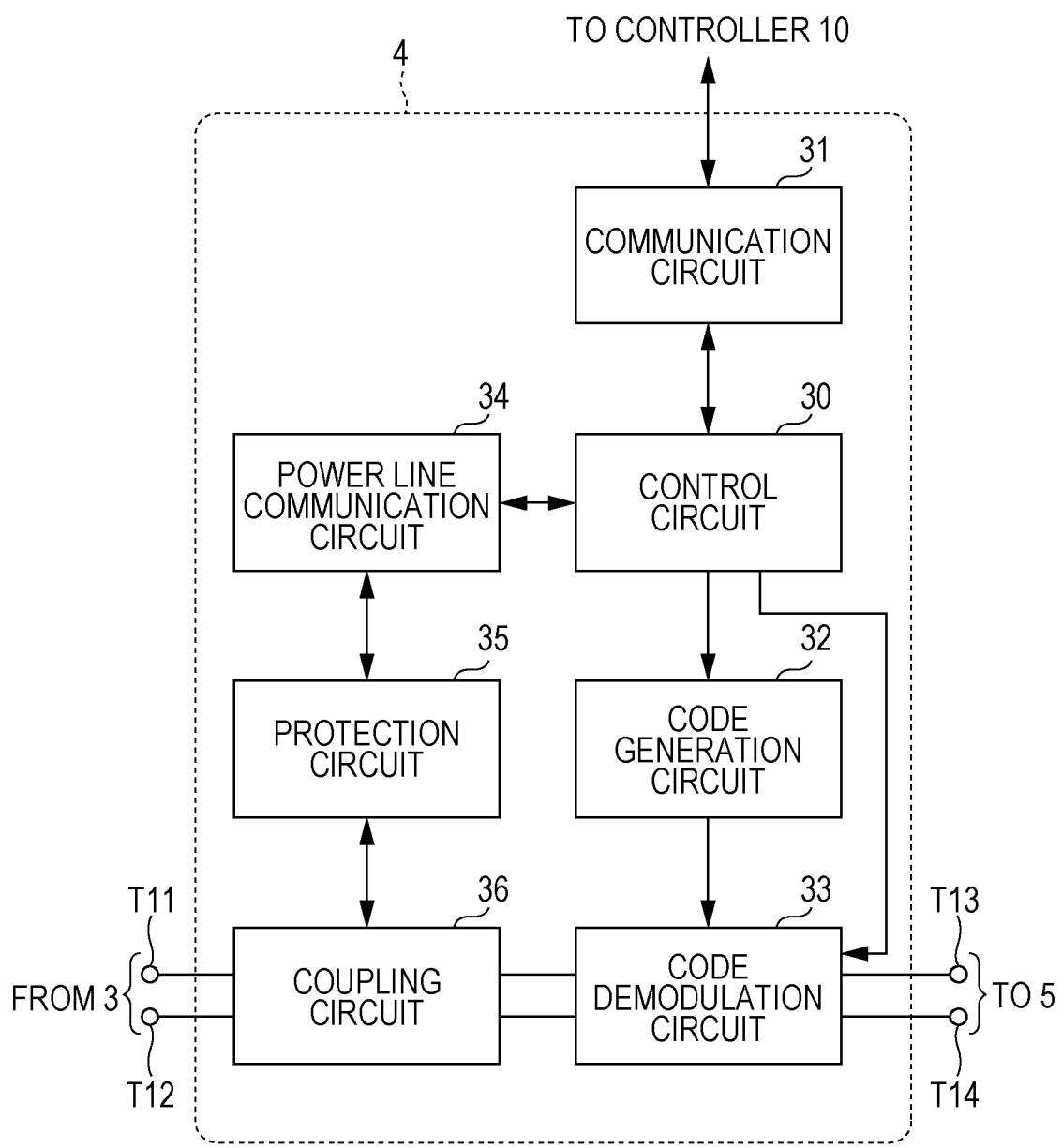
FIG. 3 is a block diagram illustrating a configuration example of a code demodulator according to the first embodiment.

FIG. 3 is a block diagram illustrating the configuration of the code demodulator 4 illustrated in FIG. 1. The code demodulator 4 illustrated in FIG. 3 includes a control circuit 30, a communication circuit 31, a code generation circuit 32, a code demodulation circuit 33, a power line communication circuit 34, a protection circuit 35, and a coupling circuit 36. The code demodulator 4 illustrated in FIG. 3 includes input terminals T11 and T12 connected to the wired transmission line 3 and output terminals T13 and T14 connected to the load 5.

The communication circuit 31 receives a system synchronization signal and a control signal including a code sequence (or original data of the code sequence) of a demodulation code and a start time and an end time of power transmission and sends the system synchronization signal and the control signal to the control circuit 30. The communication circuit 31 may be a wireless communication circuit or may be a wired communication circuit. Based on the control signal received from the controller 10, the control circuit 30 causes the code generation circuit 32 to generate a code sequence of a demodulation code and output the code sequence to the code demodulation circuit 33 and controls an operation start and an operation end of the code demodulation circuit 33. The code demodulation circuit 33 demodulates electric power input from the wired transmission line 3 via the input terminals T11 and T2 and outputs the demodulated electric power to the load 5 via the output terminals T13 and T14.

The control circuit 30 transmits and receives a control signal for preparation for power transmission between the control circuit 30 and the code modulator 2 using the power line communication circuit 34, the protection circuit 35, and the coupling circuit 36. The power line communication circuit 34 is connected to the wired transmission line 3 via the protection circuit 35 and the coupling circuit 36. The coupling circuit 36 is inserted between the code demodulation circuit 33 and the input terminals T11 and T12. When large electric power related to the power transmission is input to the power line communication circuit 34, the power line communication circuit 34 is likely to break down. Therefore, electric power of the power transmission is suppressed by the protection circuit 35 such that the electric power related to the power transmission does not enter the power line communication circuit 34 from the coupling circuit 36. For example, when the frequency of the control signal and the frequency of the power transmission are different, the protection circuit 35 may be a frequency filter that suppresses the electric power of the power transmission and allows only the control signal to pass. Alternatively, when the control signal and the electric power are transmitted in a time division manner, the protection circuit 35 may include a switch circuit turned off in a time section allocated to the power transmission.

Note that, in the power transmission system illustrated in FIG. 1, the control signals from the controller 10 to the code modulator 2 and the code demodulator 4 may be transmitted by wire or by a control signal line different from the wired transmission line 3 or may be multiplexed with a code-modulated wave according to a predetermined multiplexing scheme and transmitted. In the latter case, the communication circuits 21 and 31 used for the communication from the controller 10 to the code modulator 2 and the code demodulator 4 can be removed to reduce cost.

A method of modulating and demodulating electric power using code modulation is explained with reference to FIGS. 4 to 14.

Figure 4:
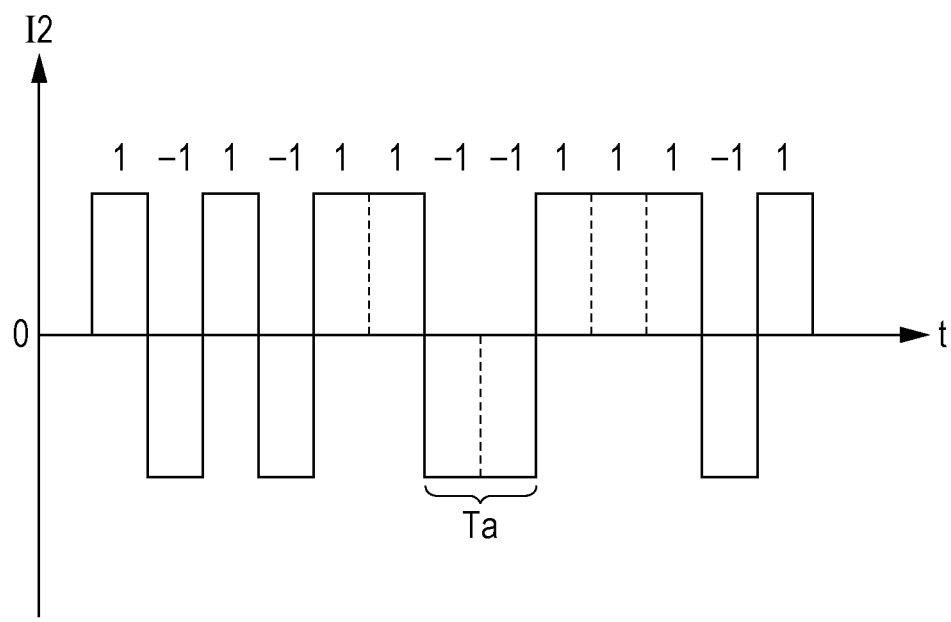
FIG. 4 is a waveform chart illustrating a signal waveform example of a modulated current according to the first embodiment.
Figure 5:
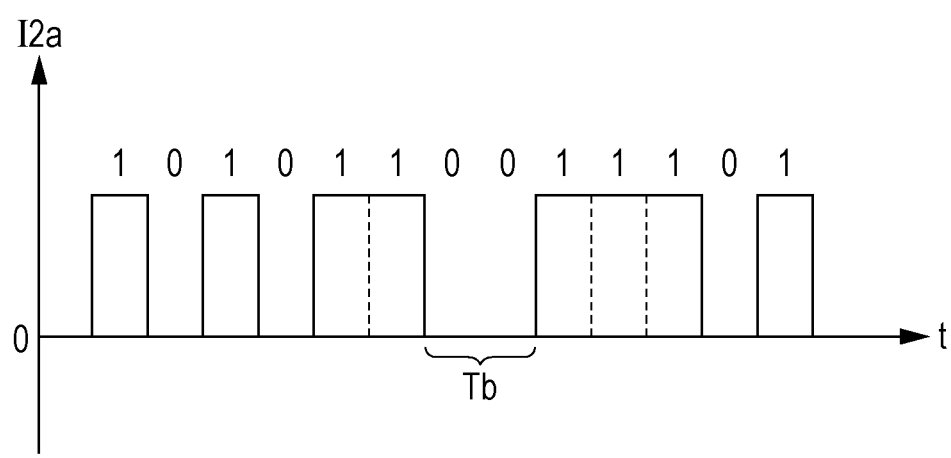
FIG. 5 is a waveform chart illustrating a signal waveform example of a modulated current of a communication system according to a comparative example.

FIG. 4 is a waveform chart illustrating a signal waveform example of a modulated current I2 of the power transmission system illustrated in FIG. 1. FIG. 5 is a waveform chart illustrating a signal waveform example of a modulated current I2a of a communication system according to a comparative example.

The code modulator 2 illustrated in FIG. 1 code-modulates, using a predetermined code sequence of a modulation code, an electric current of electric power generated in the generator 1. At this point, as illustrated in FIG. 4, the code modulator 2 converts the electric power into, for example, a modulated wave having "1" and "−1". Therefore, a code-modulated wave modulated by the code modulator 2 is an alternating current. Note that, as an example, an example is explained in which a direct-current power is code-modulated. However, an alternating-current power may be code-modulated as explained below.

For example, in a data transmission system according to the comparative example used in communication, usually, as illustrated in FIG. 5, code modulation is performed using "1" and "0". However, in a code-modulated wave illustrated in FIG. 5, when modulation code is "0", modulated current or electric power is "0". Thus, there is a period in which electric power is not transmitted (a period Tb in FIG. 5). Therefore, it is likely that deterioration of transmission efficiency of electric power is caused as a whole because of the period in which electric power is not transmitted. That is, in the case of communication, it is desired to transmit information such as data accurately in synchronization. Therefore, "0" or "1" only has to be accurately distinguished by a code demodulator. However, in the transmission of the electric power, from the viewpoint of high efficiency use of energy, a loss of the electric power due to the period in which the electric power is not transmitted cannot be allowed. Consequently, as illustrated in FIG. 4, it is possible to transmit the electric power at high transmission efficiency compared with the comparative example, according to the power transmission for transmitting electric power using the alternating-current code-modulated wave in which the signs "1" and "−1" are used.

Figure 6:
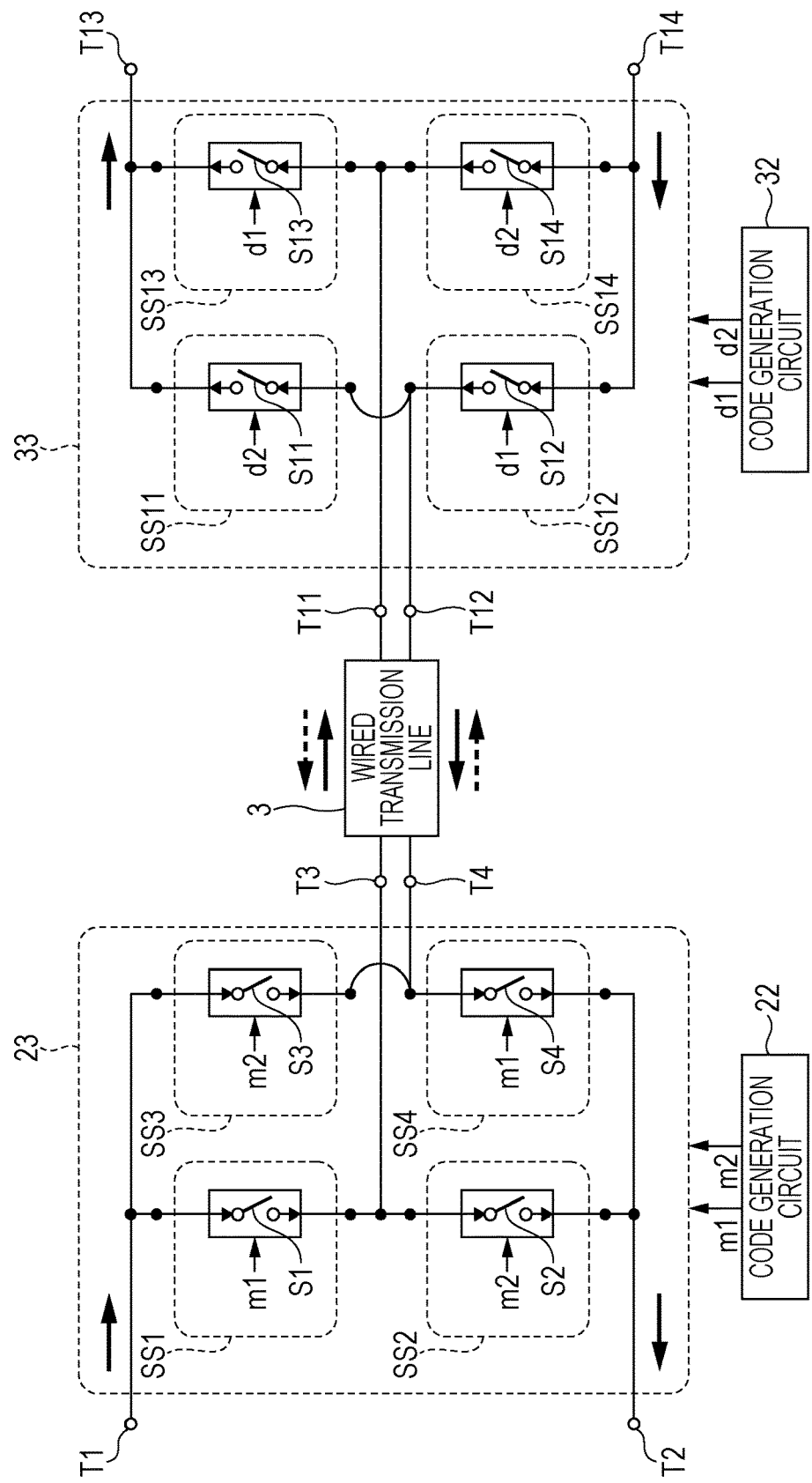
FIG. 6 is a circuit diagram illustrating a configuration example of a code modulation circuit and a code demodulation circuit according to the first embodiment.

FIG. 6 is a circuit diagram illustrating the configuration of a code modulation circuit 23 illustrated in FIG. 2 and the code demodulation circuit 33 illustrated in FIG. 3. In FIG. 6, for simplification of illustration, the coupling circuit 26 illustrated in FIG. 2 and the coupling circuit 36 illustrated in FIG. 3 are omitted. In FIG. 6, the code modulation circuit 23 includes four switch circuits SS1 to SS4 connected in a bridge form. The switch circuits SS1 to SS4 respectively include directional switches S1 to S4 configured by, for example, MOS transistors. The code demodulation circuit 33 includes four switch circuits SS11 to SS14 connected in a bridge form. The switch circuits SS11 to SS14 respectively include directional switches S11 to S14 configured by, for example, MOS transistors.

The code generation circuit 22 generates predetermined code sequences m1 and m2, applies the code sequence m1 to the switches S1 and S4 as a control signal, and applies the code sequence m2 to the switches S2 and S3 as a control signal. For example, the switches S1 to S4 are turned on when a control signal "1" is applied to the switches S1 to S4. The switches S1 to S4 are turned off when the control signal "0" is applied to the switches S1 to S4. Note that switches other than the switches S1 to S4 operate in the same manner. The switches S1 to S4 have directionality as explained below. The switch S1 outputs a generated current input from the terminal T1 when the switch S1 is on to the terminal T3. The switch S3 outputs a generated current input from the terminal T1 when the switch S3 on to the terminal T4. The switch S2 outputs a modulated current input from the terminal T3 when the switch S2 is on to the terminal T2. The switch S4 outputs a modulated current input from the terminal T4 when the switch S4 is on to the terminal T2.

The code generation circuit 32 generates predetermined code sequences d1 and d2, applies the code sequence d1 to the switches S12 and S13 as a control signal, and applies the code sequence d2 to the switches S11 and S14 as a control signal. The switches S11 to S14 have directionality as explained below. The switch S11 outputs a modulated current input from the terminal T12 when the switch S11 is turned on to the terminal T13. The switch S13 outputs a modulated current input from the terminal T11 when the switch S13 is turned on to the terminal T13. The switch S12 outputs a demodulated current input from the terminal T14 when the switch S12 is turned on to the terminal T12. The switch S14 outputs a demodulated current input from the terminal T14 when the switch S14 is turned on to the terminal T11.

Note that, in the description in FIG. 6, a direction in which an electric current flows in the switches S11 to S14 of the code demodulator 4 is described as being opposite to a direction in which an electric current flows in the switches S1 to S4 of the code modulator 2.

Table 1 illustrates an example of code sequences of the control signals m1 and m2 applied to the switches S1 to S4 of the code modulator 2 and illustrates an example of code sequences of the control signals d1 and d2 applied to the switches S11 to S14 of the code demodulator 4.

TABLE 1

| Control signal | Code sequence |
| --- | --- |
| m1 | c1a = [1 0 1 1 1 0 0] |
| m2 | c1b = [0 1 0 0 0 1 1] |
| d1 | c1a = [1 0 1 1 1 0 0] |
| d2 | c1b = [0 1 0 0 0 1 1] |

As illustrated in Table 1, a code sequence c1a of the control signal m1 is the same as the code sequence c1a of the control signal d1. A code sequence c1b of the control signal m2 is the same as the code sequence c1b of the control signal d2. Concerning a relation between the code sequence c1a and the code sequence c1b, a value of the code sequence c1b is "0" when a value of the code sequence c1a is "1". The value of the code sequence c1b is "1" when the value of the code sequence c1a is "0".

In the code modulation circuit 23 illustrated in FIG. 6, the code sequence c1a is applied to the switches S1 and S4 and the code sequence c1b is applied to the switches S2 and S3. Therefore, when the switches S1 and S4 are turned on, the switches S2 and S3 are turned off. When the switches S1 and S4 are turned off, the switches S2 and S3 are turned on. Consequently, when the switches S1 and S4 are turned on and the switches S2 and S3 are turned off, a positive modulated current I2 (a solid line arrow in FIG. 6) corresponding to "1" flows to the wired transmission line 3. On the other hand, when the switches S1 and S4 are turned off and the switches S2 and S3 are turned on, a negative modulated current I2 (a dotted line arrow in FIG. 6) in the opposite direction corresponding to "−1" flows to the wired transmission line 3. Consequently, as illustrated in FIG. 4, the modulated current I2 modulated to an alternating current of "−+1" and "−1" in response to an input of direct-current power can be transmitted to the wired transmission line 3.

In the code demodulation circuit 33 illustrated in FIG. 6, the switches S11 to S14 are turned on and off in response to the control signals of the code sequences d1 and d2 in synchronization with the code modulation circuit 23. The switches S12 and S13 are turned on and off according to the code sequence d1 same as the code sequence m1. The switches S11 and S14 are turned on and off according to the code sequence d2 same as the code sequence m2.

Consequently, when a value of the code sequence m1 is "1" in the code modulation circuit 23, that is, when the modulated current I2 corresponding to "+1" flows to the wired transmission line 3, a value of the code sequence d1 is "1" and the switches S13 and S12 are turned on and the switches S11 and S14 are turned off. Consequently, a demodulated current I3 (a solid line arrow in FIG. 6) corresponding to "+1" flows to the output terminals T13 and T14 of the code demodulation signal 33. When the value of the code sequence m1 is "0" in the code modulation circuit 23, that is, when the modulated current I2 of "−1" flows to the wired transmission line 3, the value of the code sequence d1 is "0" and the switches S11 and S14 are turned on and the switches S12 and S13 are turned off. Consequently, in this case, the demodulated current I3 (the solid line arrow in FIG. 6) corresponding to "+1" also flows to the output terminals T13 and T14 of the code demodulation circuit 33.

Table 2 illustrates an example of code sequences of the control signals m1 and m2 applied to the switches S1 to S4 of the code modulator 2 and an example of code sequences of the control signals d1 and d2 applied to the switches S11 to S14 of the code demodulator 4.

TABLE 2

| Control signal | Code sequence |
| --- | --- |
| m1 | [c1a c1b] = [1 0 1 1 1 0 0 0 1 0 0 0 1 1] |
| m2 | [c1b c1a] = [0 1 0 0 0 1 1 1 0 1 1 1 0 0] |
| d1 | [c1a c1b] = [1 0 1 1 1 0 0 0 1 0 0 0 1 1] |
| d2 | [c1b c1a] = [0 1 0 0 0 1 1 1 0 1 1 1 0 0] |

Concerning the code sequences c1a and c1b, when the number of "1"s and the number of "0"s are the same, in averaged, the code-modulated modulated current I2 flowing to the wired transmission line 3 does not have a direct-current component and has only an alternating-current component. However, the number of "1"s and the number of "0"s sometimes cannot be set the same depending on a code sequent. In this case, as illustrated in Table 2, the code sequence m1 and the code sequence d1 are set to a code sequence [c1a c1b] obtained by coupling the code sequence c1a and the code sequence c1b in a cascade and the code sequence m2 and the code sequence d2 are set to a code sequence [c1b c1a] obtained by coupling the code sequence c1b and the code sequence c1a in a cascade. Then, an average of the code-modulated modulated current I2 flowing to the wired transmission line 3 changes to 0. Only an alternating-current component can be transmitted. Consequently, an average of modulation waves of the modulated current I2 changes to 0. Transmission only with the alternating current without a direct-current component is performed. It is possible to perform power transmission with high transmission efficiency.

Figure 7A:
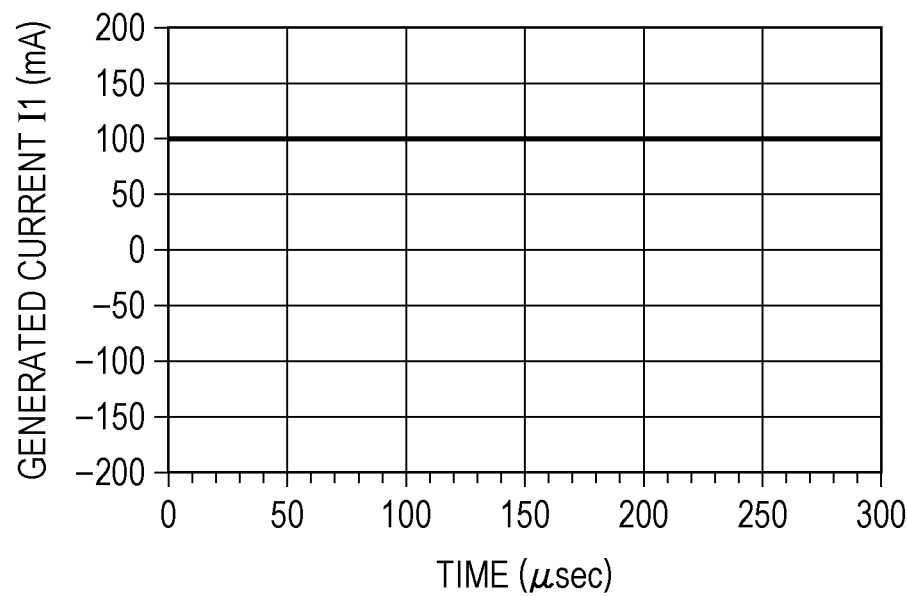
FIG. 7A is a waveform chart illustrating a signal waveform example of a generated current according to the first embodiment.
Figure 7B:
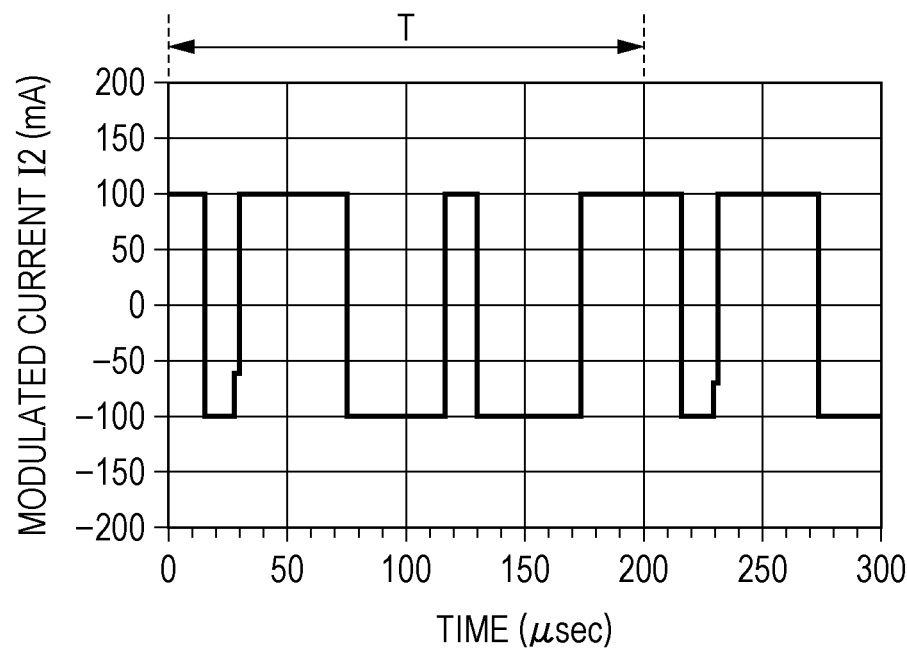
FIG. 7B is a waveform chart illustrating a signal waveform example of a modulated current according to the first embodiment.
Figure 7C:
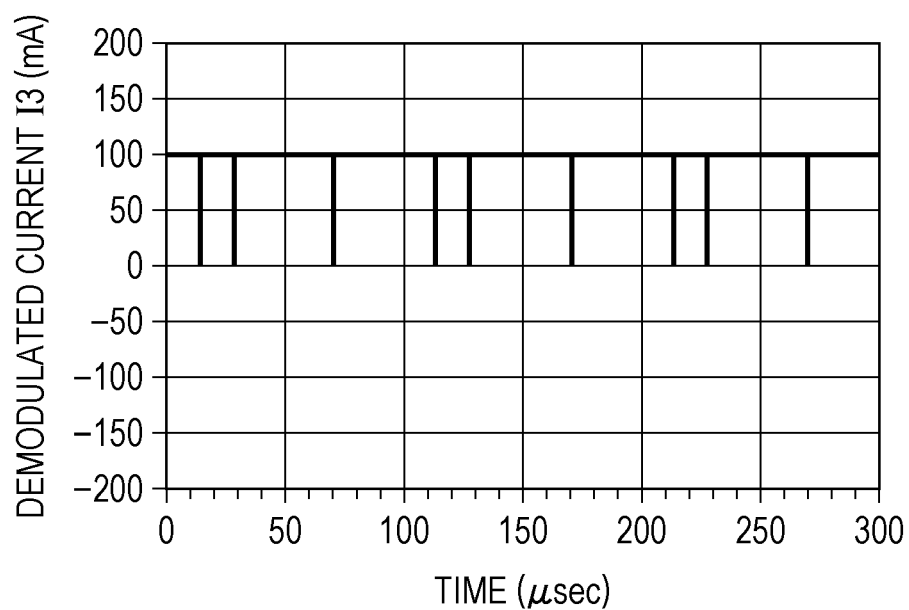
FIG. 7C is a waveform chart illustrating a signal waveform example of a demodulated current according to the first embodiment.

FIG. 7A is a waveform chart illustrating a signal waveform example of the generated current I1 of the power transmission system illustrated in FIG. 1. FIG. 7B is a waveform chart illustrating a signal waveform example of the modulated current I2 of the power transmission system illustrated in FIG. 1. FIG. 7C is a waveform chart illustrating a signal waveform example of the demodulated current I3 of the power transmission system illustrated in FIG. 1. Note that, in FIG. 7B, T indicates a period for one cycle of the code sequence m1 of the modulated code. The same applies in the drawings referred to below. The code demodulator 4 illustrated in FIG. 1 can, by multiplying the modulation code m1 used for the code modulation with the same demodulation code d1, restore direct-current electric power generated by the generator 1. As an example, the code sequence m1 of the modulation code and the code sequence d1 of the demodulation code are respectively represented by the following expressions.

$$m1 = [1\ -1\ 1\ 1\ 1\ -1\ -1\ -1\ 1\ -1\ -1\ -1\ 1\ 1] \quad (1)$$

$$d1 = m1 = [1\ -1\ 1\ 1\ 1\ -1\ -1\ -1\ 1\ -1\ -1\ -1\ 1\ 1] \quad (2)$$

In this example, the generated direct current I1 (FIG. 7A) is multiplied with the code sequence m1 of the modulation code having a frequency of 70 kHz and including "1" and "−1" to generate the modulated current I2 (FIG. 7B) of the code-modulated wave. In this case, time width of one code is 1/(70 kHz)=14.2 microseconds. Subsequently, the modulated current I2 (the code sequence m1) of the code-modulated wave is multiplied with the code sequence d1 of the demodulation code to obtain the following expression:

$$m1 \times d1 = [1\ 1\ 1\ 1\ 1\ 1\ 1\ 1\ 1\ 1\ 1\ 1\ 1\ 1] \quad (3)$$

As it is evident from Expression (3), it is seen that the demodulated current I3 (FIG. 7C) of the original direct current is obtained.

As explained above, it is possible to realize accurately synchronized power transmission of a direct current without a power loss by using the code modulator 2 and the code demodulator 4 according to this embodiment. For example, it is possible to efficiently perform transmission of electric power in a longer time by, for example, repeatedly using the code sequence m1 of the modulation code.

Further, the code sequence m1 of the modulation code can be divided in a code sequence m1a of the former half of the code sequence m1 and a code sequence m1b of the latter half of the code sequence m1 as indicated by the following expressions:

$$m1a = [1\ -1\ 1\ 1\ 1\ -1\ -1] \quad (4)$$

$$m1b = [-1\ 1\ -1\ -1\ -1\ 1\ 1] \quad (5)$$

The code sequence m1b is a code sequence obtained by code-inverting values of the code sequence m1a (e.g., "1" in m1a is "−1" in m1b, "−1" in m1a is "1" in m1b).

By deciding the code sequence m1 as a sum of the code sequences m1a and m1b in this way, an average of modulated waves changes to 0. Transmission in only an alternating current without a direct-current component is performed. There is an advantage that it is possible to perform power transmission with high transmission efficiency.

As explained above, when the input of the code modulator 2 is the direct-current power, in the output terminals T13 and T14 of the code demodulation circuit 33 of the code demodulator 4, it is possible to extract the demodulated direct current I3 same as the generated current I1 input to the code modulator 2. Therefore, according to this embodiment, after the generated direct current I1 is modulated into the modulated current I2 of the code-modulated alternating current, it is possible to transmit the modulated current I2 via the wired transmission line 3 and demodulate the modulated current I2 into the demodulated direct current I3.

A method of modulating and demodulating electric power by a power transmission system according to a modification 1 of the first embodiment is explained with reference to FIGS. 8 and 9 and FIGS. 10A to 10C. The power transmission system according to the modification 1 of the first embodiment is configured the same as the power transmission system illustrated in FIG. 1 except a code modulation circuit of the code modulator 2 and a code demodulation circuit of the code demodulator 4.

Figure 8:
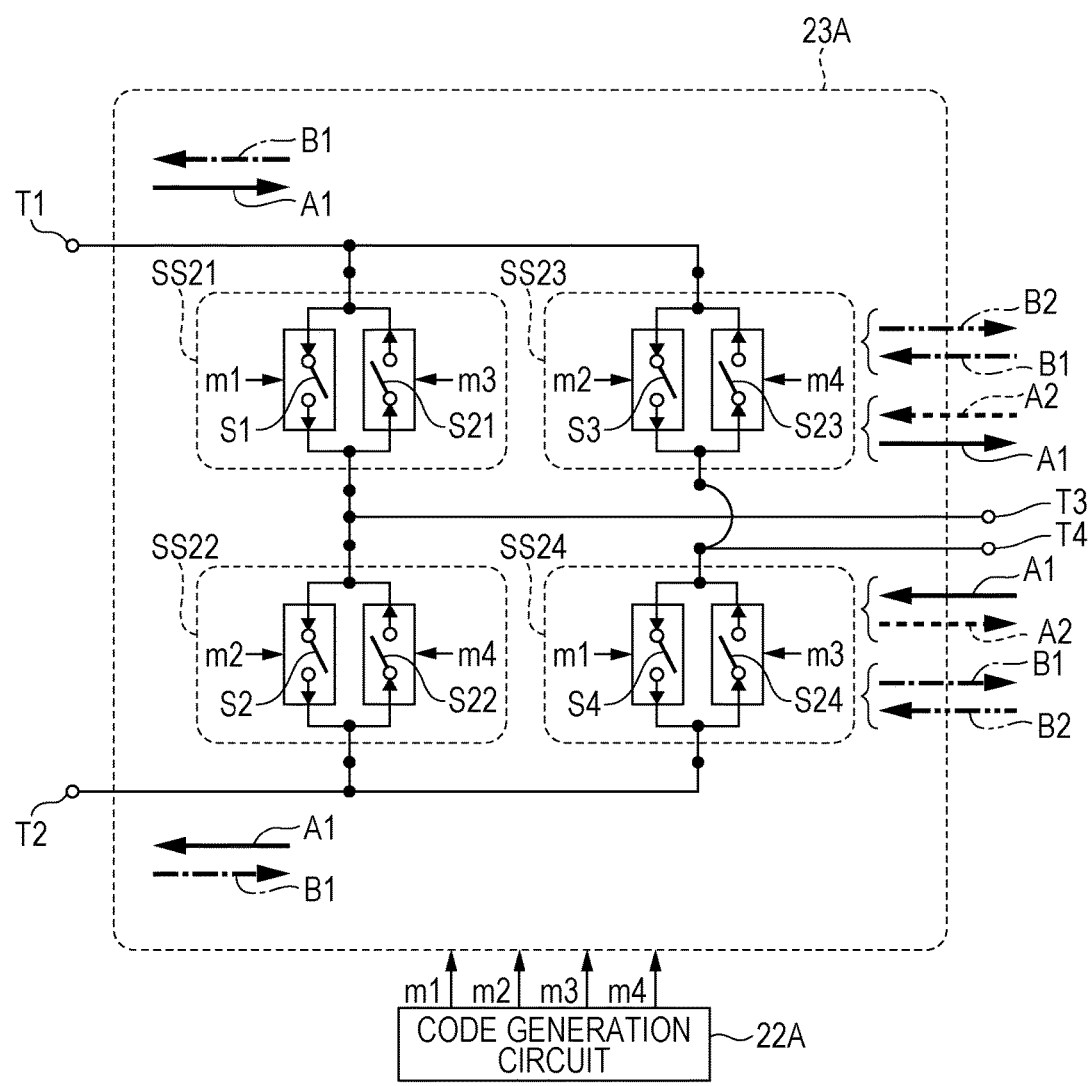
FIG. 8 is a circuit diagram illustrating the configuration of a code modulation circuit according to a modification 1 of the first embodiment.

FIG. 8 is a circuit diagram illustrating the configuration of a code modulation circuit 23A of the power transmission system according to the modification 1 of the first embodiment. In FIG. 8, for simplification of illustration, the coupling circuit 26 illustrated in FIG. 2 is omitted. In FIG. 8, the code modulation circuit 23A is different from the code modulation circuit 23 illustrated in FIG. 6 in the following points.

(1) The code modulation circuit 23A includes, respectively instead of the unidirectional switches SS1 to SS4, four directional switch circuits SS21 to SS24 connected in a bridge form.

(2) The code modulation circuit 23A includes, instead of the code generation circuit 22, a code generation circuit 22A that generates four code sequences m1 to m4 and outputs the code sequences m1 to m4 to the code modulation circuit 23A as control signals.

In the code modulation circuit 23A illustrated in FIG. 8, the switch circuit SS21 includes, in addition to the switch S1 illustrated in FIG. 6 turned on and off in response to the control signal m1, a switch S21 having a direction opposite to the direction of the switch S1 and connected in parallel to the switch S1 and turned on and off in response to the control signal m3. The switch circuit SS22 includes, in addition to the switch S2 illustrated in FIG. 6 turned on and off in response to the control signal m2, a switch S22 having a direction opposite to the direction of the switch S2 and connected in parallel to the switch S2 and turned on and off in response to the control signal m4. The switch circuit SS23 includes, in addition to the switch S3 illustrated in FIG. 6 turned on and off in response to the control signal m2, a switch S23 having a direction opposite to the direction of the switch S3 and connected in parallel to the switch S3 and turned on and off in response to the control signal m4. The switch circuit SS24 includes, in addition to the switch S4 illustrated in FIG. 6 turned on and off in response to the control signal m1, a switch S24 having a direction opposite to the direction of the switch S4 and connected in parallel to the switch S4 and turned on and off in response to the control signal m3. Note that the switches S21 to S24 are configured by, for example, MOS transistors. The code modulation circuit 23A includes the terminals T1 and T2 connected to the generator 1 and the terminals T3 and T4 connected to the wired transmission line 3. An alternating-current power from the generator 1 is input to the code modulation circuit 23A. After code-modulating the alternating-current power, the code modulation circuit 23A outputs a code-modulated modulated wave to the wired transmission line 3.

Figure 9:
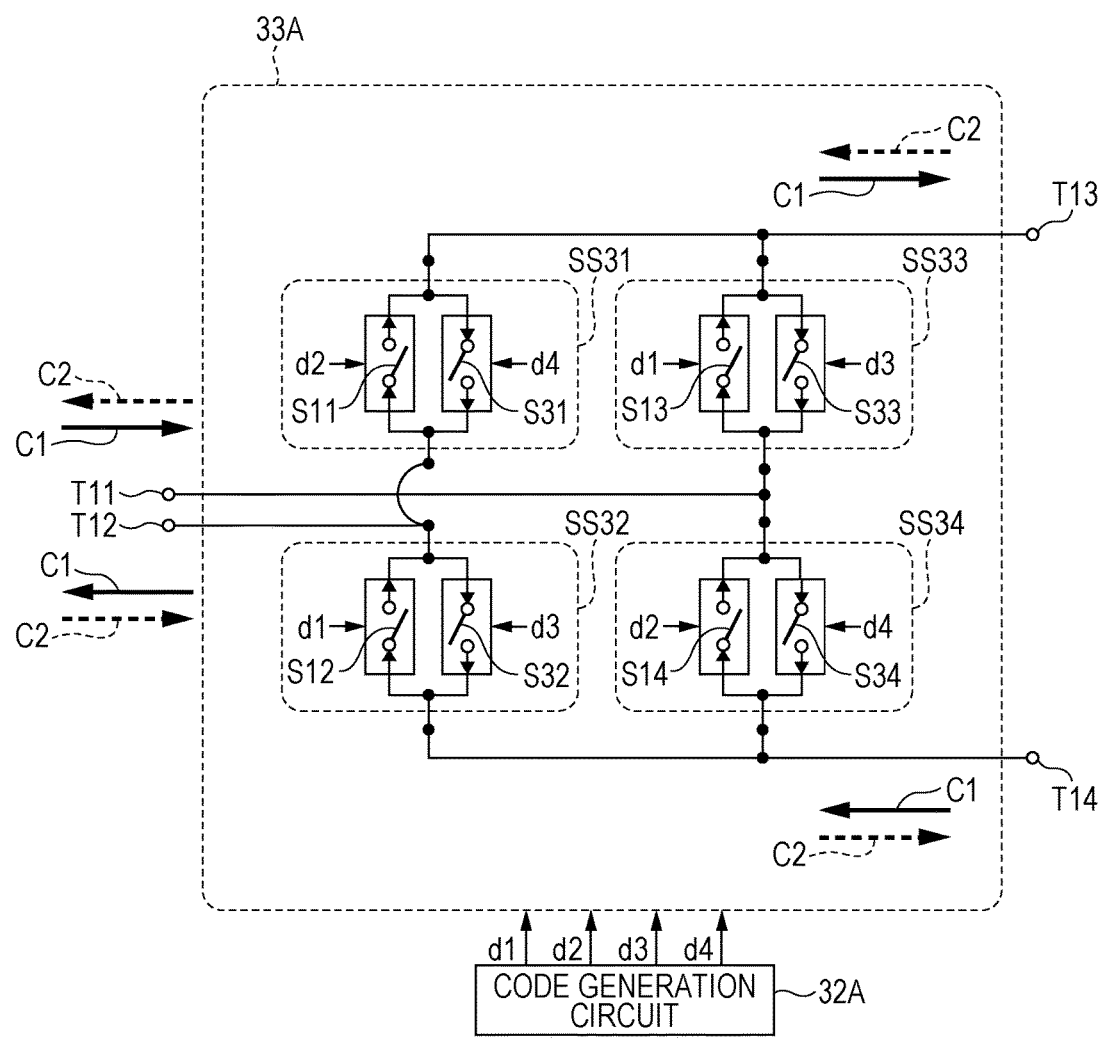
FIG. 9 is a circuit diagram illustrating the configuration of a code demodulation circuit according to the modification 1 of the first embodiment.

FIG. 9 is a circuit diagram illustrating the configuration of the code demodulation circuit 33A of the power transmission system according to the modification 1 of the first embodiment. In FIG. 9, for simplification illustration, the coupling circuit 36 illustrated in FIG. 3 is omitted. In FIG. 9, the code demodulation circuit 33A is different from the code demodulation circuit 33 illustrated in FIG. 6 in the following points.

(1) The code demodulation circuit 33A includes, respectively instead of the unidirectional switch circuits SS11 to SS14, four bidirectional switch circuits SS31 to SS34 connected in a bridge form.

(2) The code demodulation circuit 33A includes, instead of the code generation circuit 32, a code generation circuit 32A that generates four code sequences d1 to d4 and outputs the code sequences d1 to d4 to the code demodulation circuit 33A as control signals.

In the code demodulation circuit 33A illustrated in FIG. 9, the switch circuit SS31 includes, in addition to the switch S11 illustrated in FIG. 6 turned on and off in response to the control signal d2, a switch S31 having a direction opposite to the direction of the switch S11 and connected in parallel to the switch S11 and turned on and off in response to the control signal d4. The switch circuit SS32 includes, in addition to the switch S12 illustrated in FIG. 6 turned on and off in response to the control signal d1, a switch S32 having a direction opposite to the direction of the switch S12 and connected in parallel to the switch S12 and turned on and off in response to the control signal d3. The switch circuit SS33 includes, in addition to the switch S13 illustrated in FIG. 6 turned on and off in response to the control signal d1, a switch S33 having a direction opposite to the direction of the switch S13 and connected in parallel to the switch S13 and turned on and off in response to the control signal d3. The switch circuit SS34 includes, in addition to the switch S14 illustrated in FIG. 6 turned on and off in response to the control signal d2, a switch S34 having a direction opposite to the direction of the switch S14 and connected in parallel to the switch S14 and turned on and off in response to the control signal d4. Note that the switches S31 to S34 are configured by, for example, MOS transistors. The code demodulation circuit 33A includes the terminals T11 and T12 connected to the wired transmission line 3 and the terminals T13 and T14 connected to the load 5. An alternating-current code-modulated wave from the wired transmission line 3 is input to the code demodulation circuit 33A. After code-demodulating the code-modulated wave into alternating-current demodulated power, the code demodulation circuit 33A outputs the demodulated power to the load 5.

Table 3 illustrates an example of code sequences of the control signals m1 to m4 input to the bidirectional switch circuits SS21 to SS24 of the code modulation circuit 23A and an example of code sequences of the control signals d1 to d4 input to the bidirectional switch circuits SS31 to SS34 of the code demodulation circuit 33A.

TABLE 3

| Control signal | Code sequence |
| --- | --- |
| m1 | [c1a c0] = [1 0 1 1 1 0 0 0 0 0 0 0 0 0] |
| m2 | [c1b c0] = [0 1 0 0 0 1 1 0 0 0 0 0 0 0] |
| m3 | [c0 c1a] = [0 0 0 0 0 0 0 1 0 1 1 1 0 0] |
| m4 | [c0 c1b] = [0 0 0 0 0 0 0 0 1 0 0 0 1 1] |
| d1 | [c1a c0] = [1 0 1 1 1 0 0 0 0 0 0 0 0 0] |
| d2 | [c1b c0] = [0 1 0 0 0 1 1 0 0 0 0 0 0 0] |
| d3 | [c0 c1a] = [0 0 0 0 0 0 0 1 0 1 1 1 0 0] |
| d4 | [c0 c1b] = [0 0 0 0 0 0 0 0 1 0 0 0 1 1] |

As illustrated in Table 3, the code sequence of the control signal m1 and the code sequence of the control signal d1 are the same each other. The code sequence of the control signal m2 and the code sequence of the control signal d2 are the same each other. Similarly, the code sequence of the control signal m3 and the code sequence of the control signal d3 are the same each other. The code sequence of the control signal m4 and the code sequence of the control signal d4 are the same each other. As in the transmission of the direct-current power, concerning a relation between the code sequence c1a and the code sequence c1b, a value of the code sequence c1b is set to "0" when a value of the code sequence c1a is "1". The value of the code sequence c1b is set to "1" when the value of the code sequence c1a is "0". Time width of the code sequence c1d and the code sequence c1b are matched with a half cycle of an alternating current. That is, at time width at which an electric current in a former half portion of an alternating-current waveform is positive, the code sequence c1a and the code sequence c1b are respectively given to the code sequence m1 and the code sequence m2 and the switches S1 to S4 are controlled. At this point, the code sequence m3 and the code sequence m4 are always "0". The switches S21 to S24 are disconnected and an electric current does not flow. On the other hand, at time width at which an electric current in a latter half portion of the alternating-current waveform, the code sequence m1 and the code sequence m2 are always 0. The switches S1 to S4 are disconnected and an electric current does not flow. However, the code sequence c1a and the code sequence c1b are given to the code sequence m3 and the code sequence m4 and the switches S21 to S24 are controlled.

First, the operation of the code modulation circuit 23A is explained below. Operation performed when a positive electric current (a solid line arrow A1 and a dotted line arrow A2 in the input terminals T1 and T2 illustrated in FIG. 8) flows to the input terminals T1 and T2 is explained. In this case, when the switches S1 and S4, to which "1" of the code sequence c1a (the code sequence m1 in FIG. 8) is input, are turned on, the switches S2 and S3, to which "0" of the code sequence c1b (the code sequence m2 in FIG. 8) is input, are turned off. When the switches S1 and S4, to which "0" of the code sequence c1a (the code sequence m1 in FIG. 8) is input, are turned off, the switches S2 and S3, to which "1" of the code sequence c1b (the code sequence m2 in FIG. 8) is input, are turned on. Consequently, when the switches S1 and S4 are on and the switches S2 and S3 are off, an electric current having positive "1" (the solid line arrow A1 in the output terminals T3 and T4 illustrated in FIG. 8) flows to the wired transmission line 3. On the other hand, when the switches S1 and S4 are off and the switches S2 and S3 are on, an electric current having negative "−1" in the opposite direction (the dotted line arrow A2 in the output terminals T3 and T4 illustrated in FIG. 8) flows to the wired transmission line 3. Consequently, as illustrated in FIG. 10B, in response to an input of a positive electric current in an alternating current, an electric current modulated to an alternating current having "+1" and "−1" can be transmitted to the wired transmission line 3.

Operation performed when a negative electric current (an alternate long and short dash line arrow B1 in the input terminals T1 and T2 illustrated in FIG. 8) flows to the input terminals T1 and T2 is explained below. In this case, when the switches S21 and S24, to which "1" of the code sequence c1a (the code sequence m3 in FIG. 8) is input, are turned on, the switches S22 and S23, to which "0" of the code sequence c1b (the code sequence m4 in FIG. 8) is input, are turned off. When the switches S21 and S24, to which "0" of the code sequence c1a (the code sequence m3 in FIG. 8) is input, are turned off, the switches S22 and S23, to which "1" of the code sequence c1b (the code sequence m4 in FIG. 8) is input, are turned on. Consequently, when the switches S21 and S24 are on and the switches S22 and S23 are off, an electric current having negative "−1" (the alternate long and short dash line B1 in the output terminals T3 and T4 illustrated in FIG. 8) flows to the wired transmission line 3. On the other hand, when the switches S21 and S24 are off and the switches S22 and S23 are on, an electric current having positive "+1" in the opposite direction (an alternate long and two short dashes line B2 in the output terminals T3 and T4 illustrated in FIG. 8) flows to the wired transmission line 3. Consequently, as illustrated in FIG. 10B, in response to an input of a negative electric current in an alternating current, an electric current modulated to an alternating current of "−1" and "+1" can be transmitted to the wired transmission line 3.

As explained with reference to FIG. 8, when a positive electric current flows to the code modulation circuit 23A and when a negative electric current flows to the code modulation circuit 23A, the electric currents can be modulated into an alternating-current modulated wave illustrated in FIG. 10B.

The operation of the code demodulation circuit 33A illustrated in FIG. 9 is explained. First, it is assumed that a positive electric current (the solid line arrow A1 in the input terminals T1 and T2 illustrated in FIG. 8) flows to the input terminals T1 and T2 of the code modulation circuit 23A. In this case, an alternating modulated current is input to the input terminals T11 and T12 of the code demodulation circuit 33A via the wired transmission line 3. Therefore, a positive electric current (a solid line arrow C1 in the input terminals T11 and T12 illustrated in FIG. 9) and a negative electric current (a dotted line arrow C2 in the input terminals T11 and T12 illustrated in FIG. 9) are input. When demodulation operation is correctly performed in the code demodulation circuit 33A, as an electric current demodulated by the code demodulation circuit 33A, a positive electric current (the solid line arrow C1 in the output terminals T13 and T14 illustrated in FIG. 9) flows to the output terminals T13 and T14. These kinds of operation are explained below. In this case, 0 is input as all the code sequence d3 and the code sequence d4. All the switches S31 to S34 are turned off.

First, the operation of the code demodulation circuit 33A performed when a positive electric current (the solid line arrow C1 in the input terminals T11 and T12 illustrated in FIG. 9) is input to the input terminals T11 and T12 of the code demodulation circuit 33A is explained. A positive electric current flows to the input terminals T1 and T2 of the code modulation circuit 23A and a modulated wave (a modulated current flowing to the input terminals T11 and T12 of the code demodulation circuit 33A) is also a positive electric current. Therefore, a value of the code sequence c1a is "1". Therefore, the switches S12 and S13, to which "1" of the code sequence c1a (the code sequence d1 in FIG. 9) is input, are turned on. The switches S11 and S14, to which "0" of the code sequence c1b (the code sequence d2 in FIG. 9) is input, are turned off. Therefore, a positive electric current (the solid line arrow C1 in the output terminals T13 and T14 illustrated in FIG. 9) flows to the output terminals T13 and T14.

The operation of the code demodulation circuit 33A performed when a negative electric current (the dotted line arrow C2 in the input terminals T11 and T12 illustrated in FIG. 9) is input to the input terminals T11 and T12 of the code demodulation circuit 33A is explained. In this case, a positive electric current flows to the input terminals T1 and T2 of the code modulation circuit 23A. A modulated wave (an electric current flowing to the input terminals T11 and T12 of the code demodulation circuit 33A) is a negative electric current. Therefore, a value of the code sequence c1a is "0". Therefore, the switches S12 and S13, to which "0" of the code sequence c1a (the code sequence d1 in FIG. 9) is input, are turned off. The switches S11 and S14, to which "1" of the code sequence c1b (the code sequence d2 in FIG. 9) is input, are turned on. Therefore, a positive electric current (the solid line arrow C1 in the output terminals T13 and T14 in FIG. 9) flows to the output terminals T13 and T14. Consequently, as illustrated in FIG. 10C, in response to an input of an positive electric current in an alternating current (the solid line arrow A1 in the input terminals T1 and T2 illustrated in FIG. 8) to the code modulation circuit 23A, an electric current accurately demodulated to a positive electric current can be output to the load 5 by the code demodulation circuit 33A.

It is assumed that a negative electric current (the alternate long and short dash line B1 in the input terminals T1 and T2 illustrated in FIG. 8) flows to the input terminals T1 and T2 of the code modulation circuit 23A. In this case as well, a modulated alternating current is input to the input terminals T11 and T12 of the code demodulation circuit 33A via the wired transmission line 3. Therefore, a positive electric current (the solid line arrow C1 in the input terminals T11 and T12 illustrated in FIG. 9) and a negative electric current (the dotted line arrow C2 in the input terminals T11 and T12 illustrated in FIG. 9) are input. When the demodulation operation is correctly performed in the code demodulation circuit 33A, as an electric current demodulated by the code demodulation circuit 33A, a negative electric current (the dotted line arrow C2 in the output terminals T13 and T14 illustrated in FIG. 9) flows in the output terminals T13 and T14. These kinds of operation are explained below. In this case, 0 is input as all the code sequences d1 and d2. All the switches S11 to S14 are turned off.

First, the operation of the code demodulation circuit 33A performed when a negative electric current (the dotted line arrow C2 in the input terminals T11 and T12 illustrated in FIG. 9; a negative electric current same as the electric current flowing to the input terminals T1 and T2 of the code modulation circuit 23A) is input to the input terminals T11 and T12 of the code demodulation circuit 33A is explained. In this case, a negative electric current flows to the input terminals T1 and T2 of the code modulation circuit 23A. A modulated wave (an electric current flowing to the input terminals T11 and T12 of the code demodulation circuit 33A) is also a negative electric current. Therefore, a value of the code sequence c1a is "1". Therefore, the switches S32 and S33, to which "1" of the code sequence c1a (the code sequence d3 in FIG. 9) is input, are turned on. The switches S31 and S34, to which "0" of the code sequence c1b (the code sequence d4 in FIG. 9) is input, are turned off. Therefore, a negative electric current (the dotted line arrow C2 in the output terminals T13 and T14 illustrated in FIG. 9) flows to the output terminals T13 and T14.

The operation of the code demodulation circuit 33A performed when a positive electric current (the solid line arrow C1 in the input terminals T11 and T12 illustrated in FIG. 9) is input to the input terminals T11 and T12 of the code demodulation circuit 33A is explained. In this case, a negative electric current flows to the input terminals T1 and T2 of the code modulation circuit 23A. A modulated wave (an electric current flowing to the input terminals T11 and T12 of the code demodulation circuit 33A) is a positive electric current. Therefore, a value of the code sequence c1a is "0". Therefore, the switches S32 and S33, to which "0" of the code sequence c1a (the code sequence d3 in FIG. 9) is input, are turned off. The switches S31 and S34, to which "1" of the code sequence c1b (the code sequence d4 in FIG. 9) is input, are turned on. Therefore, a negative electric current (the dotted line arrow C2 in the output terminals T13 and T14 illustrated in FIG. 9) flows to the output terminals T13 and T14. Consequently, as illustrated in FIG. 10C, in response to an input of a negative electric current in an alternating current (the alternate long and short dash line arrow B1 in the input terminals T1 and T2 illustrated in FIG. 8) to the code modulation circuit 23A, an electric current accurately demodulated to a negative electric current can be output to the load 5 by the code demodulation circuit 33A.

As explained above, with this configuration, it is possible to modulate an electric current in an alternating current into an alternating current and demodulate the alternating current via the wired transmission line 3.

Table 4 illustrates an example of code sequences of the control signals m1 to m4 input to the bidirectional switch circuits SS21 to SS24 of the code modulation circuit 23A and an example of code sequences of the control signals d1 to d4 input to the bidirectional switch circuits SS31 to SS34 of the code demodulation circuit 33A.

TABLE 4

| Control signal | Code sequence |
| --- | --- |
| m1 | [c1a c1b] = [1 0 1 1 1 0 0 0 1 0 0 0 1 1] |
| m2 | [c1b c1a] = [0 1 0 0 0 1 1 1 0 1 1 1 0 0] |
| m3 | [c0 c0] = [0 0 0 0 0 0 0 0 0 0 0 0 0 0] |
| m4 | [c0 c0] = [0 0 0 0 0 0 0 0 0 0 0 0 0 0] |
| d1 | [c1a c1b] = [1 0 1 1 1 0 0 0 1 0 0 0 1 1] |
| d2 | [c1b c1a] = [0 1 0 0 0 1 1 1 0 1 1 1 0 0] |
| d3 | [c0 c0] = [0 0 0 0 0 0 0 0 0 0 0 0 0 0] |
| d4 | [c0 c0] = [0 0 0 0 0 0 0 0 0 0 0 0 0 0] |

In the code modulation circuit 23A illustrated in FIG. 8 and the code demodulation circuit 33A illustrated in FIG. 9, as illustrated in Table 4, when "0" is given to the code sequences m3, m4, d3, and d4 and the switches S21 to S24 and S31 to S34, to which the code sequences m3, m4, d3, and d4 are input, are turned off, a circuit configuration same as the circuit configuration of the code modulation circuit 23 and the code demodulation circuit 33 illustrated in FIG. 6 can be realized. That is, it is possible to realize direct-current power transmission illustrated in FIGS. 7A to 7C by giving code sequences consisting of the code sequences c1a and c1b respectively to the code sequences m1 and m2 and the code sequences d1 and d2 as illustrated in Table 4. Consequently, by changing the code sequences m1 to m4 and d1 to d4 using the code modulation circuit 23A illustrated in FIG. 8 and the code demodulation circuit 33A illustrated in FIG. 9, it is possible to realize an excellent power transmission system adaptable to both of direct-current power transmission and alternating-current power transmission. Examples of the direct-current generator 1 include a solar power generator. Examples of an alternating-current generator include thermal power, water power, wind power, nuclear power, and tidal power generators by rotation of turbines.

Figure 10A:
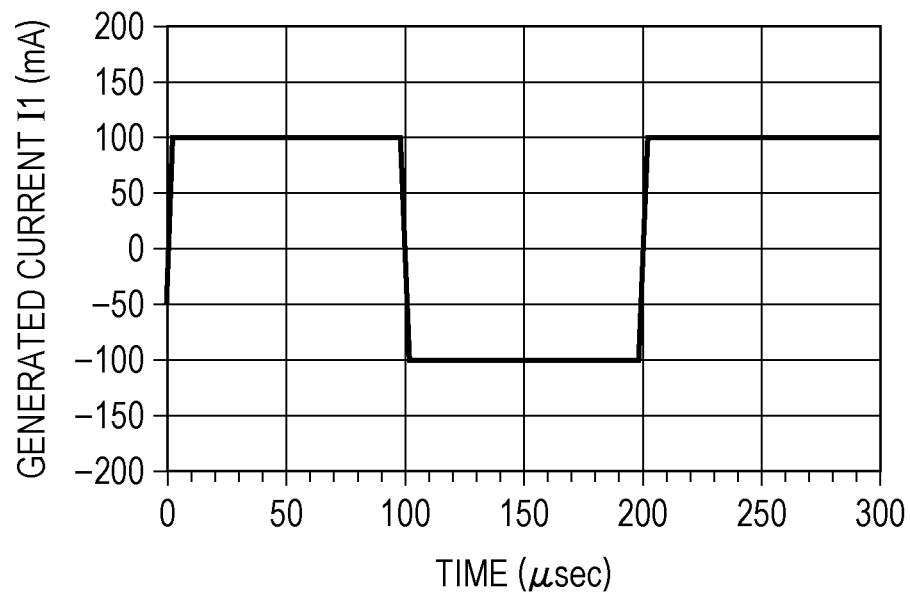
FIG. 10A is a waveform chart illustrating a signal waveform example of a generated current according to the modification 1 of the first embodiment.
Figure 10B:
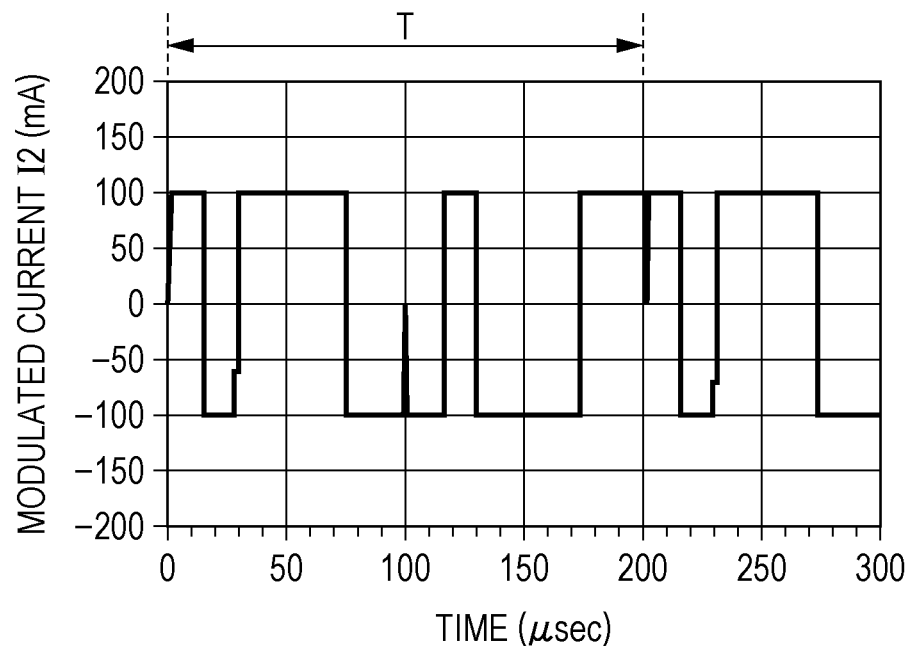
FIG. 10B is a waveform chart illustrating a signal waveform example of a modulated current according to the modification 1 of the first embodiment.
Figure 10C:
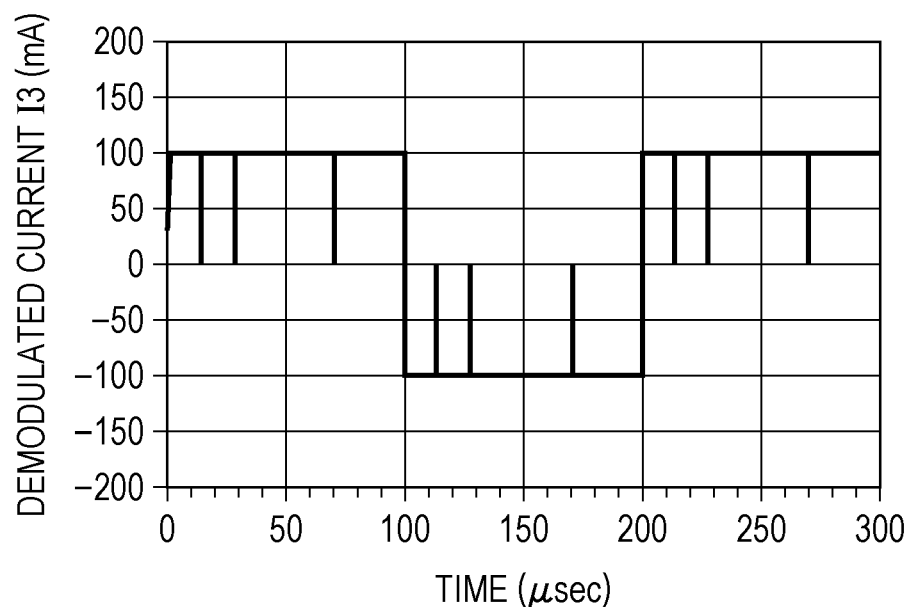
FIG. 10C is a waveform chart illustrating a signal waveform example of a demodulated current according to the modification 1 of the first embodiment.

FIG. 10A is a waveform chart illustrating a signal waveform example of the generated current I1 of the power transmission system according to the modification 1 of the first embodiment. FIG. 10B is a waveform chart illustrating a signal waveform example of the modulated current I2 of the power transmission system according to the modification 1 of the first embodiment. FIG. 10C is a waveform chart illustrating a signal waveform example of the demodulated current I3 of the power transmission system according to the modification 1 of the first embodiment. That is, FIGS. 10A to 10C are signal waveform examples at the time when, after the generated alternating current I1 is code-modulated by the code modulator 2, the modulated current I2 is transmitted via the wired transmission line 3 and code-demodulated by the code demodulator 4.

As the generated alternating current I1, as an example, a rectangular waveform having a frequency 5 kHz that cyclically repeats positive and negative at 200 microseconds is used. At this point, as at the time when the generated direct current I1 illustrated in FIGS. 7A to 7C is code-modulated, the code demodulator 4 can restore an alternating-current power generated by the generator 1 as illustrated in FIGS. 10A to 10C by multiplying the received modulated current I2 with a demodulation code same as a modulation code used for code modulation. The modulation code m1 of the code modulator 2 is represented by the following expression as an example:

$$m1 = [1\ -1\ 1\ 1\ 1\ -1\ -1\ -1\ 1\ -1\ -1\ -1\ 1\ 1] \quad (6)$$

The generated alternating current I1 (FIG. 10A) is multiplied with the modulation code m1 having a frequency 70 kHz and including "1" and "−1" to generate the modulated current I2 (FIG. 10B) of a code-modulated wave. In this case, time width of one code is 1/(70 kHz)=14.2 microseconds. The demodulation code d1 of the code demodulator 4 is represented by the following expression:

$$d1 = m1 = [1\ -1\ 1\ 1\ 1\ -1\ -1\ -1\ 1\ -1\ -1\ -1\ 1\ 1] \quad (7)$$

As in the code demodulation for the direct-current power, a sign of a demodulation result of the following expression is obtained by multiplying the modulation code m1 with the demodulation code d1.

$$m1 \times d1 = [1\ 1\ 1\ 1\ 1\ 1\ 1\ 1\ 1\ 1\ 1\ 1\ 1\ 1] \quad (8)$$

As it is evident from Expression (8), it is seen that the original alternating-current power is obtained.

As explained above, it is possible to realize accurately synchronizing power transmission with a less power loss by using the methods of the code modulation and the code demodulation according to this embodiment. It is possible to efficiently perform transmission of electric power in a longer time by repeating the code sequence m1.

In FIGS. 8 and 9, each of the bidirectional switch circuits SS21 to SS34 is configured by a pair of switches connected in parallel to each other. However, each of the bidirectional switch circuits SS21 to SS34 may be configured by a pair of switches connected in series. In this case, diodes are connected in parallel to the switches. A pair of diodes is connected to each other in opposite directions in each of the bidirectional switch circuits. The switches may be configured by, for example, MOS transistors including parasitic (body) diodes connected in parallel to the switches. When each of the switch circuits is realized by, for example, a switch of a MOS transistor and one diode, four semiconductor elements (two MOS transistors and two diodes) are necessary in one bidirectional switch circuit. On the other hand, as the MOS transistors, a package incorporating reverse-characteristic diodes having good characteristics is spread. The switches can be reduced in size by configuring one bidirectional switch circuit with two semiconductor elements.

Operation for transmitting and receiving a control signal for preparation for power transmission, in particular, for synchronizing the code modulator 2 and the code demodulator 4 in the power transmission system illustrated in FIG. 1 is explained.

In Japanese Patent Nos. 5194435 and 5249382 and Japanese Unexamined Patent Application Publication (Translation of PCT Application) No. 2014-505460, temporal synchronization of the entire power transmission system is explained.

However, when electric power modulated by code modulation is transmitted, it is requested not only that the entire power transmission system temporally synchronizes but also that the demodulation operation of the code demodulator 4 synchronizes with a phase of received electric power taking into account a propagation time from the code modulator 2 to the code demodulator 4. If the demodulation operation of the code demodulator 4 does not synchronize with the phase of the received electric power, a loss occurs when the received electric power is demodulated. In the power transmission system illustrated in FIG. 1, the power line communication circuit 24 of the code modulator 2 and the power line communication circuit 34 of the code demodulator 4 communicate with each other to realize the phase synchronization.

In the power transmission system illustrated in FIG. 1, the electric power generated by the generator 1 is modulated by the code modulator 2. The modulated electric power is transmitted to the code demodulator 4 via the wired transmission line 3 and demodulated. The demodulated electric power is supplied to the load 5. Concerning the phase synchronization of the code demodulator 4, an example is explained in which, as illustrated in FIG. 1, the wired transmission line 3 between the code modulator 2 and the code demodulator 4 has a route length L1 and a propagation time Δt1 seconds is required to transmit the electric power demodulated by the code demodulator 4 via the wired transmission line 3. In this case, by delaying a demodulation start time of the code demodulator 4 by Δt1 seconds from a modulation start time of the code modulator 2, it is possible to start the demodulation operation to be timed to coincide with a time at which the modulated electric power transmitted through the wired transmission line 3 reaches the code demodulator 4 and efficiently demodulate the electric power as illustrated in FIGS. 7A to 7C and FIGS. 10A to 10C. As explained above, in the power transmission system illustrated in FIG. 1, it is important to surely synchronize the demodulation operation of the code demodulator 4 with the phase of the received electric power.

Figure 11:
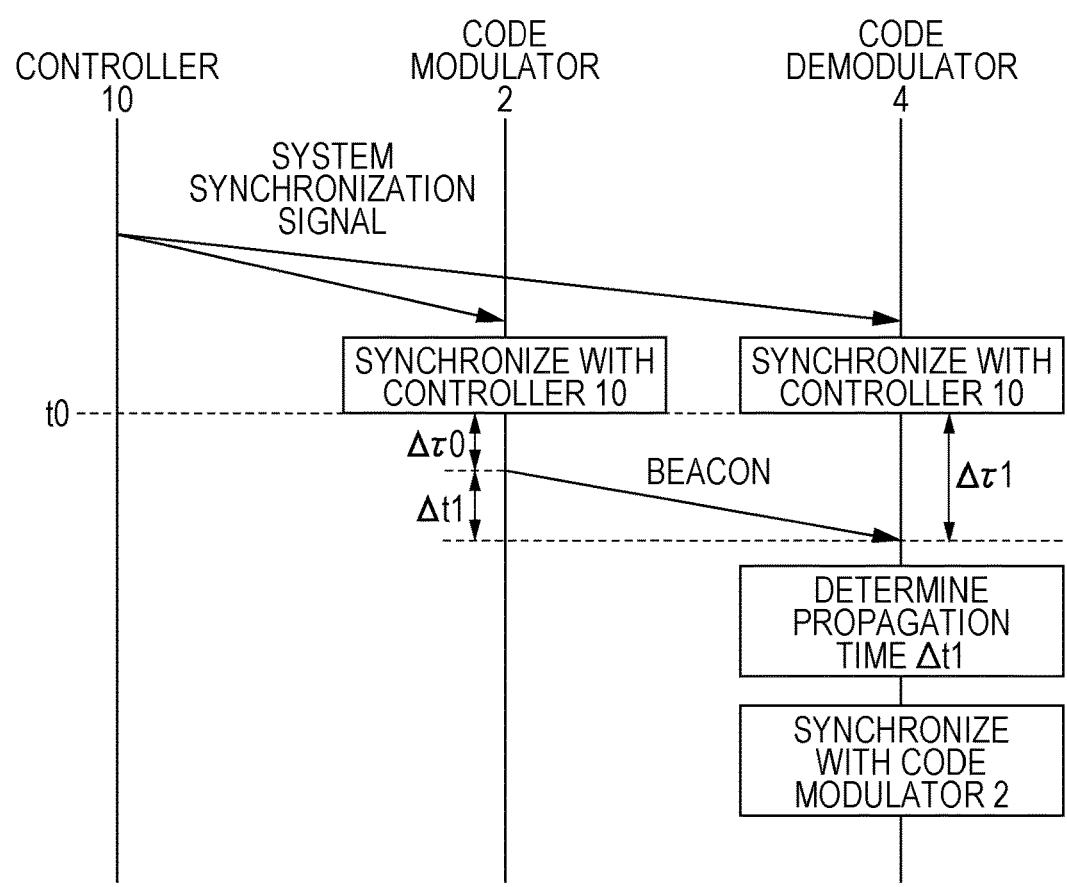
FIG. 11 is a sequence chart of the code modulator and the code demodulator according to the first embodiment.

FIG. 11 is a sequence chart illustrating synchronization of the code modulator 2 and the code demodulator 4 in the power transmission system illustrated in FIG. 1. A control signal for establishing the synchronization is transmitted by the power line communication circuit 24 of the code modulator 2 and received by the power line communication circuit 34 of the code demodulator 4 via the wired transmission line 3. The code demodulator 4 measures the propagation time Δt1 from the code modulator 2 to the code demodulator 4 via the wired transmission line 3 by receiving the control signal from the code modulator 2 via the wired transmission line 3.

Specifically, for example, a system synchronization signal is transmitted from the controller 10 as a reference signal for synchronizing the entire power transmission system. The code modulator 2 and the code demodulator 4 are respectively synchronized with the controller 10 in advance. Consequently, the code modulator 2 and the code demodulator 4 temporally synchronize with each other at system synchronization time t0. The code modulator 2 transmits a beacon to the code demodulator 4 as a control signal for synchronizing the demodulation operation of the code demodulator 4 with the phase of the received electric power. The beacon includes information indicating a transmission time of the beacon (or time length Δτ0 from the system synchronization time t0 to the transmission time) based on the system synchronization time t0. The code demodulator 4 receives the beacon and determines a reception time of the beacon (time length Δτ1 from the system synchronization time t0 to the reception time) based on the system synchronization time t0. The code demodulator 4 calculates the propagation time Δt1 in the wired transmission line 3 according to Δt1=Δτ1−Δτ0.

The control circuit 30 of the code demodulator 4 delays a demodulation start time of the code demodulation circuit 33 from a modulation start time of the code modulation circuit 23 (i.e., transmission start time of electric power) by the propagation time Δt1. When receiving electric power from the code modulator 2 via the wired transmission line 3, the code demodulator 4 demodulates the electric power in synchronization with a phase of the electric power based on the propagation time Δt1. Consequently, it is possible to efficiently demodulate the electric power in synchronization with the phase of the electric power received from the code modulator 2.

Note that the system synchronization signal is not limited to a signal transmitted from the controller 10. A signal transmitted from another signal source such as a GPS signal or a standard radio wave (a radio clock) may be used. Consequently, there is an advantage that more accurate synchronization of the entire power transmission system is possible. Further, since it is unnecessary to include a function of transmitting the system synchronization signal from the controller 10, there is an effect of reducing the cost of the controller 10.

A power transmission system according to a modification 2 of the first embodiment is explained with reference to FIGS. 12, 13A to 13E, 14, and 15. Establishment of synchronization between a code modulator and a code demodulator performed when the power transmission system includes multiple generators, multiple code modulators, multiple code demodulators, and multiple loads is explained.

Figure 12:
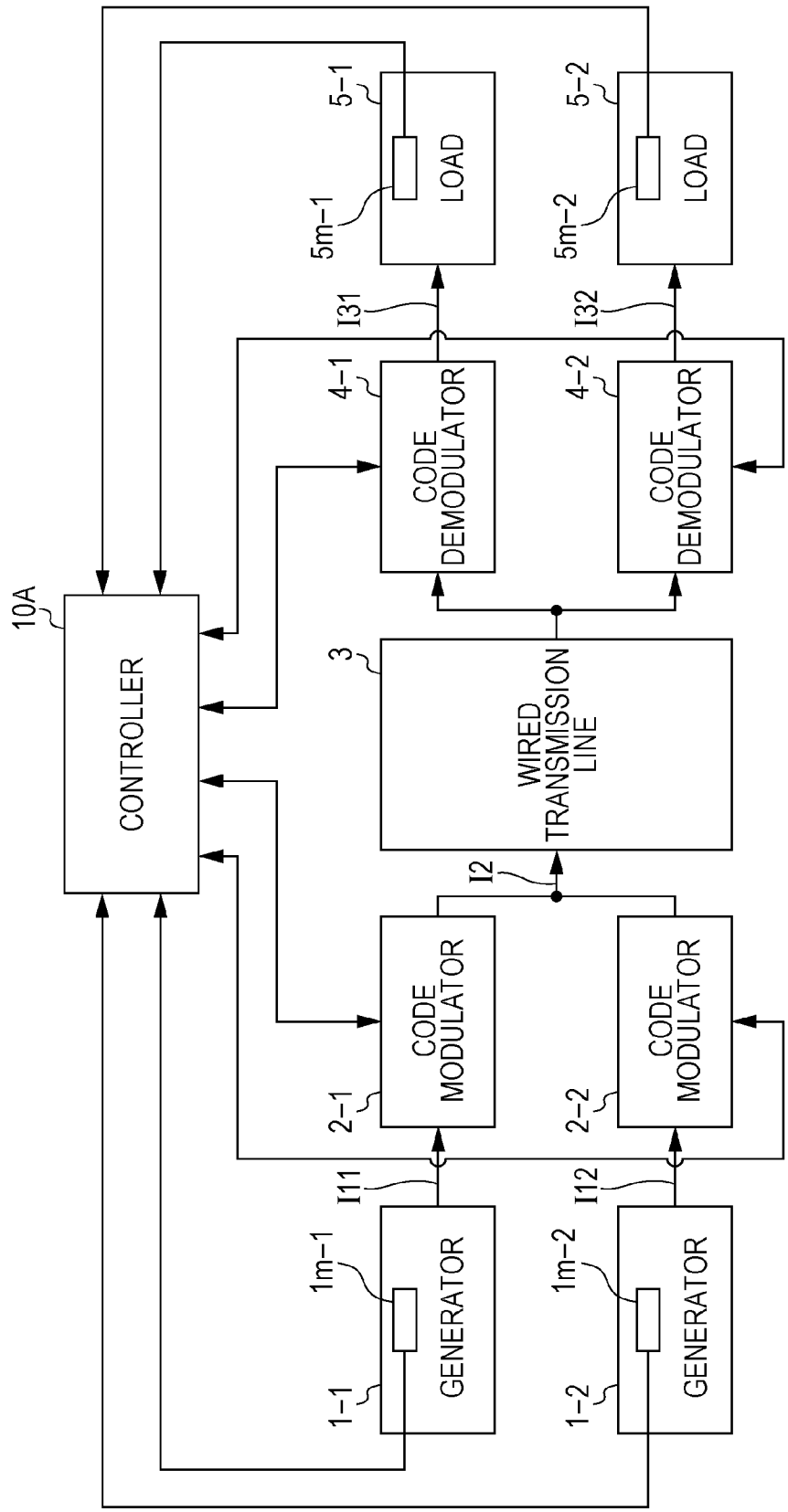
FIG. 12 is a block diagram illustrating the configuration of a power transmission system according to a modification 2 of the first embodiment.

FIG. 12 is a block diagram illustrating the configuration of the power transmission system according to the modification 2 of the first embodiment. The power transmission system illustrated in FIG. 12 includes generators 1-1 and 1-2, code modulators 2-1 and 2-2, the wired transmission line 3, code demodulators 4-1 and 4-2, loads 5-1 and 5-2, and a controller 10A. The generators 1-1 and 1-2 illustrated in FIG. 12 are respectively configured the same as the generator 1 illustrated in FIG. 1. The code modulators 2-1 and 2-2 illustrated in FIG. 12 are respectively configured the same as the code modulator 2 illustrated in FIG. 1. The code demodulators 4-1 and 4-2 are respectively configured the same as the code demodulator 4 illustrated in FIG. 1. The loads 5-1 and 5-2 illustrated in FIG. 12 are respectively configured the same as the load 5 illustrated in FIG. 1. Electric powers generated by the generators 1-1 and 1-2 are respectively modulated by the code modulators 2-1 and 2-2. The modulated electric powers are combined with each other and transmitted via the wired transmission line 3. The transmitted electric powers are respectively demodulated by the code demodulators 4-1 and 4-2. The demodulated electric powers are respectively supplied to the loads 5-1 and 5-2. The power transmission system illustrated in FIG. 12 transmits electric power in a combination of a desired generator and a desired load in the power transmission system including the two generators 1-1 and 1-2 and the two loads 5-1 and 5-2.

Figure 13A:
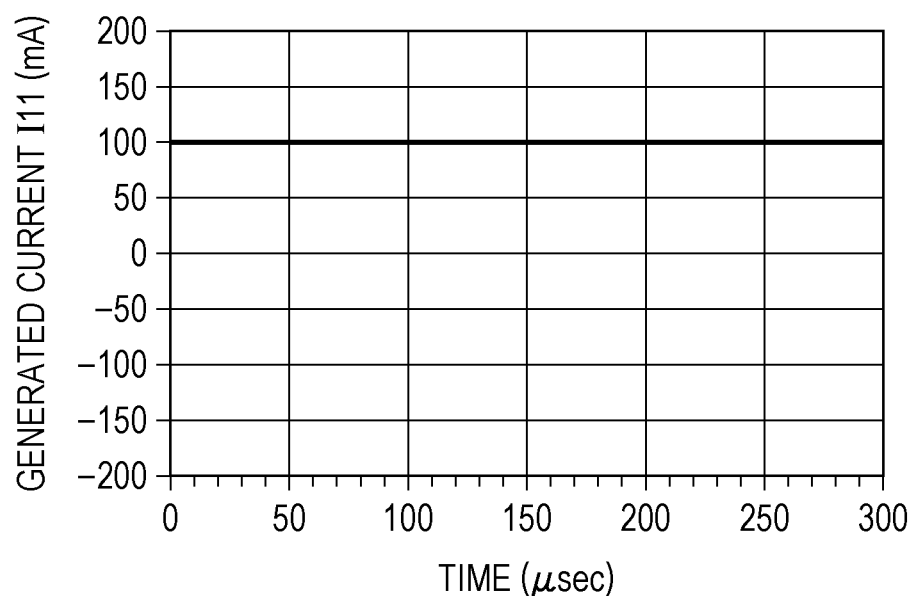
FIG. 13A is a waveform chart illustrating a signal waveform example of a generated current according to the modification 2 of the first embodiment.
Figure 13B:
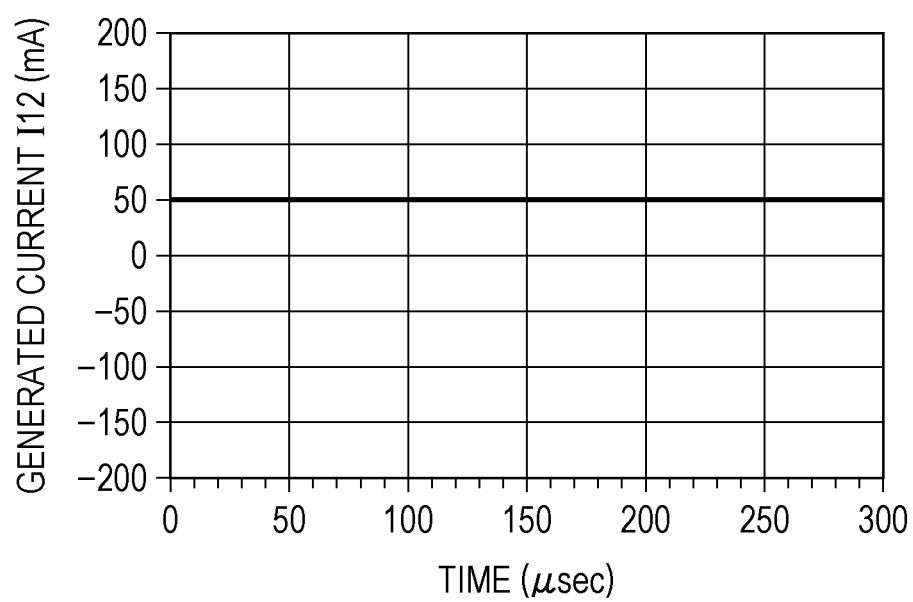
FIG. 13B is a waveform chart illustrating a signal waveform example of a generated current according to the modification 2 of the first embodiment.
Figure 13C:
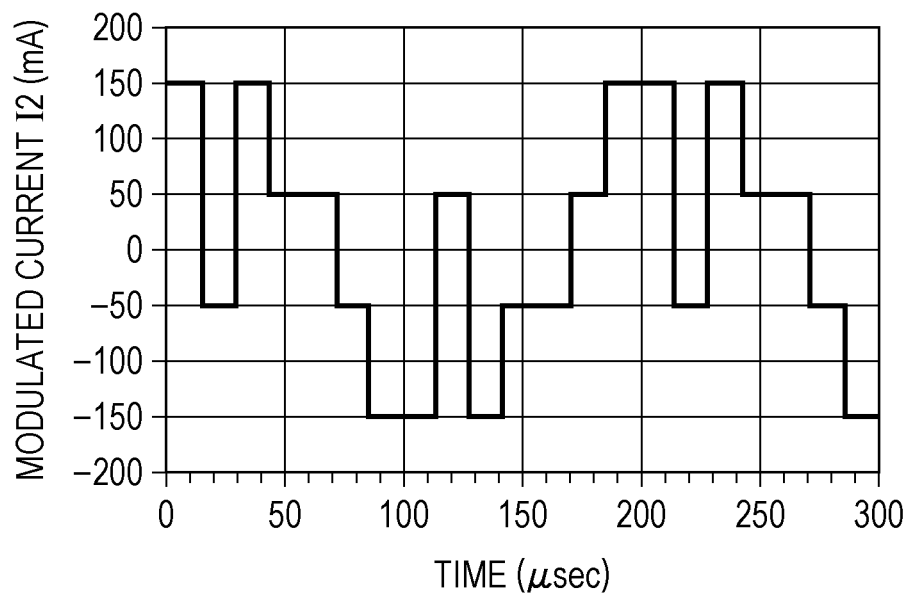
FIG. 13C is a waveform chart illustrating a signal waveform example of a modulated current according to the modification 2 of the first embodiment.
Figure 13D:
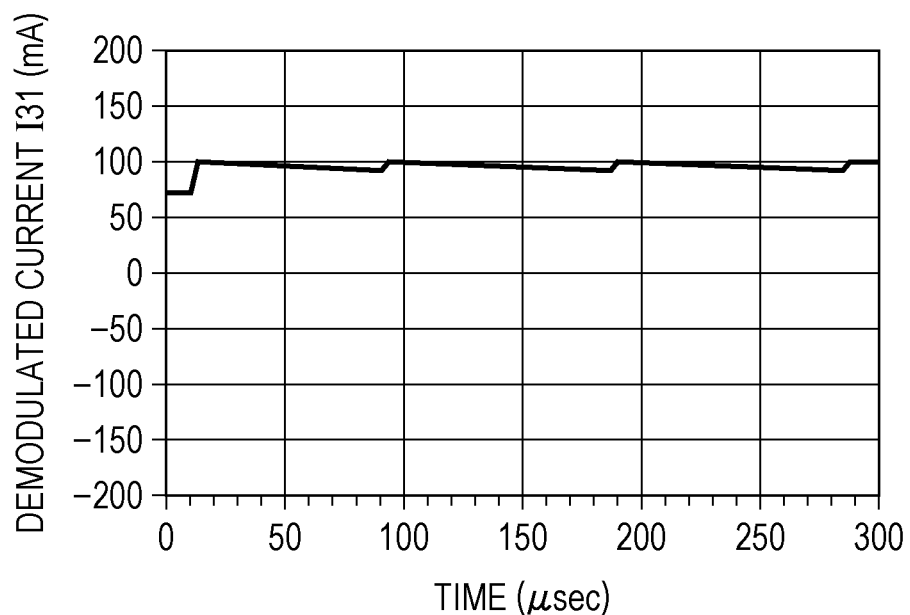
FIG. 13D is a waveform chart illustrating a signal waveform example of a demodulated current according to the modification 2 of the first embodiment.
Figure 13E:
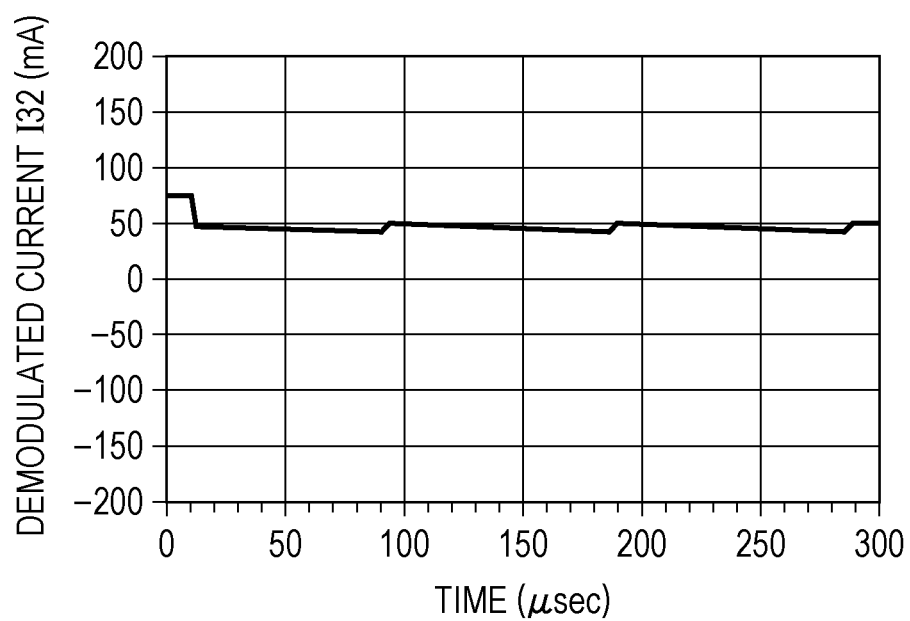
FIG. 13E is a waveform chart illustrating a signal waveform example of a demodulated current according to the modification 2 of the first embodiment.

FIG. 13A is a waveform chart illustrating a signal waveform example of a generated current I11 related to the power transmission system illustrated in FIG. 12. FIG. 13B is a waveform chart illustrating a signal waveform example of a generated current I12 related to the power transmission system illustrated in FIG. 12. FIG. 13C is a waveform chart illustrating a signal waveform example of the modulated current I2 related to the power transmission system illustrated in FIG. 12. FIG. 13D is a waveform chart illustrating a signal waveform example of a demodulated current I31 related to the power transmission system illustrated in FIG. 12. FIG. 13E is a waveform chart illustrating a signal waveform example of a demodulated current I32 related to the power transmission system illustrated in FIG. 12. The code modulator 2-1 and the code demodulator 4-1 respectively use a code sequence of a modulation code and a code sequence of a demodulation code corresponding to each other. The code modulator 2-2 and the code demodulator 4-2 respectively use a code sequence of a modulation code and a code sequence of a demodulation code corresponding to each other, the code sequences being different from the code sequences of the code modulator 2-1 and the code demodulator 4-1. For example, the code sequences of the code modulator 2-1 and the code demodulator 4-1 and the code sequences of the code modulator 2-2 and the code demodulator 4-2 are orthogonal to each other. As the orthogonal code sequences, for example, a Gold sequence, an m sequence, and the like can be used. Consequently, electric power can be transmitted from the code modulator 2-1 to the code demodulator 4-1. Electric power can be transmitted from the code modulator 2-2 to the code demodulator 4-2. Even if the electric power modulated by the code modulator 2-1 and the electric power modulated by the code modulator 2-2 are once combined on the wired transmission line 3, the combined electric power can be separated and demodulated by the code demodulator 4-1 and the code demodulator 4-2.

Figure 14:
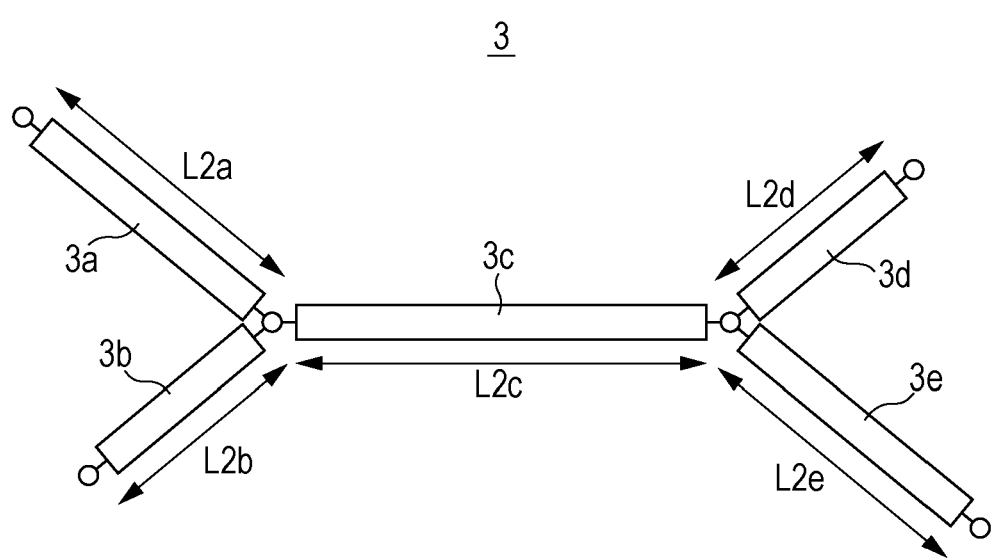
FIG. 14 is a diagram illustrating the configuration of a wired transmission line according to the modification 2 of the first embodiment.

FIG. 14 is a diagram illustrating the configuration of the wired transmission line 3 illustrated in FIG. 12. The wired transmission line 3 illustrated in FIG. 12 includes wired transmission lines 3a to 3e forming portions of the wired transmission line 3. The wired transmission lines 3a to 3e respectively have route lengths L2a to L2e. The wired transmission line 3a is connected to the code modulator 2-1. The wired transmission line 3b is connected to the code modulator 2-2. The wired transmission line 3d is connected to the code demodulator 4-1. The wired transmission line 3e is connected to the code demodulator 4-2. As illustrated in FIG. 14, in the wired transmission line 3, a route length from a certain modulator to a certain demodulator is sometimes different from a route length from another code modulator to another code demodulator. In the case of FIG. 14, for example, a route from the code modulator 2-1 to the code demodulator 4-1 is configured by the wired transmission lines 3a, 3c, and 3d. Therefore, a total route length is L2a+L2c+L2d. A route from the code modulator 2-2 to the code demodulator 4-2 is configured by wired transmission lines 3b, 3c, and 3e. Therefore, a total route length is L2b+L2c+L2e. Route lengths of the other routes are decided in the same manner. A route length of a route from the code modulator 2-1 to the code demodulator 4-2 is L2a+L2c+L2e. A route length of a route from the code modulator 2-2 to the code demodulator 4-1 is L2b+L2c+L2d. In this case, concerning all routes used for power transmission, it is necessary to transmit and receive control signals for synchronizing demodulation operations of the code demodulators 4-1 and 4-2 with a phase of received electric power.

Figure 15:
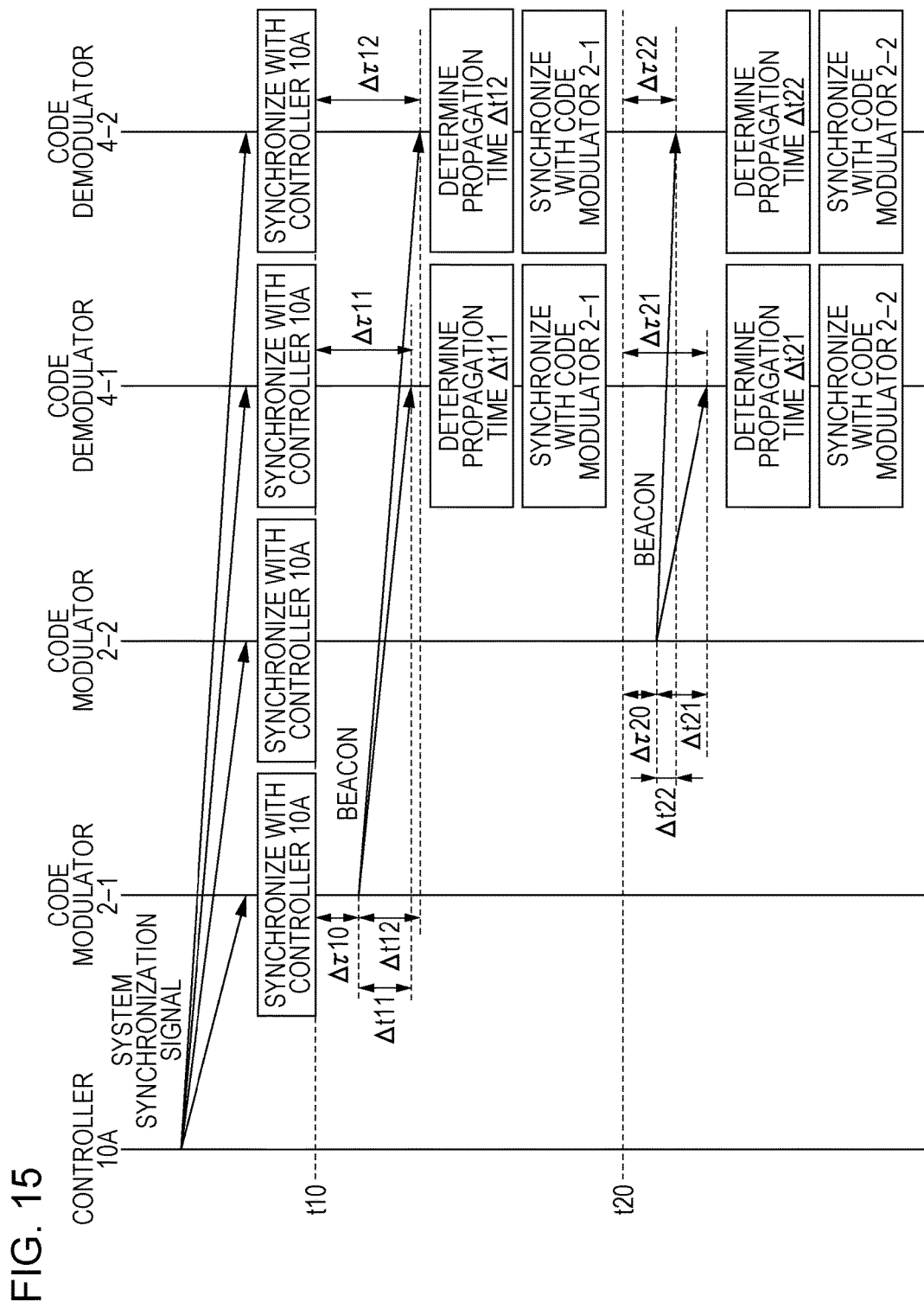
FIG. 15 is a sequence chart of a code modulator and a code demodulator according to the modification 2 of the first embodiment.

FIG. 15 is a sequence chart illustrating synchronization of the code modulators 2-1 and 2-2 and the code demodulators 4-1 and 4-2 in the power transmission system illustrated in FIG. 12. A sequence illustrated in FIG. 15 is the same as the sequence illustrated in FIG. 11 except that transmission and reception of beacons is repeated concerning different combinations of the code modulators and the code demodulators.

When beacons are transmitted from the code modulators 2-1 and 2-2, in each of the code demodulators 4-1 and 4-2, it is necessary to identify the beacon transmitted from the code modulator 2-1 and the beacon transmitted from the code modulator 2-2. For example, in order to identify the beacons, the beacons may be transmitted from the code modulators 2-1 and 2-2 in a time division manner. First, the beacon is transmitted from the code modulator 2-1. Each of the code demodulators 4-1 and 4-2 demodulates electric power received from the code modulator 2-1 in synchronization with a phase of the electric power in the same manner as the sequence illustrated in FIG. 11. Subsequently, the beacon is transmitted from the code modulator 2-2. Each of the code demodulators 4-1 and 4-2 demodulates electric power received from the code modulator 2-2 in synchronization with a phase of the electric power in the same manner as the sequence illustrated in FIG. 11. When the beacons are transmitted in a time division manner, there is an advantage that it is easy to separate the beacons and it is possible to most surely establish synchronization.

In order to identify the beacons, intrinsic codes (IDs) different from each other may be respectively allocated to the code modulators 2-1 and 2-2. The beacons may be assigned with the intrinsic codes and transmitted. Further, in order to identify the beacons, frequencies different from each other may be respectively allocated to the code modulators 2-1 and 2-2. The beacons having the allocated frequencies may be transmitted. In this way, when the beacons are assigned with the intrinsic codes (IDs) and transmitted or when the beacons are transmitted at the different frequencies, the beacons can be multiplexed and transmitted at the same time. Therefore, there is an effect that it is possible to reduce a time required for synchronization formation.

According to the sequence illustrated in FIG. 15, even when the power transmission system includes the multiple code modulators and the multiple code demodulators as illustrated in FIG. 12, it is possible to synchronize the demodulation operation of the code demodulators 4-1 and 4-2 with the phase of the received electric power and efficiently demodulate the electric power.

A power transmission system according to a modification 3 of the first embodiment is explained with reference to FIGS. 16 to 18.

Figure 16:
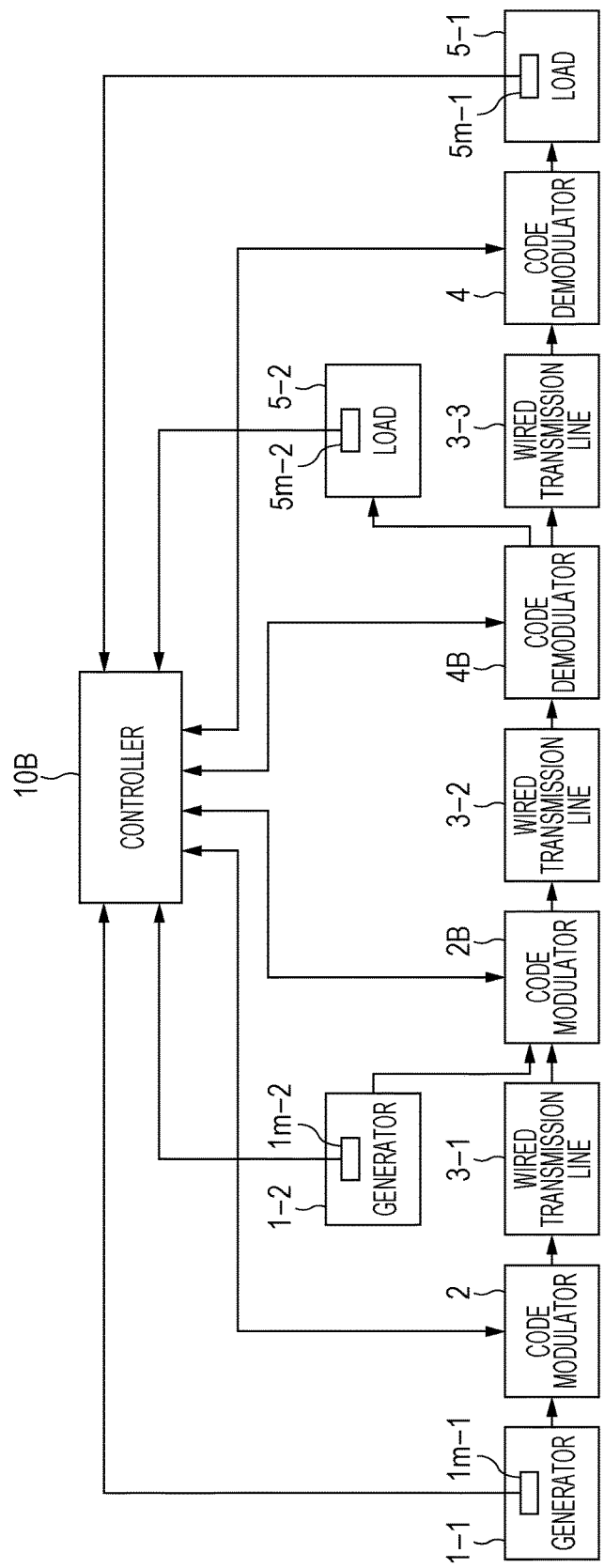
FIG. 16 is a block diagram illustrating the configuration of a power transmission system according to a modification 3 of the first embodiment.

FIG. 16 is a block diagram illustrating the configuration of the power transmission system according to the modification 3 of the first embodiment. The power transmission system illustrated in FIG. 16 includes the generators 1-1 and 1-2, code modulators 2 and 2B, wired transmission lines 3-1 to 3-3, code demodulators 4 and 4B, the loads 5-1 and 5-2, and a controller 10B. In the power transmission system illustrated in FIG. 16, multiple wired transmission lines 3-1 to 3-3 are connected in a cascade. An example is explained in which electric powers generated by two generators 1-1 and 1-2 are respectively supplied to the loads 5-1 and 5-2.

The code modulator 2 illustrated in FIG. 16 is configured as illustrated in FIG. 2. The code demodulator 4b illustrated in FIG. 16 is configured as illustrated in FIG. 3. FIGS. 17 and 18 are respectively block diagrams illustrating examples of the configurations of the code modulator 2B and the code demodulator 4B.

Figure 17:
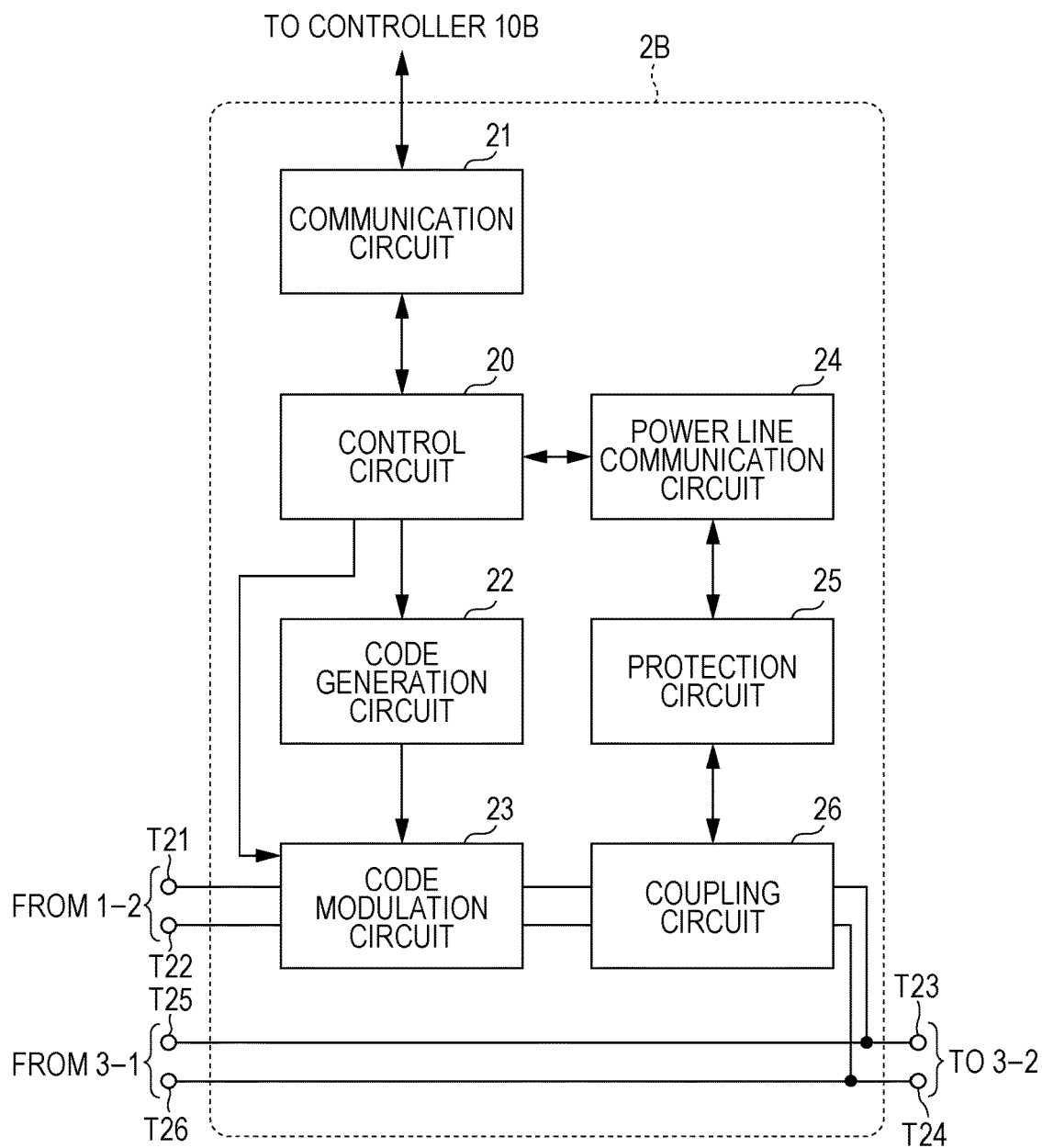
FIG. 17 is a block diagram illustrating the configuration of a code modulator according to the modification 3 of the first embodiment.

FIG. 17 is a block diagram illustrating the configuration of the code modulator 2B illustrated in FIG. 16. As illustrated in FIG. 17, the code modulator 2B includes components same as the components of the code modulator 2 illustrated in FIG. 2. Terminals T21 to T24 illustrated in FIG. 17 respectively correspond to the terminals T1 to T4 illustrated in FIG. 2. The code modulator 2B illustrated in FIG. 17 is different from the code modulator 2 illustrated in FIG. 2 in that the code modulator 2B includes additional input terminals T25 and T26 in order to enable the code modulator 2B to be connected in a cascade between the wired transmission lines 3-1 and 3-2. The operation of the code modulator 2B illustrated in FIG. 17 is the same as the operation of the code modulator 2 illustrated in FIG. 2.

Therefore, redundant explanation of the operation is omitted. Consequently, it is possible to connect the code modulator 2B in a cascade between the wired transmission lines 3-1 and 3-2. There is an effect that it is possible to construct the power transmission system connected in a cascade.

Figure 18:
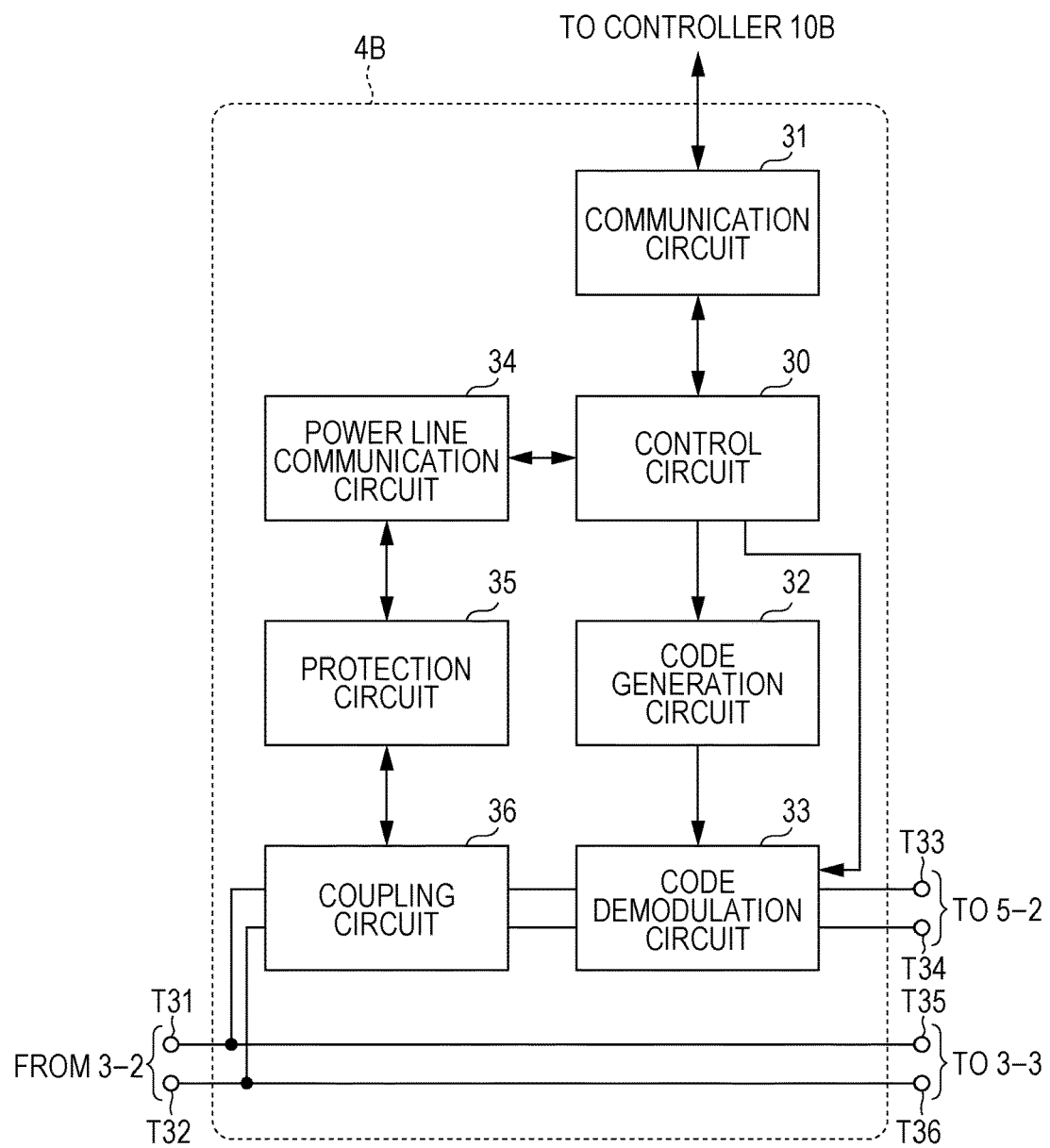
FIG. 18 is a block diagram illustrating the configuration of a code demodulator according to the modification 3 of the first embodiment.

FIG. 18 is a block diagram illustrating the configuration of the code demodulator 4B illustrated in FIG. 16. As illustrated in FIG. 18, the code demodulator 4B includes components same as the components of the code demodulator 4 illustrated in FIG. 3. Terminals T32 to T34 illustrated in FIG. 18 respectively correspond to the terminals T11 to T14 illustrated in FIG. 3. The code demodulator 4B illustrated in FIG. 18 is different from the code demodulator 4 illustrated in FIG. 3 in that the code demodulator 4B includes additional output terminals T35 and T36 in order to enable the code demodulator 4B to be connected in a cascade between the wired transmission lines 3-2 and 3-3. The operation of the code demodulator 4B illustrated in FIG. 18 is the same as the operation of the code demodulator 4 illustrated in FIG. 3. Therefore, redundant explanation of the operation is omitted. Consequently, it is possible to connect the code demodulator 4B in a cascade between the wired transmission lines 3-2 and 3-3. There is an effect that it is possible to construct the power transmission system connected in a cascade.

For example, electric power generated by the generator 1-1 is modulated by the code modulator 2 and transmitted via the wired transmission line 3-1, the code modulator 2B, and the wired transmission line 3-2. The transmitted electric power is demodulated by the code demodulator 4B and output to the load 5-2. Electric power generated by the generator 1-2 is modulated by the code modulator 2B, transmitted via the wired transmission line 3-2, the code demodulator 4B, and the wired transmission line 3-3. The transmitted electric power is demodulated by the code demodulator 4 and output to the load 5-1.

The code modulator 2 and the code demodulator 4B respectively use a code sequence of a modulation code and a code sequence of a demodulation code corresponding to each other. The code modulator 2B and the code demodulator 4 respectively use a code sequence of a modulation code and a code sequence of a demodulation code corresponding to each other, the code sequences being different from the code sequences used by the code modulator 2 and the code demodulator 4B. Consequently, it is possible to transmit electric power from the code modulator 2 to the code demodulator 4B and transmit electric power from the code modulator 2B to the code demodulator 4.

Even if the electric power modulated by the code modulator 2 and the electric power modulated by the code modulator 2B are once combined on the wired transmission line 3-2, the combined electric power can be separated and demodulated by the code demodulator 4 and the code demodulator 4B In the power transmission system illustrated in FIG. 16, operation for synchronizing demodulation operation of the code demodulators 4 and 4B with a phase of received electric power is the same as the operation (see FIG. 15) of the power transmission system illustrated in FIG. 12.

As explained above, with the power transmission system according to the first embodiment, by transmitting and receiving the beacon between the code modulator and the code demodulator, it is possible to synchronize the demodulation operation of the code demodulator with the phase of the received electric power while suppressing an increase in cost and communication overhead. Consequently, it is possible to provide the power transmission system having a less power loss and having high power transmission efficiency.

Note that, in FIGS. 11 and 15, an example is explained in which the code modulator transmits the beacon to the code demodulator. However, the transmission of the beacon is not limited to this. The beacon may be transmitted from the code demodulator to the code modulator. In this case, the code modulator temporally synchronizes with the code demodulator in advance by receiving a system synchronization signal from the controller in the same manner as illustrated in FIGS. 11 and 15. The code demodulator transmits the beacon. The code modulator measures a propagation time from the code modulator to the code demodulator via the wired transmission line 3 by receiving the beacon from the code demodulator via the wired transmission line 3. The code modulator determines, based on the propagation time, an initial phase of electric power transmitted from the code modulator such that the code demodulator demodulate electric power received from the code modulator via the wired transmission line 3 in synchronization with a phase of the electric power. The code modulator transmits the electric power modulated to have the determined initial phase. Consequently, it is possible to synchronize the demodulation operation of the code demodulator with the phase of the received electric power while suppressing an increase in cost and communication overhead. Consequently, it is possible to provide the power transmission system having a less power loss and having high power transmission efficiency.

When the power transmission system includes one code modulator and multiple code demodulators, the code modulator transmits beacons to the code demodulators, whereby the code demodulators can demodulate electric power transmitted from the code modulator in synchronization with a phase of the electric power. When the power transmission system includes multiple code modulators and one code demodulators, the code demodulator transmits beacons to the code modulators, whereby the code modulators can transmit electric power having an initial phase determined to demodulate electric power received by the code demodulator in synchronization with a phase of the electric power.

Second Embodiment

In a second embodiment, operation for transmitting and receiving a control signal for detecting abnormality and disconnection of a wired transmission line as, in particular, a state of the wired transmission line to prepare for power transmission in a power transmission system is explained.

Figure 19:
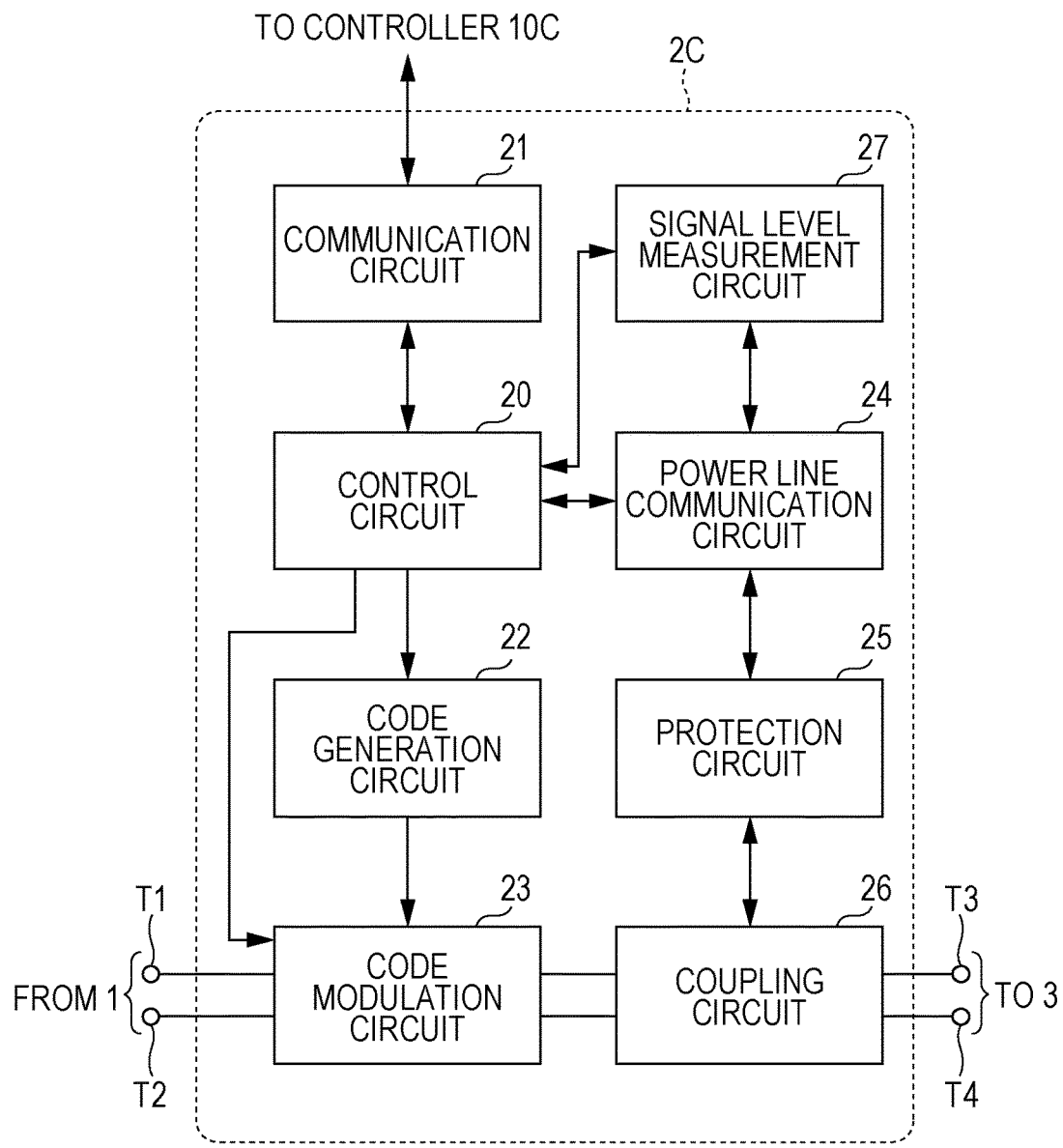
FIG. 19 is a block diagram illustrating a configuration example of a code modulator according to a second embodiment.

FIG. 19 is a block diagram illustrating the configuration of a code modulator 2C according to the second embodiment. The code modulator 2C illustrated in FIG. 19 includes a signal level measurement circuit 27 in addition to the components of the code modulator 2 illustrated in FIG. 2. The code modulator 2C communicates with a controller 10C that executes processing explained below with reference to FIG. 21, 23, or 25.

Figure 20:
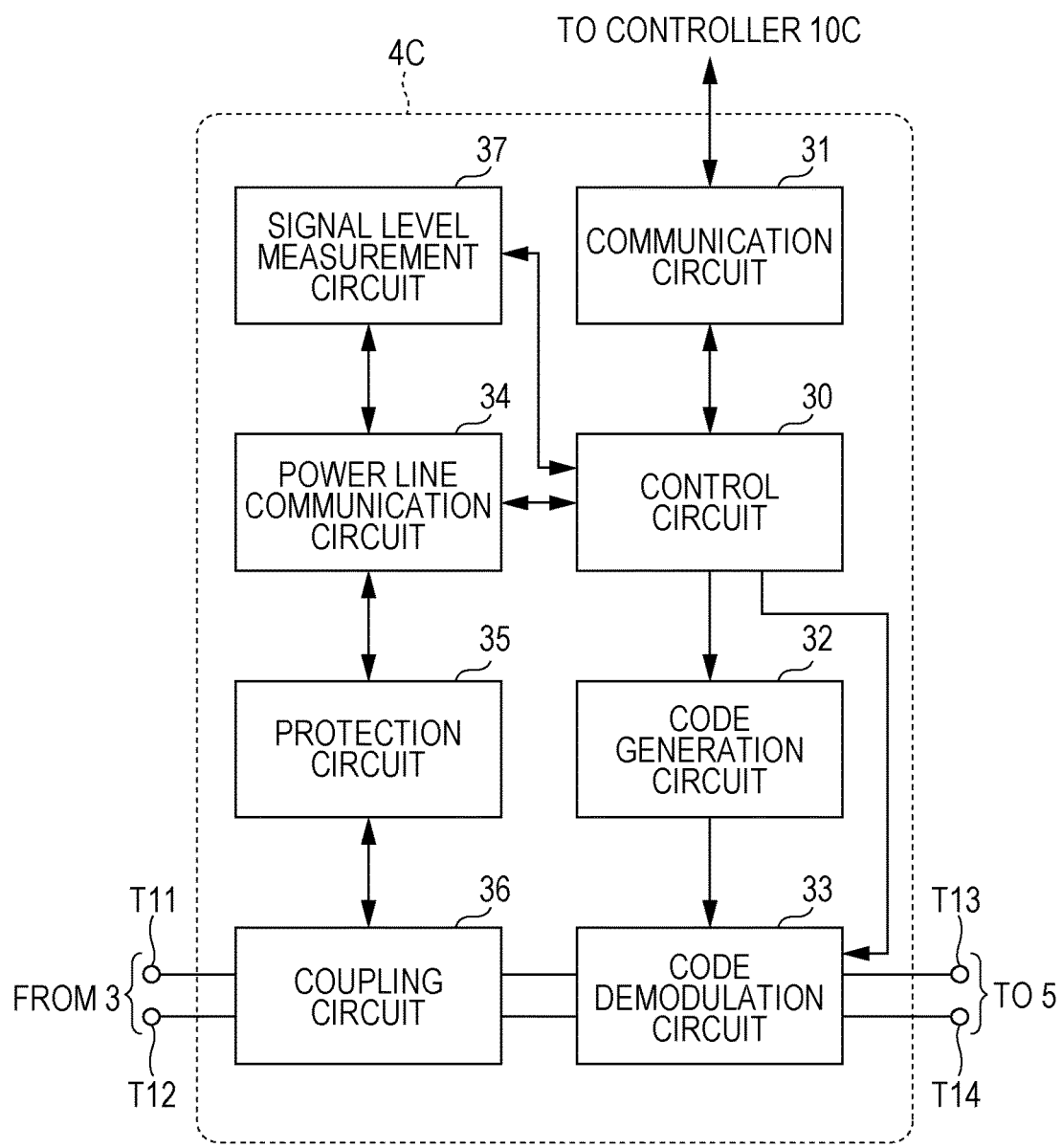
FIG. 20 is a block diagram illustrating a configuration example of a code demodulator according to the second embodiment.

FIG. 20 is a block diagram illustrating the configuration of a code demodulator 4C according to the second embodiment. The code demodulator 4C illustrated in FIG. 20 includes a signal level measurement circuit 37 in addition to the components of the code demodulator 4 illustrated in FIG. 3. The code demodulator 4C communicates with the controller 10C that executes the processing explained below with reference to FIGS. 21, 23, and 25.

In the power transmission system according to the second embodiment, only one of the code modulator and the code demodulator includes the signal level measurement circuit.

Therefore, in the following explanation, in the power transmission system illustrated in FIG. 12, it is assumed that code demodulators 4C-1 and 4C-2 corresponding to the code demodulator 4C illustrated in FIG. 20 are provided instead of the code demodulators 4-1 and 4-2 illustrated in FIG. 12.

Processing for detecting an abnormal part in a route of power transmission is explained with reference to FIGS. 21 and 22. For each of combinations of the code modulators 2-1 and 2-2 and the code demodulators 4C-1 and 4C-2, an abnormal part in a route between the code modulator and the code demodulator is detected. In the following explanation, a control signal for detecting an abnormal part of the wired transmission line 3 is transmitted from the code modulators 2-1 and 2-2 to the code demodulators 4C-1 and 4C-2.

Figure 21:
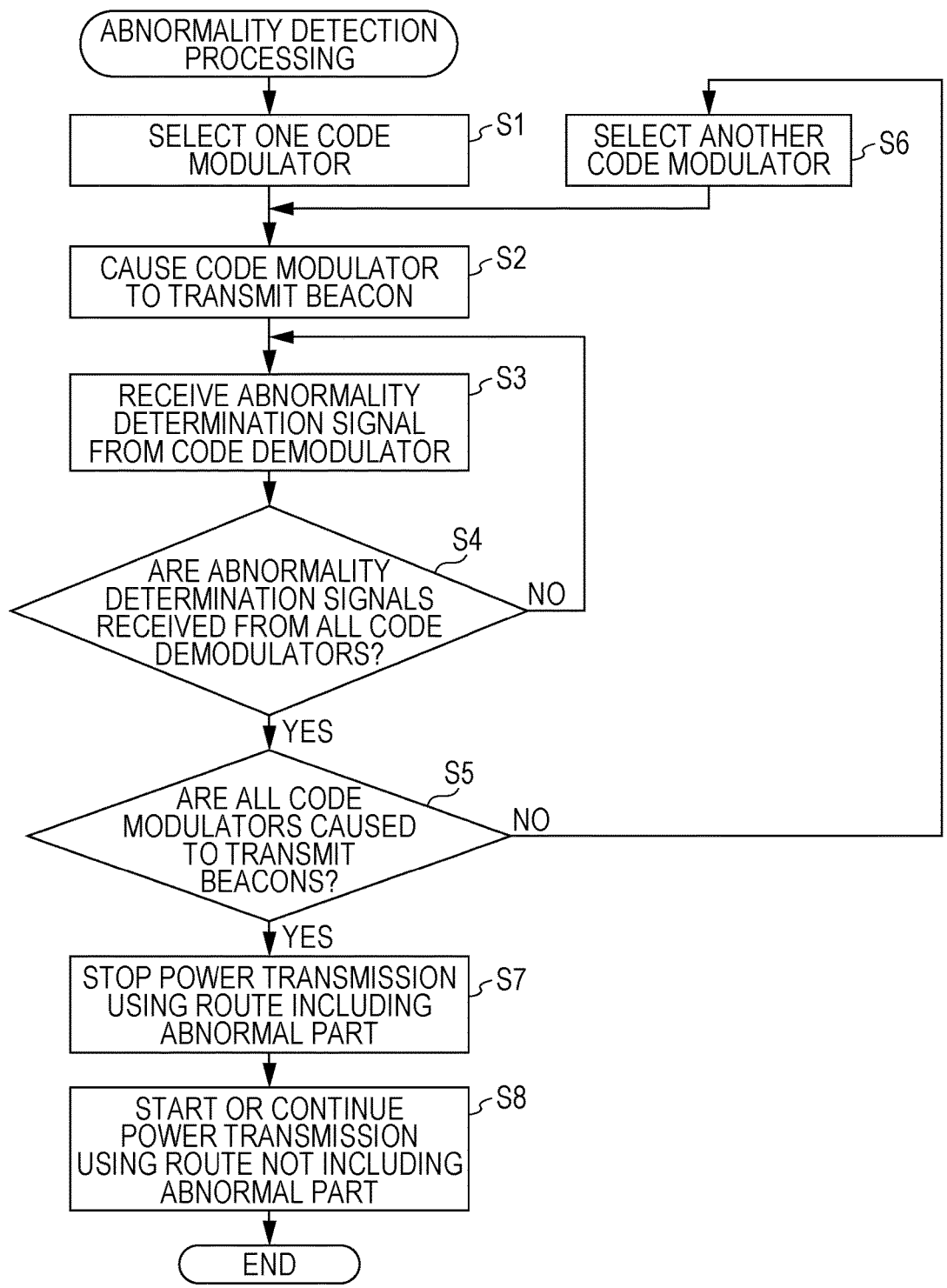
FIG. 21 is a flowchart illustrating an example of abnormality detection processing by a controller according to the second embodiment.

FIG. 21 is a flowchart illustrating abnormality detection processing executed by the controller 10C according to the second embodiment.

In step S1, the controller 10C selects one of the code modulators 2-1 and 2-2. In step S2, the controller 10C causes the selected code modulator to transmit a beacon as a control signal for detecting abnormality of the wired transmission line 3.

The beacon transmitted in step S2 is received by the code demodulators 4C-1 and 4C-2 via the wired transmission line 3. The code demodulators 4C-1 and 4C-2 transmit abnormality determination signals to the controller 10C by executing abnormality determination processing explained below with reference to FIG. 22.

In step S3, the controller 10C receives the abnormality determination signal from the code demodulator. In step S4, the controller 10C determines whether the abnormality determination signals have been received from all the code demodulators 4C-1 and 4C-2. When determining YES, the controller 10C proceeds to step S5. When determining NO, the controller 10C returns to step S3.

In step S5, the controller 10C determines whether the controller 10C has caused all the code modulators 2-1 and 2-2 to transmit beacons. When determining YES, the controller 10C proceeds to step S7. When determining NO, the controller 10C proceeds to step S6. In step S6, the controller 10C selects another code modulator and repeats steps S2 to S5.

In step S7, based on the abnormality determination signals received from the code demodulators 4C-1 and 4C-2, the controller 10C stops power transmission using a route including an abnormal part. In step S8, based on the abnormality determination signals received from the code demodulators 4C-1 and 4C-2, the controller 10C starts or continues power transmission performed by using a route not including an abnormal part.

Figure 22:
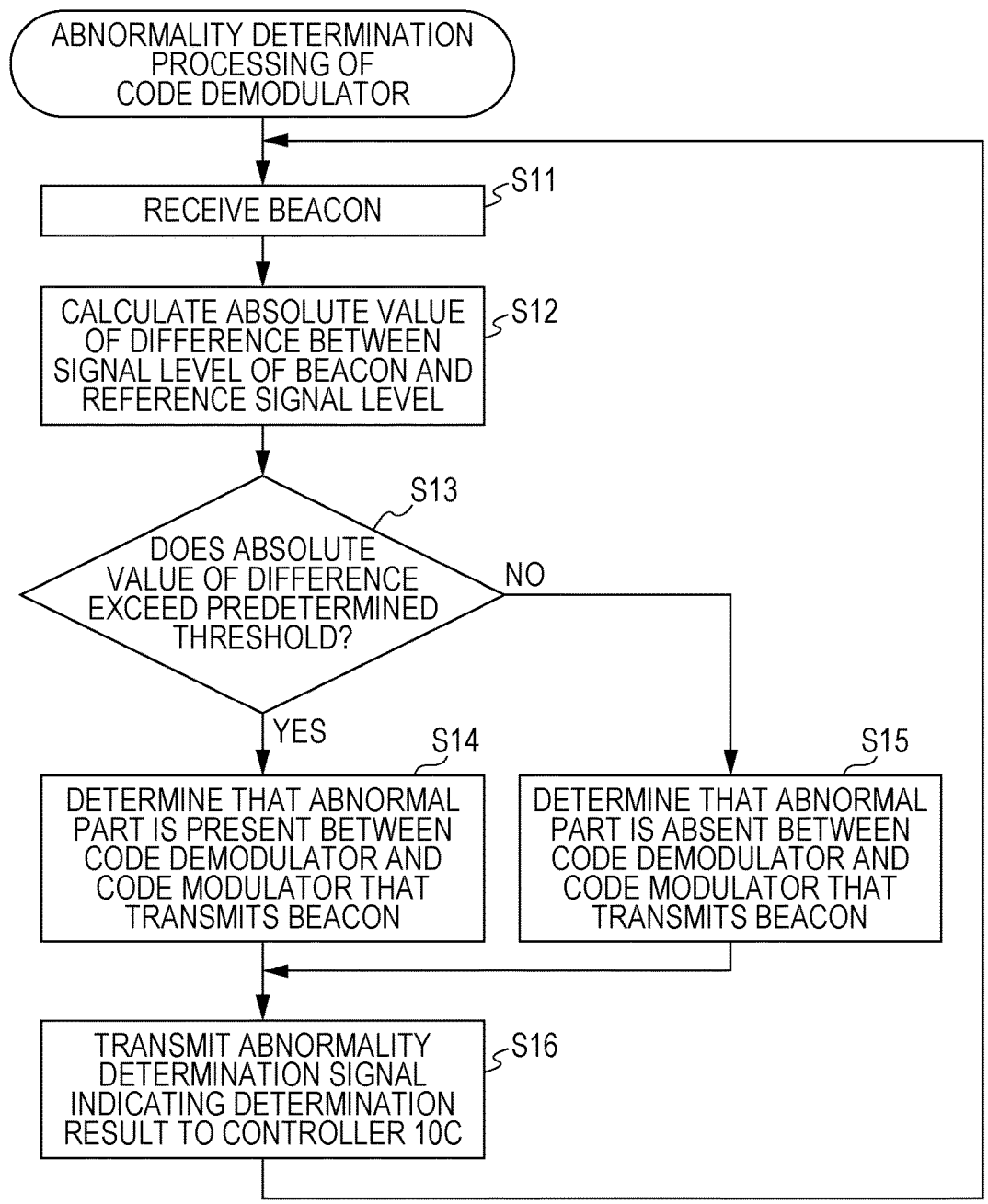
FIG. 22 is a flowchart illustrating an example of abnormality determination processing by the code demodulator according to the second embodiment.

FIG. 22 is a flowchart illustrating abnormality determination processing executed by the control circuit 30 of the code demodulator 4C illustrated in FIG. 20.

In step S11, the control circuit 30 receives a beacon from one of the code modulators 2-1 and 2-2 via the wired transmission line 3. In step S12, the control circuit 30 calculates the absolute value of a difference between a signal level of the received beacon and a predetermined reference signal level. The reference signal level is represented by, for example, electric power, voltage amplitude, or current amplitude.

The reference signal level is stored in a memory on the inside of the control circuit 30 in advance. The reference signal level may be a fixed value representing a prediction value of a signal level of a beacon or may be a signal level of a beacon received over a preceding fixed time period. When the reference signal level of the fixed value is used, there is an effect that it is possible to reduce a memory. On the other hand, when the reference signal level received over the fixed time period is used, there is an effect that it is possible to detect abnormality in a long period including aged deterioration.

In step S13, the control circuit 30 determines whether the absolute value of the difference exceeds a predetermined threshold. When determining YES, the control circuit 30 proceeds to step S14. When determining NO, the control circuit 30 proceeds to step S15. In step S14, the control circuit 30 determines that an abnormal part is present between the code demodulator 4C and the code modulator that transmits the beacon. In step S15, the control circuit 30 determines that an abnormal part is absent between the code demodulator 4C and the code modulator that transmits the beacon. Therefore, when the difference between the signal level of the beacon received from the code modulator 2 via the wired transmission line 3 and the predetermined reference signal level exceeds the predetermined threshold, the code demodulator 4 determines that an abnormal part is present in the wired transmission line 3.

In step S16, the control circuit 30 transmits an abnormality determination signal representing a determination result to the controller 10C.

The control circuit 30 of the code demodulator 4C repeats steps S11 to S16 every time the control circuit 30 receives a beacon from the code modulators 2-1 and 2-2.

Processing for detecting a disconnected part in a route of power transmission is explained with reference to FIGS. 23 and 24. For each of combinations of the code modulators 2-1 and 2-2 and the code demodulators 4C-1 and 4C-2, a disconnected part in a route between the code modulator and the code demodulator is detected. In the following explanation, a control signal for detecting a disconnected part of the wired transmission line 3 is transmitted from the code modulator 2-2 and 2-2 to the code demodulators 4C-1 and 4C-2.

Figure 23:
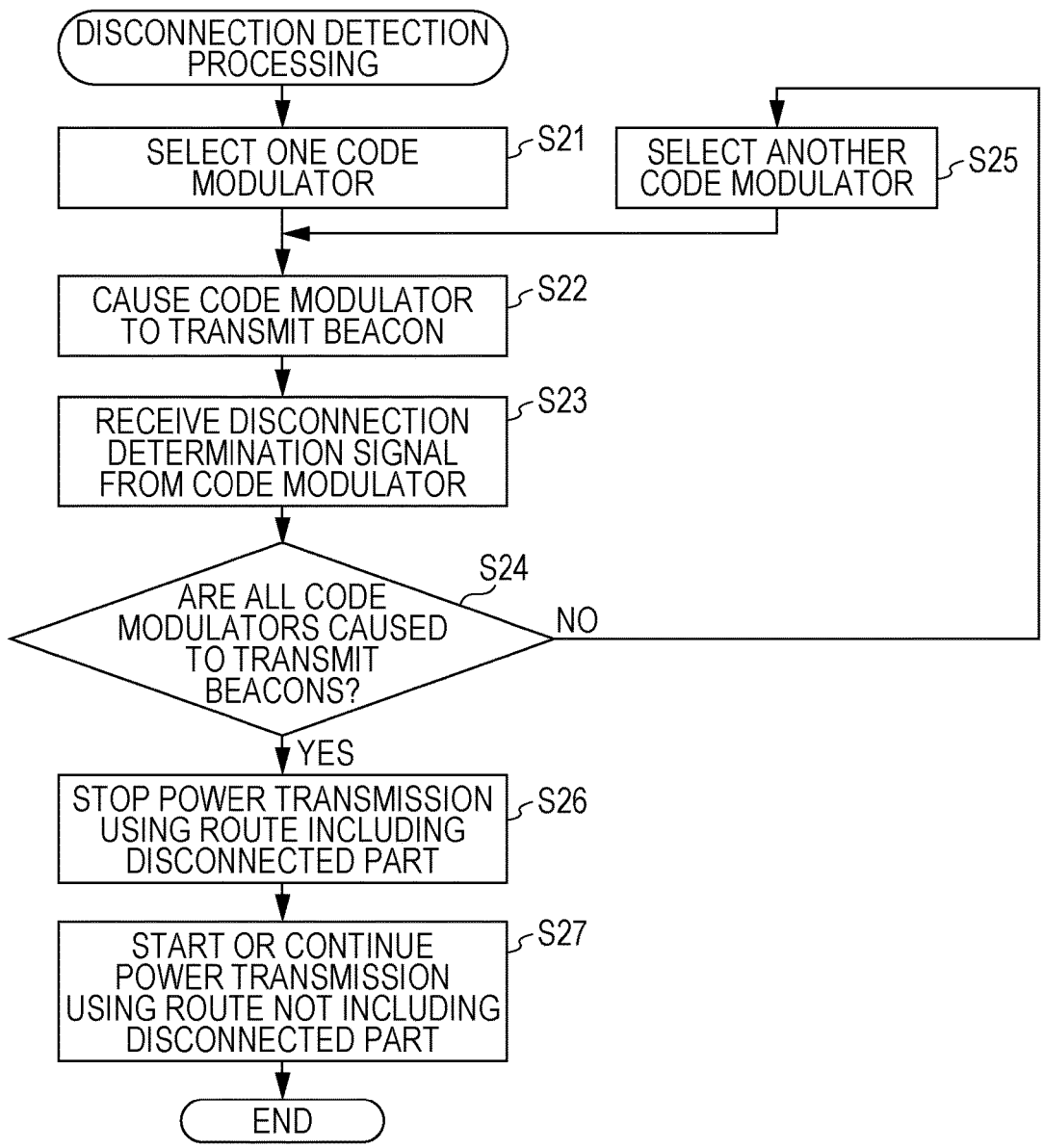
FIG. 23 is a flowchart illustrating an example of disconnection detection processing by the controller according to the second embodiment.

FIG. 23 is a flowchart illustrating disconnection detection processing executed by the controller 10C according to the second embodiment. In step S21, the controller 10C selects one of the code modulators 2-1 and 2-2. In step S22, the controller 10C causes the selected code modulator to transmit a beacon as a control signal for detecting disconnection of the wired transmission line 3.

The beacon transmitted in step S22 is received by the code demodulators 4C-1 and 4C-2 via the wired transmission line 3. When receiving beacons from the code modulators 2-1 and 2-2 via the wired transmission line 3, the power line communication circuits 34 of the code demodulators 4C-1 and 4C-2 transmit ACK signals (acknowledgement signals) to the code modulators 2-1 and 2-2 via the wired transmission line 3. The code modulators 2-1 and 2-2 transmit disconnection determination signals to the controller 10C by executing disconnection determination processing explained below with reference to FIG. 24.

In step S23, the controller 10C receives the disconnection determination signal from the code modulator. In step S24, the controller 10C determines whether the controller 10C has caused all the code modulators 2-1 and 2-2 to transmit beacons. When determining YES, the controller 10C proceeds to step S26. When determining NO, the controller 10C proceeds to step S25. In step S25, the controller 10C selects another code modulator and repeats steps S22 to S24.

In step S26, based on the disconnection determination signals received from the code modulators 2-1 and 2-2, the controller 10C stops power transmission using a route including a disconnected part. In step S27, the controller 10C starts or continues, based on the disconnection determination signals received from the code modulators 2-1 and 2-2, power transmission using a route not including a disconnected part.

Figure 24:
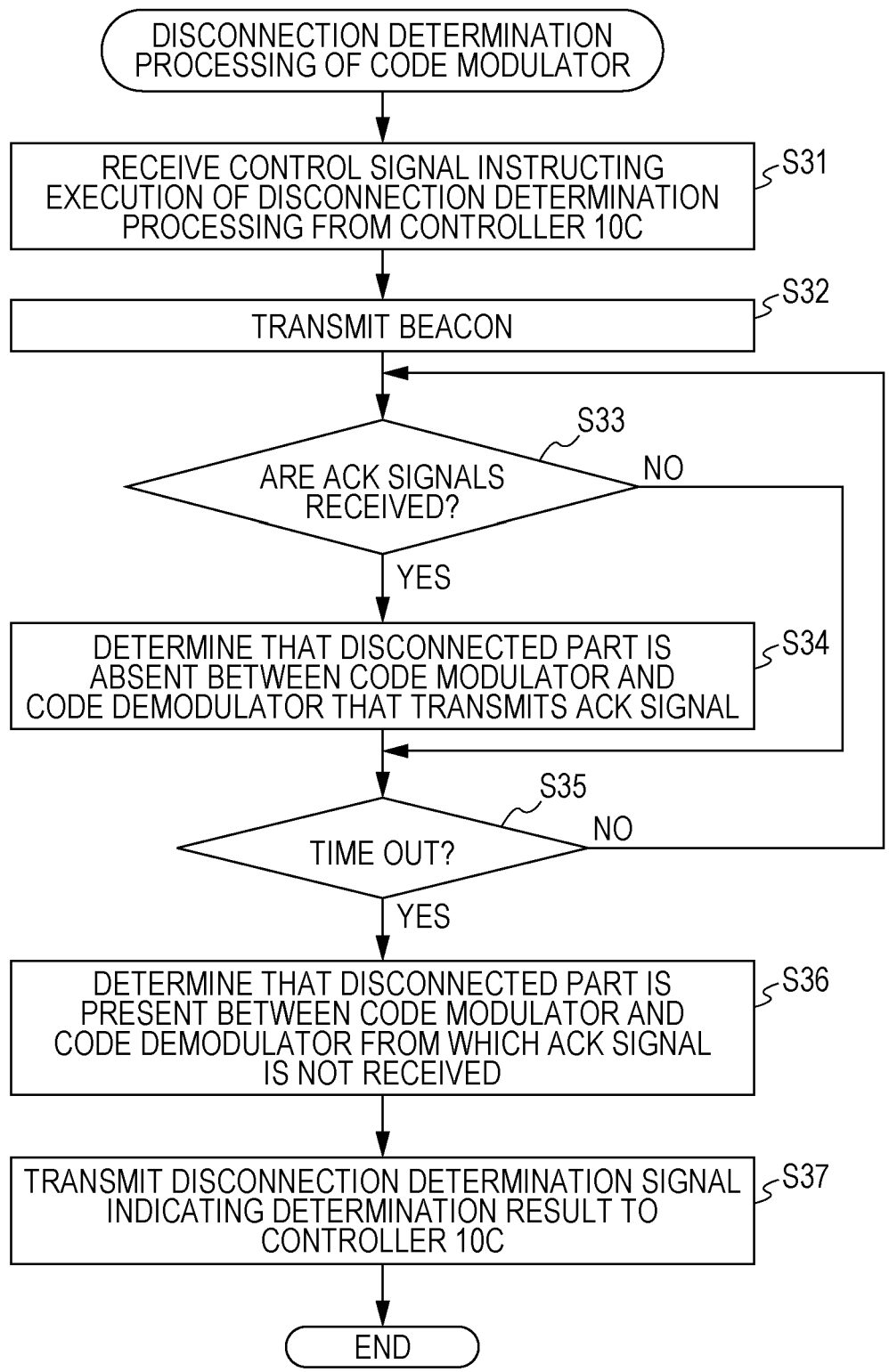
FIG. 24 is a flowchart illustrating an example of disconnection determination processing by the code modulator according to the second embodiment.

FIG. 24 is a flowchart illustrating disconnection determination processing executed by the control circuit 20 of the code modulator 2 according to the second embodiment.

In step S31, the control circuit 20 receives a control signal instructing execution of the disconnection determination processing from the controller 10C. In step S32, the control circuit 20 transmits a beacon.

The code demodulators 4C-1 and 4C-2 receive the beacon and transmit ACK signals.

In step S33, the control circuit 20 determines whether the ACK signals are received from the code demodulators 4C-1 and 4C-2. When determining YES, the control circuit 20 proceeds to step S34. When determining NO, the control circuit 20 proceeds to step S35. In step S34, the control circuit 20 determines whether a disconnected part is absent between the code modulator and the code demodulator that transmits the ACK signal. In step S35, the control circuit 20 determines whether timeout has occurred. When determining YES, the control circuit 20 proceeds to step S36. When determining NO, the control circuit 20 returns to step S33. In step S36, the control circuit 20 determines that a disconnected part is present between the code modulator and the code demodulator from which the ACK signal is not received.

In step S37, the control circuit 20 transmits a disconnection determination signal indicating a determination result to the controller 10C.

As explained with reference to FIG. 25, the power transmission system may perform both of the detection of an abnormal part and the detection of a disconnected part.

Figure 25:
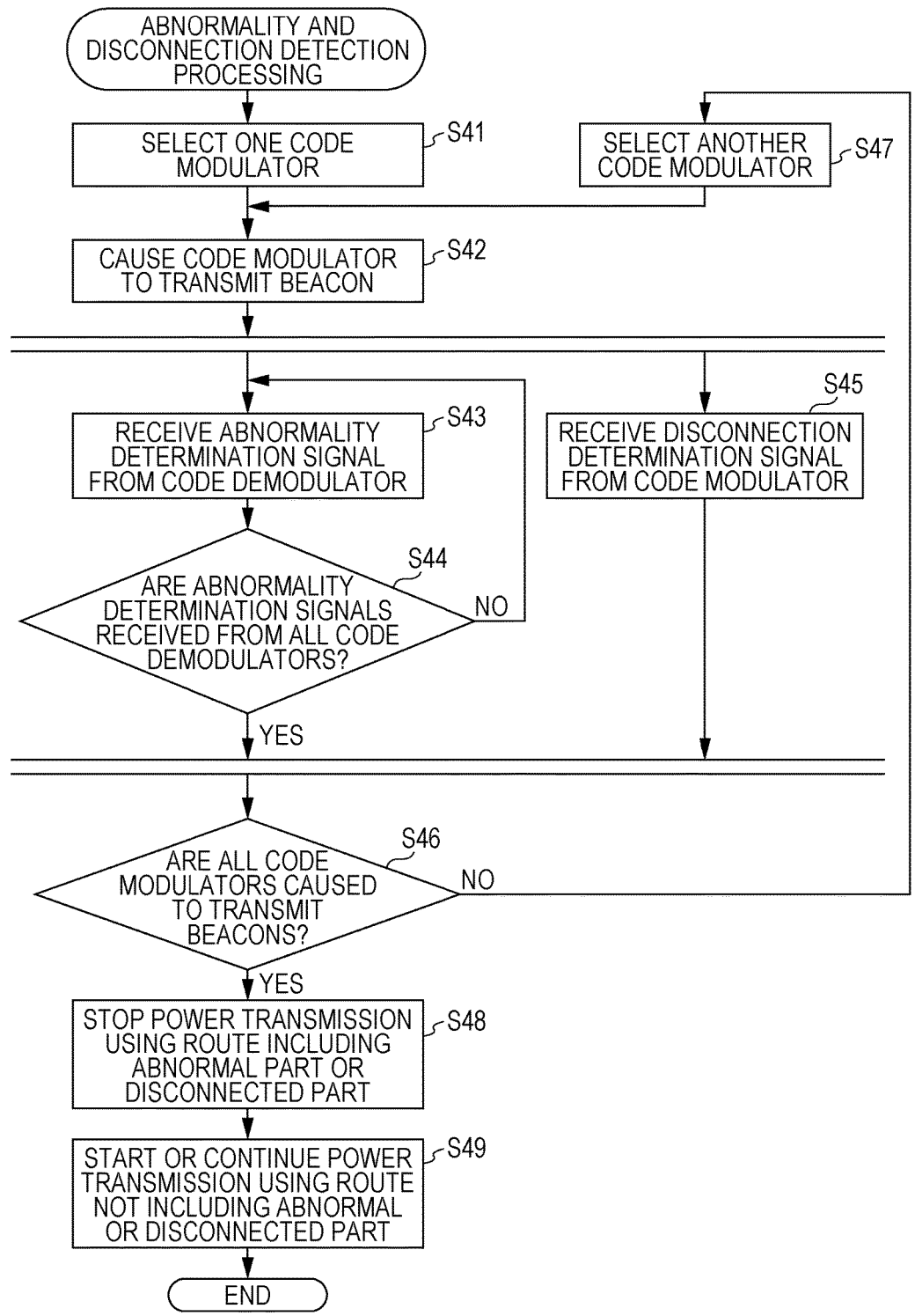
FIG. 25 is a flowchart illustrating an example of abnormality and disconnection detection processing by the controller according to the second embodiment.

FIG. 25 is a flowchart illustrating abnormality and disconnection detection processing executed by the controller 10C according to the second embodiment. The processing illustrated in FIG. 25 is a combination of the processing illustrated in FIG. 21 and the processing illustrated in FIG. 23.

In step S41, the controller 10C selects one of the code modulators 2-1 and 2-2. In step S42, the controller 10C causes the selected code modulator to transmit a beacon.

The beacon is received by the code demodulators 4C-1 and 4C-2. The code demodulators 4C-1 and 4C-2 execute the abnormality determination processing illustrated in FIG. 22, transmit abnormality determination signals to the controller 10C, and transmit ACK signals to the code modulators 2-1 and 2-2 via the wired transmission line 3.

In step S43, the controller 10C receives the abnormality determination signal from the code demodulator. In step S44, the controller 10C determines whether the abnormality determination signals are received from all the code demodulators. When determining YES, the controller 10C proceeds to step S46. When determining NO, the controller 10C returns to step S43.

In step S45, the controller 10C receives a disconnection determination signal from the code modulator.

In step S46, the controller 10C determines whether the controller 10C has caused all the code modulators 2-1 and 2-2 to transmit beacons. When determining YES, the controller 10C proceeds to step S48. When determining NO, the controller 10C proceeds to step S47. In step S47, the controller 10C selects another code modulator and repeats steps S42 to S46.

In step S48, the controller 10C stops power transmission using a route including an abnormal part or a disconnected part. In step S49, the controller 10C starts or continues power transmission using a route not including an abnormal or disconnected part.

When the controller 10C executes the processing illustrated in FIG. 25, the code modulators 2-1 and 2-2 and the code demodulators 4C-1 and 4C-2 operate in the same manner as explained with reference to FIGS. 21 to 24.

It is possible to reduce a processing time by simultaneously performing the detection of an abnormal part and the detection of a disconnected part as illustrated in FIG. 25. According to the processing illustrated in FIG. 25, step S2 in FIG. 21 and step S22 in FIG. 23 are integrated as step S42 in FIG. 25. Therefore, even if both of the detection of an abnormal part and the detection of a disconnected part are performed, it is possible to suppress an increase in communication overhead due to beacons.

An example is explained in which abnormality and disconnection of the wired transmission line are detected. For example, it is assumed that a beacon is transmitted from the code modulator 2-1 and it is determined that an abnormal part or a disconnected part is present between the code modulator 2-1 and the code demodulator 4-1 and an abnormal part is absent between the code modulator 2-1 and the code demodulator 4-2 and a beacon is transmitted from the code modulator 2-2 and it is determined that an abnormal part or a disconnected part is present between the code modulator 2-2 and the code demodulator 4-1 and an abnormal part is absent between the code modulator 2-2 and the code demodulator 4-2. In this case, it can be determined that the wired transmission line 3d illustrated in FIG. 14 has abnormality. For example, it is assumed that a beacon is transmitted from the code modulator 2-1 and it is determined that an abnormal part or a disconnected part is present between the code modulator 2-1 and the code demodulators 4-1 and 4-2 and a beacon is transmitted from the code modulator 2-2 and it is determined that an abnormal part is absent between the code modulator 2-2 and the code demodulators 4-1 and 4-2. In this case, it can be determined that the wired transmission line 3a illustrated in FIG. 14 has abnormality. As explained above, according to the second embodiment, there is an effect that it is possible to specify an abnormal part or a disconnected part of the wired transmission line 3 and more quickly realize renovation and restoration of the abnormal part or the disconnected part.

By executing the processing illustrated in FIGS. 21 to 25, the controller 10C can detect abnormality and disconnection of the wired transmission line 3, stop power transmission using a route including an abnormal part or a disconnected part, and start or continue power transmission using a route not including an abnormal or disconnected part.

Figure 26:
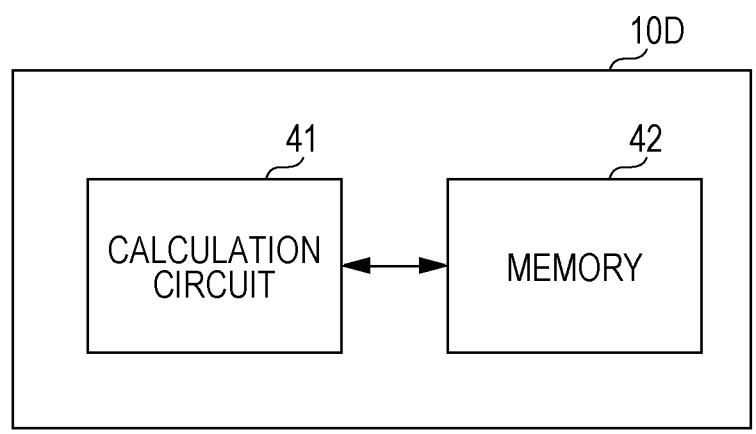
FIG. 26 is a block diagram illustrating the configuration of a controller according to a modification of the second embodiment.

FIG. 26 is a block diagram illustrating the configuration of a controller 10D according to a modification of the second embodiment. The controller 10D illustrated in FIG. 26 includes a calculation circuit 41 and a memory 42. The memory 42 accumulates signal levels of beacons received by the code demodulators 4C-1 and 4C-2. The code demodulators 4C-1 and 4C-2 transmit the signal levels of the received beacons to the controller 10C together with an abnormality determination signal or instead of the abnormality determination signal. When receiving signal levels of beacons anew from the code demodulators 4C-1 and 4C-2, the calculation circuit 41 compares the signal levels with the signal levels accumulated in the memory 42. Consequently, there is an effect that it is possible to highly accurately perform the detection of an abnormal part and prediction of a deteriorated part of the wired transmission line 3.

With the power transmission system according to the second embodiment, it is possible to specify an abnormal part or a disconnected part of the wired transmission line 3. Further, signal levels of received beacons are compared with signal levels of beacons received and accumulated before. Consequently, there is an effect that it is possible to realize an excellent power transmission system capable of performing prediction and detection of an abnormal part.

Note that, in FIGS. 21 to 25, an example is explained in which the beacon is transmitted from the code modulator to the code demodulator. However, the transmission of the beacon is not limited to this. The beacon may be transmitted from the code demodulator to the code modulator. In this case, in the power transmission system illustrated in FIG. 12, code modulators 2C-1 and 2C-2 corresponding to the code modulator 2C illustrated in FIG. 19 are provided instead of the code modulators 2-1 and 2-2 illustrated in FIG. 12. In this case, an effect same as the effect in transmitting the beacon from the code modulator to the code demodulator can be obtained.

Third Embodiment

In a power transmission system according to a third embodiment, operation for determining, to prepare for power transmission in the power transmission system, in particular, when multiple power transmitting apparatuses and multiple power receiving apparatuses are present, one or multiple combinations (i.e., routes) of power transmitting apparatuses and power receiving apparatuses that transmit electric power is explained.

In the power transmission system according to the third embodiment, it is assumed that, in the power transmission system illustrated in FIG. 12, the code modulators 2C-1 and 2C-2 corresponding to the code modulator 2C illustrated in FIG. 19 are provided instead of the code modulators 2-1 and 2-2 illustrated in FIG. 12 and the code demodulators 4C-1 and 4C-2 corresponding to the code demodulator 4C illustrated in FIG. 20 are provided instead of the code demodulators 4-1 and 4-2 illustrated in FIG. 12.

Figure 27:
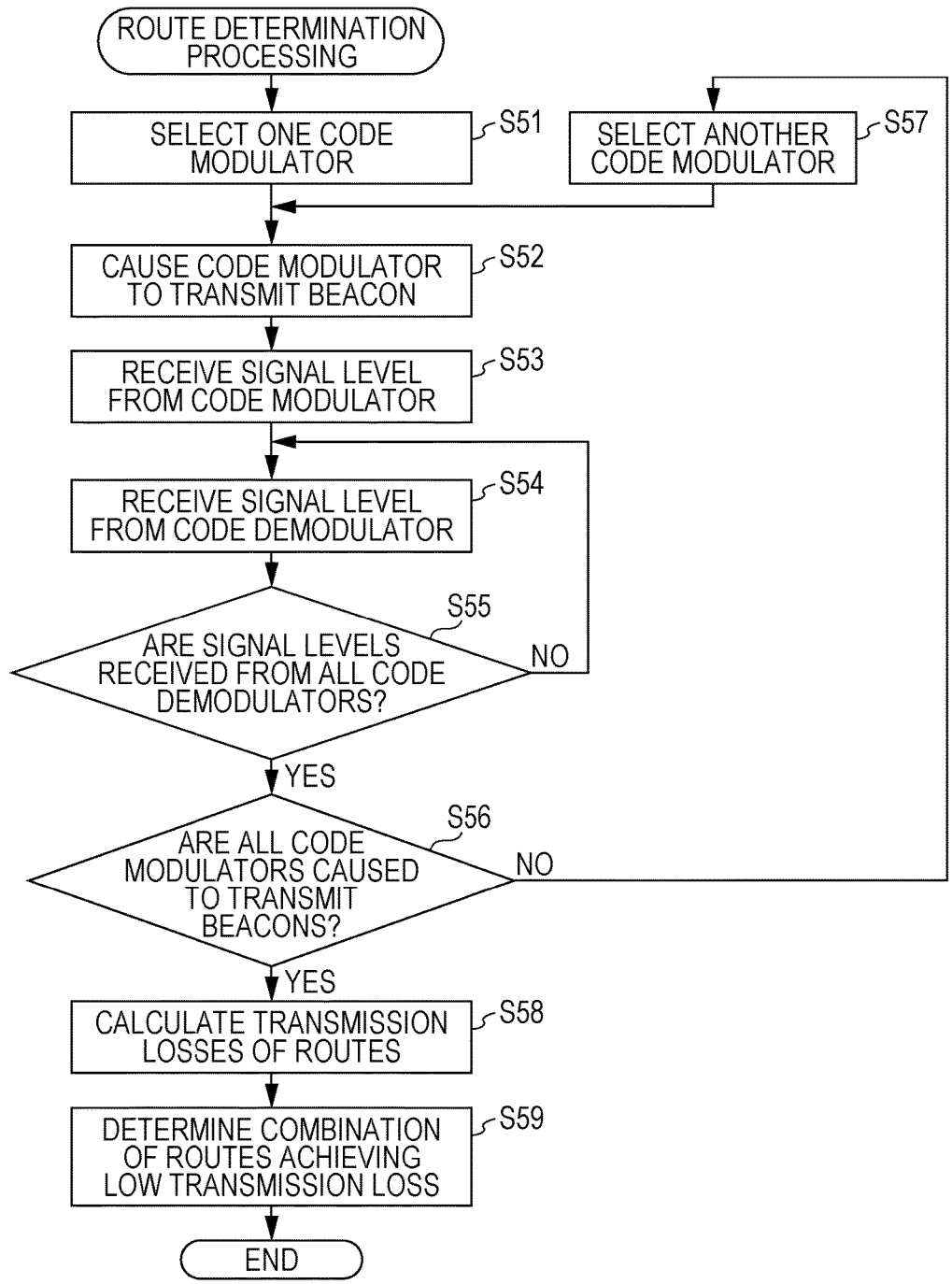
FIG. 27 is a flowchart illustrating an example of route determination processing by a controller according to a third embodiment.

FIG. 27 is a flowchart illustrating route determination processing executed by a controller according to the third embodiment. In the processing illustrated in FIG. 27, first, for each of combinations of the code modulators 2C-1 and 2C-2 and the code demodulators 4C-1 and 4C-2, a transmission loss in a route between the code modulator and the code demodulator is measured. In the following explanation, a control signal for determining a combination of the code modulator and the code demodulator is transmitted from the code modulators 2C-1 and 2C-2 to the code demodulators 4C-1 and 4C-2.

In step S51, the controller 10C selects one of the code modulators 2C-1 and 2C-2. In step S52, the controller 10C causes the selected code modulator to transmit a beacon as the control signal for determining a combination of the code modulator and the code demodulator. In step S53, the controller 10C receives, from the selected code modulator, a signal level at the time when the beacon is transmitted.

The beacon transmitted in step S52 is received by the code demodulators 4C-1 and 4C-2 via the wired transmission line 3. The code demodulators 4C-1 and 4C-2 transmit signal levels of the received beacon to the controller 10C.

In step S54, the controller 10C receives the signal level from the code demodulator. In step S55, the controller 10C determines whether signal levels have been received from all the code demodulators. When determining YES, the controller 10C proceeds to step S56. When determining NO, the controller 10C returns to step S54.

In step S56, the controller 10C determines whether the controller 10C has caused all the code modulators to transmit beacons. When determining YES, the controller 10C proceeds to step S58. When determining NO, the controller 10C proceeds to step S57. In step S57, the controller 10C selects another code modulator and repeats steps S52 to S56.

In step S58, the controller 10C calculates transmission losses of routes. It is assumed that a signal level of a beacon transmitted from the code modulator 2C-1 is P1$a$ and signal levels of beacons transmitted from the code modulator 2C-1 and received by the code demodulators 4C-1 and 4C-2 are respectively P2$a$ and P2$b$. It is assumed that a signal level of a beacon transmitted from the code modulator 2C-2 is P1$b$ and signal levels of beacons transmitted from the code modulator 2C-2 and received by the code demodulators 4C-1 and 4C-2 are respectively P3$a$ and P3$b$. Ratios of signal levels at the time when beacons are transmitted and signal levels at the time when the beacons are received are transmission losses of the routes. That is, a transmission loss Laa of a route between the code modulator 2C-1 and the code demodulator 4C-1 is P2$a$/P1$a$. A transmission loss Lba of a route between the code modulator 2C-1 and the code demodulator 4C-2 is P2$b$/Pa1. That is, a transmission loss Lab of a route between the code modulator 2C-2 and the code demodulator 4C-1 is P3$a$/P1$b$. A transmission loss Lbb of a route between the code modulator 2C-2 and the code demodulator 4C-2 is P3$b$/P1$b$.

In step S59, the controller 10C determines a combination of the routes in which a transmission loss is low.

With the power transmission system according to the third embodiment, when multiple power transmitting apparatuses and multiple power receiving apparatuses are present, it is possible to determine one or multiple combinations of the power transmitting apparatuses and the power receiving apparatuses that transmit electric power.

With the power transmission system according to the third embodiment, transmission losses of the wired transmission line 3 are acquired concerning all combinations of the code modulators 2C-1 and 2C-2 and the code demodulators 4C-1 and 4C-2. Consequently, there is an effect that it is possible to select a route with a less transmission loss and perform highly efficient power transmission. Consequently, it is possible to provide an excellent power transmission system that can realize more highly efficient power transmission.

The transmission loss is not limited to be calculated by the controller 10C and may be determined by the code demodulators 4C-1 and 4C-2. In this case, the code demodulators 4C-1 and 4C-2 acquire, from the code modulators 2C-1 and 2C-2, signal levels at the time when beacons are transmitted.

In FIG. 27, an example is explained in which the beacon is transmitted from the code modulator to the code demodulator. However, the transmission of the beacon is not limited to this. The beacon may be transmitted from the code demodulator to the code modulator. In this case, an effect same as the effect in transmitting the beacon from the code modulator to the code demodulator can be obtained.

Fourth Embodiment

In a power transmission system according to a fourth embodiment, operation for measuring the impedances of a code modulator and a code demodulator with respect to a wired transmission line and matching the impedances with the impedance of the wired transmission line to prepare for power transmission in the power transmission system is explained, in particular.

Figure 28:
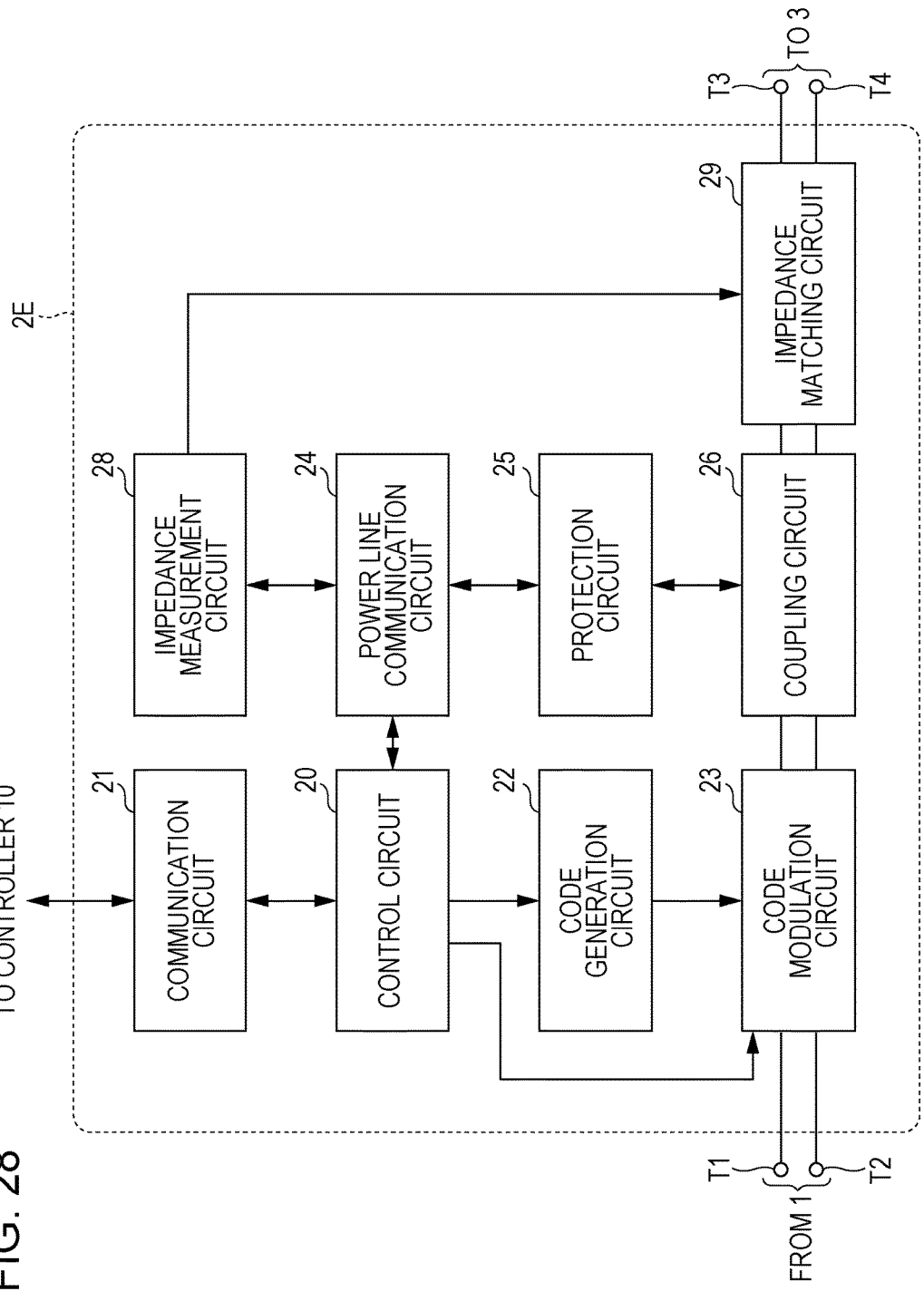
FIG. 28 is a block diagram illustrating a configuration example of a code modulator according to a fourth embodiment.

FIG. 28 is a block diagram illustrating the configuration of a code modulator 2E according to the fourth embodiment. The code modulator 2E illustrated in FIG. 28 includes an impedance measurement circuit 28 and an impedance matching circuit 29 in addition to the components of the code modulator 2 illustrated in FIG. 2. The impedance measurement circuit 28 measures the impedance of the wired transmission line 3 as seen from the power line communication circuit 24. The impedance matching circuit 29 matches the impedances of the code demodulation circuit 33 and the power line communication circuit 24 with the impedance of the wired transmission line 3 based on the impedance measured by the impedance measurement circuit 28.

Figure 29:
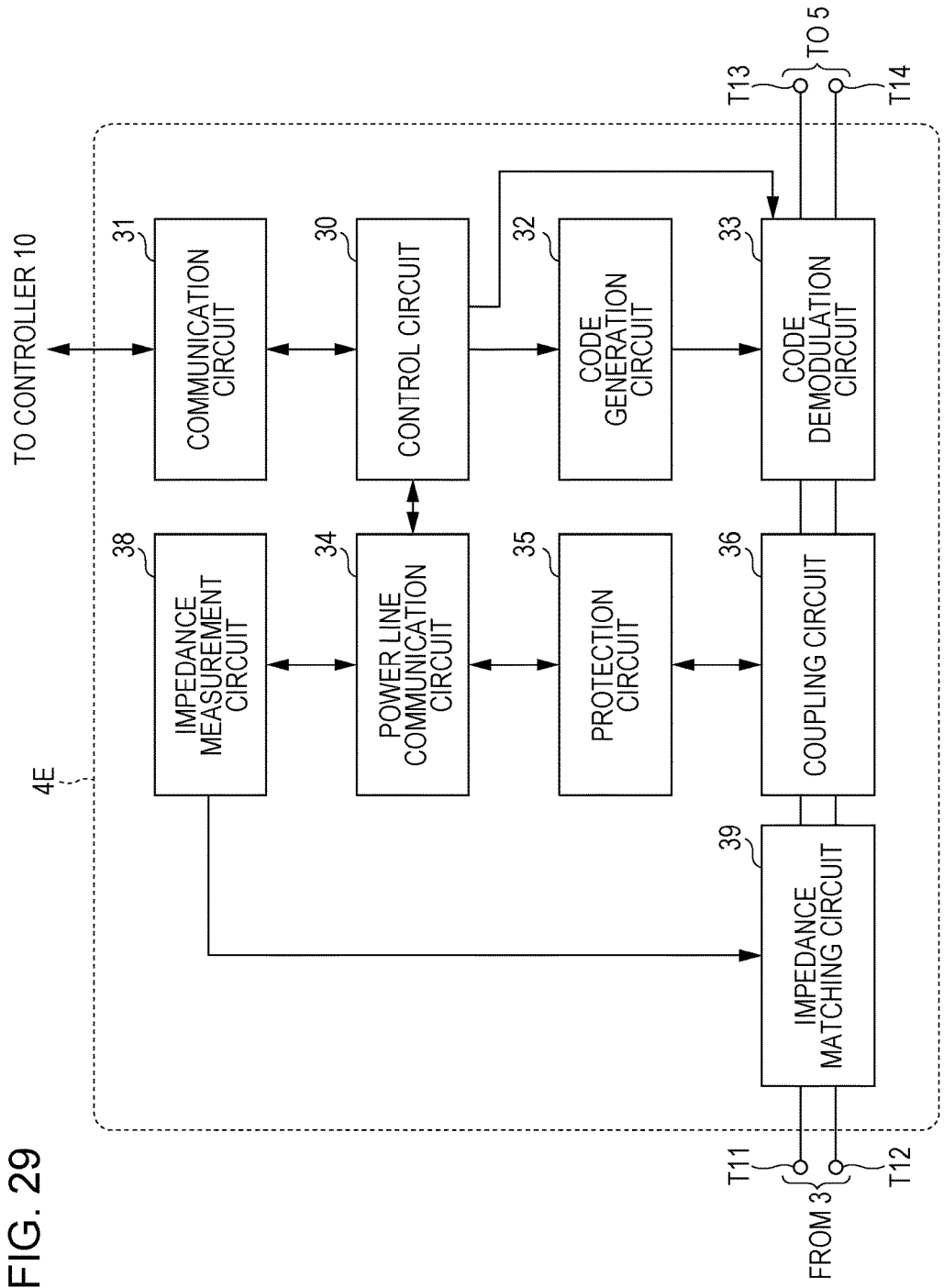
FIG. 29 is a block diagram illustrating a configuration example of a code demodulator according to the fourth embodiment.

FIG. 29 is a block diagram illustrating the configuration of a code demodulator 4E according to the fourth embodiment. The code demodulator 4E illustrated in FIG. 29 includes an impedance measurement circuit 38 and an impedance matching circuit 39 in addition to the components of the code demodulator 4 illustrated in FIG. 3. The impedance measurement circuit 38 measures the impedance of the wired transmission line 3 as seen from the power line communication circuit 34. The impedance matching circuit 39 matches the impedances of the code demodulation circuit 33 and the power line communication circuit 34 with the impedance of the wired transmission line 3 based on the impedance measured by the impedance measurement circuit 38.

In the power transmission system according to the fourth embodiment, it is assumed that, in the power transmission system illustrated in FIG. 12, code modulators 2E-1 and 2E-2 corresponding to the code modulator 2E illustrated in FIG. 28 are provided instead of the code modulators 2-1 and 2-2 illustrated in FIG. 12 and code demodulators 4E-1 and 4E-2 corresponding to the code demodulator 4E illustrated in FIG. 28 are provided instead of the code demodulators 4-1 and 4-2 illustrated in FIG. 12.

The code modulator 2E-1 transmits a beacon as a control signal for measuring the impedance of the code modulator 2E-1 with respect to the wired transmission line 3. First, when the other code modulator 2E-2 and the code demodulators 4E-1 and 4E-2 are not transmitting beacons, the code modulator 2E-1 transmits a beacon from the power line communication circuit 24. The impedance measurement circuit 28 measures amplitude Ar and a phase φr of the beacon reflected at a connection point of the code modulator 2E-1 and the wired transmission line 3 and returned. Values of the amplitude Ar and the phase φr are standardized by the amplitude and the phase of the beacon transmitted from the power line communication line 24. That is, in this case, a coefficient of reflection Γ is represented by the following expression:

$$\Gamma = Ar \cdot \exp(j \cdot \phi r)$$

Therefore, standardized impedance Za of the wired transmission line 3 is represented by the following expression:

$$Za = (1+\Gamma)/(1-\Gamma)$$

When the coefficient of reflection Γ is calculated, actually, a change in the amplitude and a change in the phase that occur when the beacon passes the protection circuit 25 and the coupling circuit 26 are further taken into account.

Consequently, impedance of the wired transmission line 3 as seen from the code modulator 2E-1 can be acquired.

Subsequently, the impedance of the code modulator 2E-1 is adjusted by the impedance matching circuit 29 to be a complex conjugate of the impedance Za of the wired transmission line 3. Consequently, it is possible to transmit the entire electric power output from the code modulator 2E-1 without reflecting the electric power. That is, there is an effect that it is possible to maximize efficiency of power transmission by measuring the impedance of the wired transmission line 3 as seen from the code modulator 2E-1.

Like the code modulator 2E-1, the other code modulator 2E-2 and the code demodulators 4E-1 and 4E-2 measure the impedances with respect to the wired transmission line 3 and match the impedances with the impedance of the wired transmission line 3.

With the power transmission system according to the fourth embodiment, it is possible to measure the impedances of the code modulator and the code demodulator with respect to the wired transmission line, and match the impedances with the impedance of the wired transmission line. It is possible to transmit electric power from the code modulators 2E-1 and 2E-2 to the code demodulators 4E-1 and 4E-2 without the electric power being reflected between the code modulators 2E-1 and 2E-2 and the wired transmission line 3 and without the electric power being reflected between the wired transmission line 3 and the code demodulators 4E-1 and 4E-2. Consequently, an effect that it is possible to maximize efficiency of power transmission can be obtained.

The impedance measurement circuits 28 and 38 may be integrated with the coupling circuits 26 and 36. Consequently, it is unnecessary to taken into account the change in the amplitude and the change in the phase that occur when the beacon passes the protection circuit and the coupling circuit. It is possible to more easily and accurately measure the impedance of the wired transmission line 3. There is an effect that it is possible to provide a power transmission system having high power transmission efficiency.

With the power transmission systems according to the first to fourth embodiments, it is possible to achieve all synchronization, detection of a state of the wired transmission line, route determination, and impedance matching only by transmitting and receiving a beacon. Since a beacon signal is only transmitted and received, an increase in cost and communication overhead less easily occurs.

With the power transmission systems according to the first to fourth embodiments, it is possible to accurately realize modulation and demodulation of electric power by establishing synchronization between the code modulator and the code demodulator. Further, it is possible to provide an excellent power transmission system that is capable of detecting abnormality and disconnection of the wired transmission line and, at the same time, enables highly efficient power transmission by selecting a wired transmission line having high transmission efficiency.

Further, when there are multiple electric facilities functioning as loads and there are multiple power transmission routes, it is possible to search for a safer power transmission route having higher power transmission efficiency through safety check (detection of abnormality and disconnection) of the routes and quality evaluation of a transmission line.

According to the modes of the present disclosure, it is possible to provide a power transmission system that can more surely identify and separate transmitted electric power and select a transmission route having higher safety.

Note that, with the power transmission systems according to the first to fourth embodiments, the frequency of the beacon may be the same as the frequency of the power transmission. Consequently, in particular, in the third and fourth embodiments, it is possible to acquire a transmission loss of the wired transmission line and the impedance of the wired transmission line at the frequency of the power transmission. There is an effect that it is possible to perform more accurate measurement of a transmission loss and impedance.

Further, with the power transmission systems according to the first to fourth embodiments, the beacon may be continuously transmitted at intervals of a predetermined fixed time. Consequently, there is an effect that it is possible to acquire continuous characteristics of the wired transmission line and reduce power consumption due to intermittent transmission.

In the first to fourth embodiments, the power transmission system including one or two generators and one or two loads is explained as an example. However, the power transmission system is not limited to this. It is also possible to configure a power transmission system including one generator and two or more loads or including two or more generators and two or more loads. In this case, it is possible to collectively perform a large number of power transmissions in one transmission line. There are effects such as a reduction in laying cost of the transmission line and a cost reduction through a reduction in the number of transmission lines.

Note that, the power transmission systems according to the first to fourth embodiments, as an example, a direct current and/or an alternating current are modulated. However, the power transmission system is not limited to this. It is also possible to modulate a direct-current voltage or an alternating-current voltage. The same effect can be obtained.

Overview of Embodiments

A power receiving apparatus according to a first aspect is a power receiving apparatus that receives electric power from a power transmitting apparatus via a wired transmission line, wherein the power transmitting apparatus modulates the electric power according to a predetermined modulation scheme and transmits the electric power to the power receiving apparatus via the wired transmission line, the power receiving apparatus includes:

a demodulation circuit that demodulates, according to a demodulation scheme corresponding to the modulation scheme, the electric power received from the power transmitting apparatus via the wired transmission line; and a communication circuit that receives a control signal received from the power transmitting apparatus via the wired transmission line, the power receiving apparatus temporally synchronizes with the power transmitting apparatus in advance, measures a propagation time from the power transmitting apparatus to the power receiving apparatus via the wired transmission line by receiving the control signal from the power transmitting apparatus via the wired transmission line, and, when receiving the electric power from the power transmitting apparatus via the wired transmission line, demodulates the electric power in synchronization with a phase of the electric power based on the propagation time.

According to a second aspect, in the power receiving apparatus according to the first aspect, when a difference between a signal level of the control signal received from the power transmitting apparatus via the wired transmission line and a predetermined reference signal level exceeds a predetermined threshold, the power receiving apparatus determines that an abnormal part is present in the wired transmission line.

According to a third aspect, in the power receiving apparatus according to the first or second aspect, when receiving the control signal from the power transmitting apparatus via the wired transmission line, the communication circuit transmits an acknowledgement signal to the power transmitting apparatus via the wired transmission line.

According to a fourth aspect, in the power receiving apparatus according to any one of the first to third aspects, the power receiving apparatus includes:

an impedance measurement circuit that measures impedance of the wired transmission line as seen from the communication circuit; and an impedance matching circuit that matches impedances of the demodulation circuit and the communication with the impedance of the wired transmission line based on the impedance measured by the impedance measurement circuit.

According to a fifth aspect, in the power receiving apparatus according to any one of the first to fourth aspects, a frequency of the control signal is the same as a frequency of electric power modulated by the power transmitting apparatus.

According to a sixth aspect, in the power receiving apparatus according to any one of the first to fifth aspects, the power transmitting apparatus transmits the control signal at fixed time intervals.

According to a seventh aspect, in the power receiving apparatus according to any one of the first to sixth aspects, the modulation scheme and the demodulation scheme are respectively a code modulation scheme and a code demodulation scheme by predetermined code sequences.

A power transmission system according to an eight aspect includes:

at least one power receiving apparatus according to one of the first to seventh aspects; and at least one power transmitting apparatus that modulates electric power according to a predetermined modulation scheme and transmits the electric power to the power receiving apparatus via a wired transmission line.

According to a ninth aspect, in the power transmission system according to the eighth aspect, the power transmission system includes a plurality of power transmitting apparatuses, a power receiving apparatus group including a plurality of the power receiving apparatuses according to one of the first to seventh aspects, and a controller, each of the plurality of power receiving apparatuses measures a signal level of the control signal received from each of the plurality of power transmitting apparatuses via the wired transmission line, and the controller calculates a transmission loss of the wired transmission line for each combination of the power transmitting apparatus and the power receiving apparatus based on a signal level at the time when each of the plurality of power transmitting apparatuses transmits the control signal and a signal level measured by each of the plurality of power receiving apparatuses, and determines a combination of the power transmitting apparatus and the power receiving apparatus to reduce the transmission loss of the wired transmission line.

A power transmitting apparatus according to a tenth aspect is a power transmitting apparatus that transmits electric power to a power receiving apparatus via a wired transmission line, wherein the power transmitting apparatus includes:

a modulation circuit that modulates electric power according to a predetermined modulation scheme and transmits the electric power to the power receiving apparatus via the wired transmission line; and a communication circuit that receives a control signal from the power receiving apparatus via the wired transmission line, the power receiving apparatus demodulates, according to a demodulation scheme corresponding to the modulation scheme, the electric power received from the power transmitting apparatus via the wired transmission line, and the power transmitting apparatus temporally synchronizes with the power receiving apparatus in advance, measures a propagation time from the power transmitting apparatus to the power receiving apparatus via the wired transmission line by receiving the control signal from the power receiving apparatus via the wired transmission line, and determines, based on the propagation time, an initial phase of the electric power transmitted from the power transmitting apparatus such that the power receiving apparatus demodulates the electric power received from the power transmitting apparatus via the wired transmission line in synchronization with a phase of the electric power.

A power transmission system according to an eleventh aspect includes:

at least one power transmitting apparatus according to the tenth aspect; and at least one power receiving apparatus that modulates, according to a demodulation scheme corresponding to the modulation scheme, electric power received from the power transmitting apparatus via a wired transmission line.

The power transmission system according to the present disclosure is useful for transmitting electric power from generators such as a solar power generator, a wind power generator, and a water power generator to a railroad, an EV vehicle, and the like.

What is claimed is:

1. A power receiving apparatus comprising:
    a communication circuit that receives a control signal from a power transmitting apparatus through a wired transmission line;
    a control circuit that determines a propagation time in which the control signal is propagated from the power transmitting apparatus to the power receiving apparatus through the wired transmission line; and
    a demodulation circuit that:
        receives modulated power from the power transmitting apparatus through a wired transmission line, and
        demodulates, based on the determined propagation time, the modulated power in synchronization with a phase of the modulated power,
    wherein the control circuit determines the propagation time by:
        acquiring reference time information indicating a second reference time at which the power receiving apparatus receives a reference signal, which is simultaneously transmitted toward the power transmitting apparatus and the power receiving apparatus;
        acquiring, from the control signal, transmission time information indicating a transmission time at which the power transmitting apparatus transmits the control signal toward the power receiving apparatus, the transmission time being relative to a first reference time at which the power transmitting apparatus receives the reference signal;
        acquiring reception time information indicating a reception time at which the power receiving apparatus receives the control signal from the power transmitting apparatus, the reception time being relative to the second reference time; and
        calculating the propagation time based on the transmission time information and the reception time information.

2. The power receiving apparatus according to claim 1, wherein
    the modulated power is power code-modulated with a modulation code, and
    the demodulation circuit code-demodulates the code-modulated power with a demodulation code corresponding to the modulation code.

3. The power receiving apparatus according to claim 2, wherein the demodulation code includes an orthogonal code.

4. The power receiving apparatus according to claim 2, wherein the demodulation circuit is an H-bridge circuit in which four bidirectional switch circuits are full-bridge connected.

5. The power receiving apparatus according to claim 1, wherein the control circuit further determines whether the wired transmission line is normal or abnormal based on a level of the received control signal.

6. The power receiving apparatus according to claim 1, wherein the communication circuit further transmits an acknowledgement signal to the power transmitting apparatus through the wired transmission line after receiving the control signal from the power transmitting apparatus through the wired transmission line.

7. The power receiving apparatus according to claim 1, further comprising:
    an impedance measurement circuit that measures impedance of the wired transmission line as seen from the communication circuit; and
    an impedance matching circuit that matches impedances of the demodulation circuit and the communication circuit with the measured impedance of the wired transmission line.

8. The power receiving apparatus according to claim 1, wherein a frequency of the control signal is the same as a frequency of the modulated power.

9. The power receiving apparatus according to claim 1, wherein the control signal is transmitted from the power transmitting apparatus at fixed intervals.

10. A power transmission system comprising:
    at least one power receiving apparatus including the power receiving apparatus according to claim 1; and
    at least one power transmitting apparatus including the power transmitting apparatus.

11. A power transmission system comprising:
    a plurality of power receiving apparatuses;
    a plurality of power transmitting apparatuses; and
    a controller that:
        measures, for each of combinations of one of the power transmitting apparatuses and one of the power receiving apparatuses, a transmission loss of a signal transmitted from the one of the power transmitting apparatuses to the one of the power receiving apparatuses, and
        selects, based on the measured transmission loss for each of the combinations, at least one combination from the combinations, the at least one combination including a combination of the power receiving apparatus and the power transmitting apparatus according to claim 1.

12. The power transmission system according to claim 10, wherein the power transmitting apparatus comprises;
another control circuit determines, based on the determined propagation time, an initial phase; and
a modulation circuit that modulates power with the determined initial phase, and transmits the modulated power to the power receiving apparatus through the wired transmission line.

13. The power transmission system according to claim 12, wherein the modulation circuit code-modulates the power with a modulation code.

14. A power receiving apparatus comprising:
a communication circuit that receives a control signal from a power transmitting apparatus through a wired transmission line;
a control circuit that determines a propagation time in which the control signal is propagated from the power transmitting apparatus to the power receiving apparatus through the wired transmission line; and
a demodulation circuit that:
  receives modulated power from the power transmitting apparatus through a wired transmission line, and
  demodulates, based on the determined propagation time, the modulated power in synchronization with a phase of the modulated power,
wherein the modulated power is power code-modulated with a modulation code,
the demodulation circuit code-demodulates the code-modulated power with a demodulation code corresponding to the modulation code,
the demodulation circuit includes a plurality of switches, and
the control circuit code-demodulates the code-modulated power by turning on and off the plurality of switches.

* * * * *